(12) United States Patent
Liu et al.

(10) Patent No.: US 12,477,413 B2
(45) Date of Patent: Nov. 18, 2025

(54) TECHNIQUES FOR COMMUNICATING MOBILITY INFORMATION

(71) Applicant: Qualcomm Incorporated, San Diego, CA (US)

(72) Inventors: Huichun Liu, Beijing (CN); Peng Cheng, Beijing (CN); Gavin Bernard Horn, La Jolla, CA (US); Ozcan Ozturk, San Diego, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 227 days.

(21) Appl. No.: 17/427,473

(22) PCT Filed: Jan. 30, 2020

(86) PCT No.: PCT/CN2020/074076
§ 371 (c)(1),
(2) Date: Jul. 30, 2021

(87) PCT Pub. No.: WO2020/156497
PCT Pub. Date: Aug. 6, 2020

(65) Prior Publication Data
US 2022/0141735 A1    May 5, 2022

(30) Foreign Application Priority Data
Feb. 1, 2019    (WO) ................ PCT/CN2019/074391

(51) Int. Cl.
*H04W 36/00* (2009.01)
*H04B 7/06* (2006.01)
(Continued)

(52) U.S. Cl.
CPC .... *H04W 36/0079* (2018.08); *H04B 7/06964* (2023.05); *H04W 16/28* (2013.01);
(Continued)

(58) Field of Classification Search
CPC ..... H04W 76/15; H04W 76/16; H04W 76/18; H04W 76/19; H04W 76/27; H04W 76/30;
(Continued)

(56) References Cited

U.S. PATENT DOCUMENTS

| 8,780,732 | B2 | 7/2014 | Song et al. | |
| 11,134,400 | B2 * | 9/2021 | Xiao | H04W 76/27 |

(Continued)

FOREIGN PATENT DOCUMENTS

| CN | 101978720 A | 2/2011 |
| CN | 102111830 A | 6/2011 |

(Continued)

OTHER PUBLICATIONS

Supplementary European Search Report—EP20748898—Search Authority—Berlin—Sep. 5, 2022 (191097EP).

(Continued)

*Primary Examiner* — Huy D Vu
*Assistant Examiner* — Scott A Schlack
(74) *Attorney, Agent, or Firm* — Holland & Hart LLP

(57) ABSTRACT

Methods, systems, and devices for providing feedback about radio link failure (RLF) events that includes information about directional beams. A user equipment (UE) may experience an RLF event and lose connectivity with a network. After the UE reestablish a radio resource control (RRC) connection with the network, the UE may transmit an RLF report that include information about directional beams, information about a master node and a secondary node in a dual-connectivity procedure, information associated conditional handover procedures, or information about service time interruptions, or a combination thereof. One or more base stations may be configured to transmit at least portions of the information in the RLF report to other base stations as part of a message that may be an example of an RLF (Continued)

indication or a handover report. The message may be transmitted over an X2 interface or an Xn interface.

26 Claims, 35 Drawing Sheets

(51) Int. Cl.
    *H04W 16/28*     (2009.01)
    *H04W 76/19*     (2018.01)

(52) U.S. Cl.
    CPC . *H04W 36/0058* (2018.08); *H04W 36/00692* (2023.05); *H04W 76/19* (2018.02); *H04W 36/00698* (2023.05); *H04W 36/00838* (2023.05)

(58) Field of Classification Search
    CPC ..... H04W 76/36; H04W 76/38; H04W 88/06; H04W 88/14; H04W 24/02; H04W 24/04; H04W 24/10; H04W 36/00; H04W 36/03; H04W 36/0055; H04W 36/0058; H04W 36/0061; H04W 36/0066; H04W 36/0069; H04W 36/00698; H04W 36/0079
    See application file for complete search history.

(56) References Cited

U.S. PATENT DOCUMENTS

| | | | |
|---|---|---|---|
| 2013/0260745 A1 | 10/2013 | Johansson et al. | |
| 2013/0315075 A1* | 11/2013 | Tamura | H04L 43/0823 370/242 |
| 2017/0208488 A1* | 7/2017 | Hwang | H04W 76/30 |
| 2018/0324716 A1 | 11/2018 | Jeon et al. | |
| 2018/0324780 A1* | 11/2018 | Novlan | H04L 43/0811 |
| 2020/0008113 A1* | 1/2020 | Chen | H04W 36/0085 |
| 2021/0168673 A1* | 6/2021 | Fan | H04W 76/15 |
| 2021/0195675 A1* | 6/2021 | Park | H04W 76/19 |
| 2021/0218462 A1* | 7/2021 | Shi | H04L 5/001 |
| 2021/0219163 A1* | 7/2021 | Sha | H04W 76/18 |
| 2021/0235337 A1* | 7/2021 | Byun | H04W 36/00833 |
| 2022/0124817 A1* | 4/2022 | Byun | H04W 24/02 |

FOREIGN PATENT DOCUMENTS

| | | |
|---|---|---|
| CN | 102256318 A | 11/2011 |
| CN | 102939777 A | 2/2013 |
| CN | 103856979 A | 6/2014 |
| CN | 107113673 A | 8/2017 |
| CN | 108810928 A | 11/2018 |
| EP | 3358901 A1 | 8/2018 |
| WO | WO-2009117443 | 9/2009 |
| WO | WO-2015060763 A1 | 4/2015 |
| WO | WO-2018115387 A1 | 6/2018 |
| WO | WO-2018143875 A1 | 8/2018 |
| WO | WO-2018203710 A1 | 11/2018 |
| WO | WO-2018237400 A1 | 12/2018 |

OTHER PUBLICATIONS

Huawei, et al "RLF for NR," 3GPP TSG RAN WG2 Meeting #97, R2-1701801, Feb. 13-Feb. 17, 2017, Feb. 4, 2017 (Feb. 4, 2017), see the whole document, 4 pages.

International Search Report and Written Opinion—PCT/CN2019/074391—ISA/EPO—Oct. 29, 2019 (191097WO1).

International Search Report and Written Opinion—PCT/CN2020/074076—ISA/EPO—Apr. 21, 2020 (191097WO2).

Samsung Electronics: "Introduction of RLF Report in SA," 3GPP TSG-RAN WG2 #103, R2-1812698, Aug. 20-Aug. 24, 2018, Aug. 10, 2018 (Aug. 10, 2018), see section 5.3.10.3, 20 pages.

SONY: "Fallback Beam and RLF," 3GPP TSG RAN WG2 Meeting #97, R2-1701508, Feb. 13-Feb. 17, 2017, Feb. 3, 2017 (Feb. 3, 2017), 2 pages.

Taiwan Search Report—TW109103007—TIPO—Apr. 8, 2023 (191097TW).

Mediatek Inc: "RLF Report in NR", 3GPP TSG RAN WG2 Meeting #101bis, R2-1804612, Sanya, China, Apr. 16-20, 2018, 4 pages.

NEC: "RLF Declaration After Beam Recovery Failure", 3GPP TSG-RAN WG2 #99bis, R2-1711615, Prague, Czech Republic, Oct. 9-13, 2017, 3 pages.

ZTE: "Consideration on the RLF and Beam Failure in NR", 3GPP TSG-RAN WG2 Meeting #99, R2-1708118, Berlin, Germany, Aug. 21-25, 2017, 7 pages.

Taiwan Search Report—TW112149381—TIPO—Dec. 25, 2024 (191097TWD1).

* cited by examiner

TECHNIQUES FOR COMMUNICATING MOBILITY INFORMATION

CROSS REFERENCE TO RELATED APPLICATIONS

The present application for patent claims priority to International Patent Application No. PCT/CN2020/074076 by Liu et al., entitled "TECHNIQUES FOR COMMUNICATING MOBILITY INFORMATION," filed Jan. 30, 2020, and to International Patent Application No. PCT/CN2019/074391 by Liu et al., entitled "TECHNIQUES FOR COMMUNICATING MOBILITY INFORMATION," filed Feb. 1, 2019, each of which is assigned to the assignee hereof, and each of which is expressly incorporated by reference in its entirety herein.

INTRODUCTION

The following relates to wireless communication, and more specifically to managing mobility information.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

As a UE moves through a coverage area, handover procedures may be initiated to allow the UE to establish a link with a target cell. It may be desirable to improve handover procedures.

SUMMARY

A method of wireless communication is described. The method may include identifying a radio link failure (RLF) event associated with a first radio access technology (RAT), reestablishing a radio resource control (RRC) connection with a cell of a second RAT based on identifying the RLF event associated with the first RAT, and transmitting an RLF report to the cell based on reestablishing the RRC connection, the RLF report including information about one or more directional beams associated with the RLF event.

An apparatus for wireless communication is described. The apparatus may include a processor and memory coupled with the processor. The processor and memory may be configured to identify an RLF event associated with a first RAT, reestablish an RRC connection with a cell of a second RAT based on identifying the RLF event associated with the first RAT, and transmit an RLF report to the cell based on reestablishing the RRC connection, the RLF report including information about one or more directional beams associated with the RLF event.

Another apparatus for wireless communication is described. The apparatus may include means for identifying an RLF event associated with a first RAT, reestablishing an RRC connection with a cell of a second RAT based on identifying the RLF event associated with the first RAT, and transmitting an RLF report to the cell based on reestablishing the RRC connection, the RLF report including information about one or more directional beams associated with the RLF event.

A non-transitory computer-readable medium storing code for wireless communication is described. The code may include instructions executable by a processor to identify an RLF event associated with a first RAT, reestablish an RRC connection with a cell of a second RAT based on identifying the RLF event associated with the first RAT, and transmit an RLF report to the cell based on reestablishing the RRC connection, the RLF report including information about one or more directional beams associated with the RLF event.

Some examples of the method, apparatuses, and non-transitory computer-readable medium described herein may further include operations, features, means, or instructions for identifying a beam recovery failure for at least one directional beam associated with the first RAT, where identifying the RLF event may be based on identifying the beam recovery failure.

In some examples of the method, apparatuses, and non-transitory computer-readable medium described herein, the RLF report may be configured to indicate whether the RLF event may be a radio link failure, a handover failure, a beam recovery failure, or a combination thereof.

In some examples of the method, apparatuses, and non-transitory computer-readable medium described herein, a connection failure type indication in the RLF report may be configured to indicate whether the RLF event may be a radio link failure, a handover failure, a beam recovery failure, or a combination thereof.

Some examples of the method, apparatuses, and non-transitory computer-readable medium described herein may further include operations, features, means, or instructions for identifying a duration of a service interruption based on identifying the RLF event, where the RLF report indicates the duration of the service interruption.

In some examples of the method, apparatuses, and non-transitory computer-readable medium described herein, identifying the duration further may include operations, features, means, or instructions for identifying the duration between a first time when a UE loses data transmission capability at a source cell of the first RAT and a second time when the UE can resume data transmission at the cell, where the cell may be of the second RAT.

In some examples of the method, apparatuses, and non-transitory computer-readable medium described herein, identifying the duration further may include operations, features, means, or instructions for identifying the duration between a first time when a UE receives a handover command from a source cell and a second time the UE transmits an RRC reconfiguration complete message to the cell.

In some examples of the method, apparatuses, and non-transitory computer-readable medium described herein, the duration may be identified for each of a master cell and a secondary cell when dual connectivity may be configured.

In some examples of the method, apparatuses, and non-transitory computer-readable medium described herein, the RLF report includes an identifier of the one or more directional beams associated with the RLF event, beam reference signal received power of the one or more directional beams associated with the RLF event, a beam measurement of the one or more directional beams associated with the RLF event, or a combination thereof.

Some examples of the method, apparatuses, and non-transitory computer-readable medium described herein may further include operations, features, means, or instructions for identifying that the RLF event may be associated with a conditional handover failure, where the RLF report includes information about the conditional handover failure.

In some examples of the method, apparatuses, and non-transitory computer-readable medium described herein, the RLF report includes a duration between a last handover initialization and a connection failure, a candidate target cell list including at least the cell, measurement information for at least one target cell in the candidate target cell list, an indication about one or more target cells attempted to connect with after the RLF event occurs, a number of connection attempts after the RLF event occurs, or a combination thereof.

Some examples of the method, apparatuses, and non-transitory computer-readable medium described herein may further include operations, features, means, or instructions for receiving an indication of one or more candidate target cells for a conditional handover and determining that a handover condition may be satisfied for at least one candidate target cell of the one or more candidate target cells, the at least one candidate target cell including the cell. Some examples of the method, apparatuses, and non-transitory computer-readable medium described herein may further include operations, features, means, or instructions for initiating a random access channel (RACH) to the at least one candidate target cell that satisfied the handover condition, where identifying that the RLF event may be associated with the conditional handover failure may be based on initiating the RACH to the at least one candidate target cell.

Some examples of the method, apparatuses, and non-transitory computer-readable medium described herein may further include operations, features, means, or instructions for identifying information about a master cell and a secondary cell in a dual-connectivity configuration, where the RLF report includes the identified information.

In some examples of the method, apparatuses, and non-transitory computer-readable medium described herein, the RLF event may be for a master cell group (MCG) in a dual-connectivity configuration.

Some examples of the method, apparatuses, and non-transitory computer-readable medium described herein may further include operations, features, means, or instructions for identifying a measurement for an MCG and a measurement for at least one secondary cell group (SCG) in a dual-connectivity configuration, where the RLF report includes the measurements.

Some examples of the method, apparatuses, and non-transitory computer-readable medium described herein may further include operations, features, means, or instructions for identifying a reference signal received power (RSRP) of a last serving cell that includes an MCG and at least one SCG in a dual-connectivity configuration, or a reference signal received quality (RSRQ) of the last serving cell in the dual-connectivity configuration, or a combination thereof, where the RLF report includes the RSRP or the RSRQ or both for the last serving cell.

Some examples of the method, apparatuses, and non-transitory computer-readable medium described herein may further include operations, features, means, or instructions for identifying an RSRP of a neighboring cell configured by a master base station or a secondary base station in a dual-connectivity configuration, an RSRQ of the neighboring cell, a frequency of the neighboring cell, or an identifier of the neighboring cell, or a combination thereof, where the RLF report includes the RSRP, the RSRQ, the frequency, or the identifier, or a combination thereof of the neighboring cell.

Some examples of the method, apparatuses, and non-transitory computer-readable medium described herein may further include operations, features, means, or instructions for identifying a cell radio network temporary identifier (C-RNTI) of a master base station and at least one secondary base station in a dual-connectivity configuration, where the RLF report includes the C-RNTIs of the master base station and the at least one secondary base station.

Some examples of the method, apparatuses, and non-transitory computer-readable medium described herein may further include operations, features, means, or instructions for identifying an identifier for each cell of a master base station or a secondary base station in a dual-connectivity configuration that may be associated with the RLF event, where the RLF report includes the identifiers for each cell associated with the RLF event.

Some examples of the method, apparatuses, and non-transitory computer-readable medium described herein may further include operations, features, means, or instructions for identifying an identifier of a primary secondary cell in a dual-connectivity configuration when a last RRC reconfiguration message including mobility control information was received, where the RLF report includes the identifier.

Some examples of the method, apparatuses, and non-transitory computer-readable medium described herein may further include operations, features, means, or instructions for identifying whether a type of a handover may be an inter-RAT handover or an intra-RAT handover, where the RLF report includes an indication of the type of the handover.

In some examples of the method, apparatuses, and non-transitory computer-readable medium described herein, reestablishing the RRC connection further may include operations, features, means, or instructions for transmitting an RRC connection reestablishment request, receiving an RRC connection reestablishment message based on transmitting the RRC connection reestablishment request, and transmitting an RRC connection reestablishment complete message based on receiving the RRC connection reestablishment message.

Some examples of the method, apparatuses, and non-transitory computer-readable medium described herein may further include operations, features, means, or instructions for transmitting an RRC message that includes an indication that one or more RLF reports may be available to report to a network, where transmitting the RLF report may be based on transmitting the RRC message that includes the indication.

Some examples of the method, apparatuses, and non-transitory computer-readable medium described herein may further include operations, features, means, or instructions for receiving an information request message based on transmitting the RRC message that includes the indication, where transmitting the RLF report may be based on receiving the information request message.

In some examples of the method, apparatuses, and non-transitory computer-readable medium described herein, the RLF report may be part of an information response message transmitted based on receiving the information request message.

In some examples of the method, apparatuses, and non-transitory computer-readable medium described herein, the RRC message includes an RRC connection reestablishment complete message.

Some examples of the method, apparatuses, and non-transitory computer-readable medium described herein may further include operations, features, means, or instructions for performing a handover between a source cell and the cell, where identifying the RLF event may be based on performing the handover.

In some examples of the method, apparatuses, and non-transitory computer-readable medium described herein, the RLF report includes a transmission power of a preamble, a number of attempts to successfully send the preamble, a number of transmissions before receiving an acknowledgement that the preamble was received, an RSRP, or a layer 1 (L1) RSRP, or a combination thereof.

In some examples of the method, apparatuses, and non-transitory computer-readable medium described herein, the preamble may be a RACH preamble.

In some examples of the method, apparatuses, and non-transitory computer-readable medium described herein, the first RAT may be associated with a 5G core network (5GC) and the second RAT may be associated with an evolved packet core (EPC).

A method of wireless communication is described. The method may include reestablishing an RRC connection with a UE after an RLF event, where the RLF event is associated with a first RAT and the RRC connection is associated with a second RAT, and receiving, over the RRC connection of the second RAT, an RLF report from the UE that includes information about one or more directional beams associated with the RLF event. The method may further include transmitting a message to another cell of a network based on receiving the RLF report, the message including at least a portion of the information about the one or more directional beams associated with the RLF event.

An apparatus for wireless communication is described. The apparatus may include a processor and memory coupled with the processor. The processor and memory may be configured to reestablish an RRC connection with a UE after an RLF event, where the RLF event is associated with a first RAT and the RRC connection is associated with a second RAT, and receive, over the RRC connection of the second RAT, an RLF report from the UE that includes information about one or more directional beams associated with the RLF event. The processor and memory may be further configured to transmit a message to another cell of a network based on receiving the RLF report, the message including at least a portion of the information about the one or more directional beams associated with the RLF event.

Another apparatus for wireless communication is described. The apparatus may include means for reestablishing an RRC connection with a UE after an RLF event, where the RLF event is associated with a first RAT and the RRC connection is associated with a second RAT, and receiving, over the RRC connection of the second RAT, an RLF report from the UE that includes information about one or more directional beams associated with the RLF event. The apparatus may include further means for transmitting a message to another cell of a network based on receiving the RLF report, the message including at least a portion of the information about the one or more directional beams associated with the RLF event.

A non-transitory computer-readable medium storing code for wireless communication is described. The code may include instructions executable by a processor to reestablish an RRC connection with a UE after an RLF event, where the RLF event is associated with a first RAT and the RRC connection is associated with a second RAT, and receive, over the RRC connection of the second RAT, an RLF report from the UE that includes information about one or more directional beams associated with the RLF event. The code may include instructions further executable by a processor to transmit a message to another cell of a network based on receiving the RLF report, the message including at least a portion of the information about the one or more directional beams associated with the RLF event.

In some examples of the method, apparatuses, and non-transitory computer-readable medium described herein, transmitting the message to the other cell may include operations, features, means, or instructions for transmitting the message to a source cell associated with a handover of the UE.

In some examples of the method, apparatuses, and non-transitory computer-readable medium described herein, transmitting the message to the other cell may include operations, features, means, or instructions for transmitting the message to a core network component, where the core network component communicates at least some of the information in the message to a source cell associated with a handover of the UE.

In some examples of the method, apparatuses, and non-transitory computer-readable medium described herein, the core network component includes at least one component of an EPC.

In some examples of the method, apparatuses, and non-transitory computer-readable medium described herein, the core network component includes at least one component of a 5GC.

In some examples of the method, apparatuses, and non-transitory computer-readable medium described herein, the first RAT may be associated with a 5GC and the second RAT may be associated with an EPC.

Some examples of the method, apparatuses, and non-transitory computer-readable medium described herein may further include operations, features, means, or instructions for identifying a type of the RLF event and selecting a type of the message to transmit based on identifying the type of the RLF event, where transmitting the message may be based on identifying the type of the RLF event.

In some examples of the method, apparatuses, and non-transitory computer-readable medium described herein, the message may be an RLF indication.

In some examples of the method, apparatuses, and non-transitory computer-readable medium described herein, the message may be a handover report.

In some examples of the method, apparatuses, and non-transitory computer-readable medium described herein, transmitting the message to the other cell may include operations, features, means, or instructions for transmitting the message over an Xn interface.

In some examples of the method, apparatuses, and non-transitory computer-readable medium described herein, transmitting the message to the other cell may include operations, features, means, or instructions for transmitting the message over an X2 interface.

Some examples of the method, apparatuses, and non-transitory computer-readable medium described herein may further include operations, features, means, or instructions for identifying that a cause of the RLF event may be a beam recovery failure associated with the first RAT, where the message indicates that a type of the RLF event includes the beam recovery failure.

In some examples of the method, apparatuses, and non-transitory computer-readable medium described herein, the message includes a connection failure type indication and may be configured to indicate whether the RLF event may be a radio link failure, a handover failure, the beam recovery failure, or a combination thereof.

In some examples of the method, apparatuses, and non-transitory computer-readable medium described herein, a connection failure type indication in the RLF report may be configured to indicate whether the RLF event may be a radio link failure, a handover failure, the beam recovery failure, or a combination thereof.

Some examples of the method, apparatuses, and non-transitory computer-readable medium described herein may further include operations, features, means, or instructions for identifying a duration of a service interruption based on receiving the RLF report, where the message indicates the duration of the service interruption.

In some examples of the method, apparatuses, and non-transitory computer-readable medium described herein, the message includes an identifier of the one or more directional beams associated with the RLF event, beam reference signal received power of the one or more directional beams associated with the RLF event, a beam measurement of the one or more directional beams associated with the RLF event, or a combination thereof.

Some examples of the method, apparatuses, and non-transitory computer-readable medium described herein may further include operations, features, means, or instructions for identifying that the RLF event may be associated with a conditional handover failure based on receiving the RLF report, where the message includes information about the conditional handover failure.

In some examples of the method, apparatuses, and non-transitory computer-readable medium described herein, transmitting the message to the other cell may include operations, features, means, or instructions for transmitting the message to a set of candidate target cells associated with a conditional handover, where transmitting the message to the other cell may be based on transmitting the message to the set of candidate target cells.

In some examples of the method, apparatuses, and non-transitory computer-readable medium described herein, the message includes a duration between a last handover initialization and a connection failure, a candidate target cell list, measurement information for at least one target cell in the candidate target cell list, an indication about one or more target cells attempted to connect with after the RLF event occurs, a number of connection attempts after the RLF event occurs, or a combination thereof.

Some examples of the method, apparatuses, and non-transitory computer-readable medium described herein may further include operations, features, means, or instructions for transmitting an indication of one or more candidate target cells for a conditional handover, where receiving the RLF report may be based on transmitting the indication of the one or more candidate target cells for the conditional handover.

Some examples of the method, apparatuses, and non-transitory computer-readable medium described herein may further include operations, features, means, or instructions for identifying information about a master cell and a secondary cell in a dual-connectivity configuration based on receiving the RLF report, where the message includes the identified information.

In some examples of the method, apparatuses, and non-transitory computer-readable medium described herein, transmitting the message to the other cell may include operations, features, means, or instructions for transmitting the message to an MCG and a SCG in a dual-connectivity configuration.

In some examples of the method, apparatuses, and non-transitory computer-readable medium described herein, the RLF event may be for an MCG in a dual-connectivity configuration.

Some examples of the method, apparatuses, and non-transitory computer-readable medium described herein may further include operations, features, means, or instructions for identifying a measurement for an MCG and a measurement for at least one SCG in a dual-connectivity configuration based on receiving the RLF report, where the message includes the measurements.

Some examples of the method, apparatuses, and non-transitory computer-readable medium described herein may further include operations, features, means, or instructions for identifying, based on receiving the RLF report, an RSRP of a last serving cell that includes a MCG and at least one SCG in a dual-connectivity configuration, or an RSRQ of the last serving cell in the dual-connectivity configuration, or a combination thereof. In some examples of the method, apparatuses, and non-transitory computer-readable medium described herein, the message includes the RSRP or the RSRQ or both for the last serving cell.

Some examples of the method, apparatuses, and non-transitory computer-readable medium described herein may further include operations, features, means, or instructions for identifying, based on receiving the RLF report, an RSRP of a neighboring cell configured by a master base station or a secondary base station in a dual-connectivity configuration, a RSRQ of the neighboring cell, a frequency of the neighboring cell, or an identifier of the neighboring cell, or a combination thereof. In some examples of the method, apparatuses, and non-transitory computer-readable medium described herein, the message includes the RSRP, the RSRQ, the frequency, or the identifier, or a combination thereof of the neighboring cell.

Some examples of the method, apparatuses, and non-transitory computer-readable medium described herein may further include operations, features, means, or instructions for identifying, based on receiving the RLF report, a C-RNTI of a master base station and at least one secondary base station in a dual-connectivity configuration, where the message includes the C-RNTIs of the master base station and the least one secondary base station.

Some examples of the method, apparatuses, and non-transitory computer-readable medium described herein may further include operations, features, means, or instructions for identifying, based on receiving the RLF report, an identifier for each cell of a master base station or a secondary base station in a dual-connectivity configuration that may be associated with the RLF event, where the message includes the identifiers for each cell associated with the RLF event.

Some examples of the method, apparatuses, and non-transitory computer-readable medium described herein may further include operations, features, means, or instructions for identifying, based on receiving the RLF report, an identifier of a primary secondary cell in a dual-connectivity configuration when a last RRC reconfiguration message including mobility control information was received, where the message includes the identifier.

In some examples of the method, apparatuses, and non-transitory computer-readable medium described herein, reestablishing the RRC connection further may include operations, features, means, or instructions for receiving an RRC connection reestablishment request from the UE, transmitting an RRC connection reestablishment message based on receiving the RRC connection reestablishment request, and receiving an RRC connection reestablishment complete message based on transmitting the RRC connection reestablishment message.

Some examples of the method, apparatuses, and non-transitory computer-readable medium described herein may further include operations, features, means, or instructions for receiving an RRC message that includes an indication that one or more RLF reports may be available at the UE, where receiving the RLF report may be based on receiving the RRC message that includes the indication.

Some examples of the method, apparatuses, and non-transitory computer-readable medium described herein may further include operations, features, means, or instructions for transmitting an information request message based on receiving the RRC message that includes the indication, where receiving the RLF report may be based on transmitting the information request message.

In some examples of the method, apparatuses, and non-transitory computer-readable medium described herein, the RLF report may be part of an information response message received based on transmitting the information request message.

In some examples of the method, apparatuses, and non-transitory computer-readable medium described herein, the RRC message includes an RRC connection reestablishment complete message.

Some examples of the method, apparatuses, and non-transitory computer-readable medium described herein may further include operations, features, means, or instructions for transmitting a handover command to the UE, where receiving the RLF report may be based on transmitting the handover command.

A method of wireless communication is described. The method may include identifying an RLF event, reestablishing an RRC connection with a cell based on identifying the RLF event, and transmitting an RLF report to the cell based on reestablishing the RRC connection, the RLF report including a connection failure type indication indicating that the RLF event is a beam recovery failure and information about one or more directional beams associated with the RLF event.

An apparatus for wireless communication is described. The apparatus may include a processor and memory coupled with the processor. The processor and memory may be configured to identify an RLF event, reestablish an RRC connection with a cell based on identifying the RLF event, and transmit an RLF report to the cell based on reestablishing the RRC connection, the RLF report including a connection failure type indication indicating that the RLF event is a beam recovery failure and information about one or more directional beams associated with the RLF event.

Another apparatus for wireless communication is described. The apparatus may include means for identifying an RLF event, reestablishing an RRC connection with a cell based on identifying the RLF event, and transmitting an RLF report to the cell based on reestablishing the RRC connection, the RLF report including a connection failure type indication indicating that the RLF event is a beam recovery failure and information about one or more directional beams associated with the RLF event.

A non-transitory computer-readable medium storing code for wireless communication is described. The code may include instructions executable by a processor to identify an RLF event, reestablish an RRC connection with a cell based on identifying the RLF event, and transmit an RLF report to the cell based on reestablishing the RRC connection, the RLF report including a connection failure type indication indicating that the RLF event is a beam recovery failure and information about one or more directional beams associated with the RLF event.

Some examples of the method, apparatuses, and non-transitory computer-readable medium described herein may further include operations, features, means, or instructions for identifying the beam recovery failure for at least one directional beam, where identifying the RLF event may be based on identifying the beam recovery failure.

In some examples of the method, apparatuses, and non-transitory computer-readable medium described herein, the connection failure type indication in the RLF report may be configured to indicate whether the RLF event may be a radio link failure, a handover failure, the beam recovery failure, or a combination thereof.

In some examples of the method, apparatuses, and non-transitory computer-readable medium described herein, the RLF report includes an identifier of the one or more directional beams associated with the RLF event, beam reference signal received power of the one or more directional beams associated with the RLF event, a beam measurement of the one or more directional beams associated with the RLF event, or a combination thereof.

Some examples of the method, apparatuses, and non-transitory computer-readable medium described herein may further include operations, features, means, or instructions for identifying whether a type of a handover may be an inter-RAT handover or an intra-RAT handover, where the RLF report includes an indication of the type of the handover.

In some examples of the method, apparatuses, and non-transitory computer-readable medium described herein, reestablishing the RRC connection further may include operations, features, means, or instructions for transmitting an RRC connection reestablishment request, receiving an RRC connection reestablishment message based on transmitting the RRC connection reestablishment request, and transmitting an RRC connection reestablishment complete message based on receiving the RRC connection reestablishment message.

Some examples of the method, apparatuses, and non-transitory computer-readable medium described herein may further include operations, features, means, or instructions for transmitting an RRC message that includes an indication that one or more RLF reports may be available to report to a network, where transmitting the RLF report may be based on transmitting the RRC message that includes the indication.

Some examples of the method, apparatuses, and non-transitory computer-readable medium described herein may further include operations, features, means, or instructions for receiving an information request message based on transmitting the RRC message that includes the indication, where transmitting the RLF report may be based on receiving the information request message.

In some examples of the method, apparatuses, and non-transitory computer-readable medium described herein, the RLF report may be part of an information response message transmitted based on receiving the information request message.

A method of wireless communication is described. The method may include reestablishing an RRC connection with a UE after an RLF event, receiving an RLF report from the UE that includes a connection failure type indication indicating that the RLF event is a beam recovery failure and information about one or more directional beams associated with the RLF event. The method may further include transmitting a message to another cell of a network based on receiving the RLF report, the message including at least a portion of the information about the one or more directional beams associated with the RLF event.

An apparatus for wireless communication is described. The apparatus may include a processor and memory coupled with the processor. The processor and memory may be configured to reestablish an RRC connection with a UE after an RLF event, receive an RLF report from the UE that includes a connection failure type indication indicating that the RLF event is a beam recovery failure and information about one or more directional beams associated with the RLF event. The processor and memory may be further configured to transmit a message to another cell of a network based on receiving the RLF report, the message including at least a portion of the information about the one or more directional beams associated with the RLF event.

Another apparatus for wireless communication is described. The apparatus may include means for reestablishing an RRC connection with a UE after an RLF event, receiving an RLF report from the UE that includes a connection failure type indication indicating that the RLF event is a beam recovery failure and information about one or more directional beams associated with the RLF event. The apparatus may include further means for transmitting a message to another cell of a network based on receiving the RLF report, the message including at least a portion of the information about the one or more directional beams associated with the RLF event.

A non-transitory computer-readable medium storing code for wireless communication is described. The code may include instructions executable by a processor to reestablish an RRC connection with a UE after an RLF event, receive an RLF report from the UE that includes a connection failure type indication indicating that the RLF event is a beam recovery failure and information about one or more directional beams associated with the RLF event. The code may include instructions further executable by the processor to transmit a message to another cell of a network based on receiving the RLF report, the message including at least a portion of the information about the one or more directional beams associated with the RLF event.

In some examples of the method, apparatuses, and non-transitory computer-readable medium described herein, transmitting the message to the other cell may include operations, features, means, or instructions for transmitting the message to a source cell associated with a handover of the UE.

In some examples of the method, apparatuses, and non-transitory computer-readable medium described herein, transmitting the message to the other cell may include operations, features, means, or instructions for transmitting the message to a core network component, where the core network component communicates at least some of the information in the message to a source cell associated with a handover of the UE.

In some examples of the method, apparatuses, and non-transitory computer-readable medium described herein, the core network component includes at least one component of an EPC.

In some examples of the method, apparatuses, and non-transitory computer-readable medium described herein, the core network component includes at least one component of a 5GC.

Some examples of the method, apparatuses, and non-transitory computer-readable medium described herein may further include operations, features, means, or instructions for identifying a type of the RLF event and selecting a type of the message to transmit based on identifying the type of the RLF event, where transmitting the message may be based on identifying the type of the RLF event.

In some examples of the method, apparatuses, and non-transitory computer-readable medium described herein, the message may be an RLF indication.

In some examples of the method, apparatuses, and non-transitory computer-readable medium described herein, the message may be a handover report.

In some examples of the method, apparatuses, and non-transitory computer-readable medium described herein, transmitting the message to the other cell may include operations, features, means, or instructions for transmitting the message over an Xn interface.

In some examples of the method, apparatuses, and non-transitory computer-readable medium described herein, transmitting the message to the other cell may include operations, features, means, or instructions for transmitting the message over an X2 interface.

A method of wireless communication is described. The method may include receiving an indication of one or more candidate target cells for a conditional handover, determining that a handover condition is satisfied for at least one candidate target cell of the one or more candidate target cells, and identifying an RLF event associated with the conditional handover. The method may further include reestablishing an RRC connection with a cell based on identifying the RLF event and transmitting an RLF report to the cell based on reestablishing the RRC connection, the RLF report including information about one or more directional beams associated with the RLF event and information about a conditional handover failure.

An apparatus for wireless communication is described. The apparatus may include a processor and memory coupled with the processor. The processor and memory may be configured to receive an indication of one or more candidate target cells for a conditional handover, determine that a handover condition is satisfied for at least one candidate target cell of the one or more candidate target cells, and identify an RLF event associated with the conditional handover. The processor and memory may be further configured to reestablish an RRC connection with a cell based on identifying the RLF event and transmit an RLF report to the cell based on reestablishing the RRC connection, the RLF report including information about one or more directional beams associated with the RLF event and information about a conditional handover failure.

Another apparatus for wireless communication is described. The apparatus may include means for receiving an indication of one or more candidate target cells for a conditional handover, determining that a handover condition is satisfied for at least one candidate target cell of the one or more candidate target cells, and identifying an RLF event associated with the conditional handover. The apparatus may include further means for reestablishing an RRC connection with a cell based on identifying the RLF event and transmitting an RLF report to the cell based on reestablishing the RRC connection, the RLF report including information about one or more directional beams associated with the RLF event and information about a conditional handover failure.

A non-transitory computer-readable medium storing code for wireless communication is described. The code may include instructions executable by a processor to receive an indication of one or more candidate target cells for a conditional handover, determine that a handover condition is satisfied for at least one candidate target cell of the one or more candidate target cells, and identify an RLF event associated with the conditional handover. The code may include instructions executable by a processor to reestablish an RRC connection with a cell based on identifying the RLF event and transmit an RLF report to the cell based on reestablishing the RRC connection, the RLF report including information about one or more directional beams associated with the RLF event and information about a conditional handover failure.

Some examples of the method, apparatuses, and non-transitory computer-readable medium described herein may further include operations, features, means, or instructions for initiating a RACH to the at least one candidate target cell that satisfied the handover condition, where identifying that the RLF event may be associated with the conditional handover failure may be based on initiating the RACH to the at least one candidate target cell.

Some examples of the method, apparatuses, and non-transitory computer-readable medium described herein may further include operations, features, means, or instructions for measuring one or more characteristics associated with the one or more candidate target cells and determining that the one or more characteristics associated with at least one of the one or more candidate target cells satisfies one or more thresholds. In some examples of the method, apparatuses, and non-transitory computer-readable medium described herein, determining that the handover condition may be satisfied may be based on determining that the one or more characteristics associated with at least one of the one or more candidate target cells satisfies the one or more thresholds.

In some examples of the method, apparatuses, and non-transitory computer-readable medium described herein, transmitting the RLF report further may include operations, features, means, or instructions for transmitting the RLF report to a set of candidate target cells.

Some examples of the method, apparatuses, and non-transitory computer-readable medium described herein may further include operations, features, means, or instructions for identifying whether the RLF event associated with the conditional handover may be based on a too-late handover scenario from a source cell to one of the one or more candidate target cells or a wrong-cell handover scenario to a wrong cell. In some examples of the method, apparatuses, and non-transitory computer-readable medium described herein, the RLF report includes information indicating whether the RLF event associated with the conditional handover may be based on the too-late handover scenario or the wrong-cell handover scenario.

In some examples of the method, apparatuses, and non-transitory computer-readable medium described herein, the RLF report includes a duration between a last handover initialization and a connection failure, a candidate target cell list, measurement information for at least one target cell in the candidate target cell list, an indication about one or more target cells attempted to connect with after the RLF event occurs, a number of connection attempts after the RLF event occurs, or a combination thereof.

Some examples of the method, apparatuses, and non-transitory computer-readable medium described herein may further include operations, features, means, or instructions for identifying a beam recovery failure for at least one directional beam associated with the conditional handover, where identifying the RLF event may be based on identifying the beam recovery failure.

In some examples of the method, apparatuses, and non-transitory computer-readable medium described herein, the RLF report may be configured to indicate whether the RLF event may be a radio link failure, a handover failure, a beam recovery failure, or a combination thereof.

In some examples of the method, apparatuses, and non-transitory computer-readable medium described herein, the RLF report includes an identifier of the one or more directional beams associated with the RLF event, beam reference signal received power of the one or more directional beams associated with the RLF event, a beam measurement of the one or more directional beams associated with the RLF event, or a combination thereof.

A method of wireless communication is described. The method may include reestablishing an RRC connection with a UE after an RLF event, receiving an RLF report from the UE that includes information about one or more directional beams associated with the RLF event, and identifying that the RLF event is associated with a conditional handover failure based on receiving the RLF report. The method may further include transmitting a message to another cell of a network based on receiving the RLF report, the message including at least a portion of the information about the one or more directional beams associated with the RLF event and information about the conditional handover failure.

An apparatus for wireless communication is described. The apparatus may include a processor and memory coupled with the processor. The processor and memory may be configured to reestablish an RRC connection with a UE after an RLF event, receive an RLF report from the UE that includes information about one or more directional beams associated with the RLF event, and identify that the RLF event is associated with a conditional handover failure based on receiving the RLF report. The processor and memory may be further configured to transmit a message to another cell of a network based on receiving the RLF report, the message including at least a portion of the information about the one or more directional beams associated with the RLF event and information about the conditional handover failure.

Another apparatus for wireless communication is described. The apparatus may include means for reestablishing an RRC connection with a UE after an RLF event, receiving an RLF report from the UE that includes information about one or more directional beams associated with the RLF event, and identifying that the RLF event is associated with a conditional handover failure based on receiving the RLF report. The apparatus may further include means for transmitting a message to another cell of a network based on receiving the RLF report, the message including at least a portion of the information about the one or more directional beams associated with the RLF event and information about the conditional handover failure.

A non-transitory computer-readable medium storing code for wireless communication is described. The code may include instructions executable by a processor to reestablish an RRC connection with a UE after an RLF event, receive an RLF report from the UE that includes information about one or more directional beams associated with the RLF event, and identify that the RLF event is associated with a conditional handover failure based on receiving the RLF report. The code may include instructions further executable by a processor to transmit a message to another cell of a network based on receiving the RLF report, the message including at least a portion of the information about the one or more directional beams associated with the RLF event and information about the conditional handover failure.

In some examples of the method, apparatuses, and non-transitory computer-readable medium described herein, transmitting the message to the other cell may include operations, features, means, or instructions for transmitting the message to a set of candidate target cells associated with a conditional handover, where transmitting the message to the other cell may be based on transmitting the message to the set of candidate target cells.

In some examples of the method, apparatuses, and non-transitory computer-readable medium described herein, the message includes a duration between a last handover initialization and a connection failure, a candidate target cell list, measurement information for at least one target cell in the candidate target cell list, an indication about one or more target cells attempted to connect with after the RLF event occurs, a number of connection attempts after the RLF event occurs, or a combination thereof.

Some examples of the method, apparatuses, and non-transitory computer-readable medium described herein may further include operations, features, means, or instructions for identifying whether the RLF event associated with a conditional handover may be based on a too-late handover scenario from a source cell to one of one or more candidate target cells or a wrong-cell handover scenario to a wrong cell. In some examples of the method, apparatuses, and non-transitory computer-readable medium described herein, the RLF report includes information indicating whether the RLF event associated with the conditional handover may be based on the too-late handover scenario or the wrong-cell handover scenario.

Some examples of the method, apparatuses, and non-transitory computer-readable medium described herein may further include operations, features, means, or instructions for transmitting, to the UE, an indication of one or more candidate target cells for a conditional handover, where receiving the RLF report may be based on transmitting the indication of the one or more candidate target cells for the conditional handover.

Some examples of the method, apparatuses, and non-transitory computer-readable medium described herein may further include operations, features, means, or instructions for identifying a set of candidate target cells for the conditional handover with the UE, and transmitting a conditional handover request to the set of candidate target cells, where transmitting the indication to the UE may be based on transmitting the conditional handover request.

Some examples of the method, apparatuses, and non-transitory computer-readable medium described herein may further include operations, features, means, or instructions for identifying a type of the RLF event, and selecting a type of the message to transmit based on identifying the type of the RLF event, where transmitting the message may be based on identifying the type of the RLF event.

In some examples of the method, apparatuses, and non-transitory computer-readable medium described herein, the message may be an RLF indication.

In some examples of the method, apparatuses, and non-transitory computer-readable medium described herein, the message may be a handover report.

In some examples of the method, apparatuses, and non-transitory computer-readable medium described herein, transmitting the message to the other cell may include operations, features, means, or instructions for transmitting the message over an Xn interface.

In some examples of the method, apparatuses, and non-transitory computer-readable medium described herein, transmitting the message to the other cell may include operations, features, means, or instructions for transmitting the message over an X2 interface.

In some examples of the method, apparatuses, and non-transitory computer-readable medium described herein, the message includes an identifier of the one or more directional beams associated with the RLF event, beam reference signal received power of the one or more directional beams associated with the RLF event, a beam measurement of the one or more directional beams associated with the RLF event, or a combination thereof.

A method of wireless communication is described. The method may include identifying an RLF event, reestablishing an RRC connection with a cell based on identifying the RLF event, and transmitting an RLF report to the cell based on reestablishing the RRC connection, the RLF report including information about one or more directional beams associated with the RLF event.

An apparatus for wireless communication is described. The apparatus may include a processor and memory coupled to the processor. The processor and memory may be configured to identify an RLF event, reestablish an RRC connection with a cell based on identifying the RLF event, and transmit an RLF report to the cell based on reestablishing the RRC connection, the RLF report including information about one or more directional beams associated with the RLF event.

Another apparatus for wireless communication is described. The apparatus may include means for identifying an RLF event, reestablishing an RRC connection with a cell based on identifying the RLF event, and transmitting an RLF report to the cell based on reestablishing the RRC connection, the RLF report including information about one or more directional beams associated with the RLF event.

A non-transitory computer-readable medium storing code for wireless communication is described. The code may include instructions executable by a processor to identify an RLF event, reestablish an RRC connection with a cell based on identifying the RLF event, and transmit an RLF report to the cell based on reestablishing the RRC connection, the RLF report including information about one or more directional beams associated with the RLF event.

Some examples of the method, apparatuses, and non-transitory computer-readable medium described herein may further include operations, features, means, or instructions for identifying a beam recovery failure for at least one directional beam, where identifying the RLF event may be based on identifying the beam recovery failure. Some examples of the method, apparatuses, and non-transitory computer-readable medium described herein may further include operations, features, means, or instructions for identifying that a beam recovery fails for at least one directional beam, where identifying the RLF event may be based on identifying that the beam recovery fails, where a field in the RLF report indicates that a type of the RLF event includes a beam recovery failure.

In some examples of the method, apparatuses, and non-transitory computer-readable medium described herein, a field in the RLF report may be configured to indicate whether the RLF event may be a radio link failure, a handover failure, the beam recovery failure, or a combination thereof. In some examples of the method, apparatuses, and non-transitory computer-readable medium described herein, the field in the RLF report may be a connection failure type field and may be configured to indicate whether the RLF event may be a radio link failure, a handover failure, the beam recovery failure, or a combination thereof.

Some examples of the method, apparatuses, and non-transitory computer-readable medium described herein may further include operations, features, means, or instructions for identifying a duration of a service interruption based on identifying the RLF event, where the RLF report indicates the duration of the service interruption.

In some examples of the method, apparatuses, and non-transitory computer-readable medium described herein, identifying the duration further may include operations, features, means, or instructions for identifying the duration between a first time when a UE loses data transmission capability at a source cell and a second time when the UE can resume data transmission at a target cell. In some examples of the method, apparatuses, and non-transitory computer-readable medium described herein, identifying the duration further may include operations, features, means, or instructions for identifying the duration between a first time when a UE receives a handover command from a source cell and a second time the UE transmits an RRC reconfiguration complete message to a target cell. In some examples of the method, apparatuses, and non-transitory computer-readable medium described herein, the duration may be identified for each node when dual connectivity may be configured.

In some examples of the method, apparatuses, and non-transitory computer-readable medium described herein, the RLF report includes an identifier of the one or more directional beams associated with the RLF event, beam reference signal received power of the one or more directional beams associated with the RLF event, a beam measurement of the one or more directional beams associated with the RLF event, or a combination thereof.

Some examples of the method, apparatuses, and non-transitory computer-readable medium described herein may further include operations, features, means, or instructions for identifying that the RLF event may be associated with a conditional handover failure, where the RLF report includes information about the conditional handover failure.

In some examples of the method, apparatuses, and non-transitory computer-readable medium described herein, the RLF report includes a duration between a last handover initialization and a connection failure, a candidate target cell list, measurement information for at least one target cell in the candidate target cell list, an indication about one or more target cells attempted to connect with after the RLF event occurs, a number of connection attempts after the RLF event occurs, or a combination thereof.

Some examples of the method, apparatuses, and non-transitory computer-readable medium described herein may further include operations, features, means, or instructions for receiving an indication of one or more candidate target cells for a conditional handover, determining that a handover condition may be satisfied for at least one candidate target cell of the one or more candidate target cells, and initiating a RACH procedure to the at least one candidate target cell that satisfied the handover condition. In some examples of the method, apparatuses, and non-transitory computer-readable medium described herein, identifying that the RLF event may be associated with the conditional handover failure may be based on initiating the RACH to the at least one candidate target cell.

Some examples of the method, apparatuses, and non-transitory computer-readable medium described herein may further include operations, features, means, or instructions for identifying information about a master cell and a secondary cell in a dual-connectivity configuration, where the RLF report includes the identified information.

In some examples of the method, apparatuses, and non-transitory computer-readable medium described herein, the RLF event may be for an MCG in a dual-connectivity configuration. Some examples of the method, apparatuses, and non-transitory computer-readable medium described herein may further include operations, features, means, or instructions for identifying a measurement for an MCG and a measurement for at least one SCG in a dual-connectivity configuration, where the RLF report includes the measurements.

Some examples of the method, apparatuses, and non-transitory computer-readable medium described herein may further include operations, features, means, or instructions for identifying an RSRP of a last serving cell that includes an MCG and at least one SCG in a dual-connectivity configuration, or an RSRQ of the last serving cell in the dual-connectivity configuration, or a combination thereof, where the RLF report includes the RSRP or the RSRQ or both for the last serving cell.

Some examples of the method, apparatuses, and non-transitory computer-readable medium described herein may further include operations, features, means, or instructions for identifying an RSRP of a neighboring cell configured by a master base station or a secondary base station in a dual-connectivity configuration, an RSRQ of the neighboring cell, a frequency of the neighboring cell, or an identifier of the neighboring cell, or a combination thereof, where the RLF report includes the RSRP, the RSRQ, the frequency, or the identifier, or a combination thereof of the neighboring cell.

Some examples of the method, apparatuses, and non-transitory computer-readable medium described herein may further include operations, features, means, or instructions for identifying a C-RNTI of a master base station and at least one secondary base station in a dual-connectivity configuration, where the RLF report includes the C-RNTIs of the master base station and the at least one secondary base station.

Some examples of the method, apparatuses, and non-transitory computer-readable medium described herein may further include operations, features, means, or instructions for identifying an identifier for each cell of a master base station or a secondary base station in a dual-connectivity configuration that may be associated with the RLF event, where the RLF report includes the identifiers for each cell associated with the RLF event.

Some examples of the method, apparatuses, and non-transitory computer-readable medium described herein may further include operations, features, means, or instructions for identifying an identifier of a primary secondary cell in a dual-connectivity configuration when a last RRC reconfiguration message including mobility control information was received, where the RLF report includes the identifier.

Some examples of the method, apparatuses, and non-transitory computer-readable medium described herein may further include operations, features, means, or instructions for identifying whether a type of a handover may be an inter-RAT handover or an intra-RAT handover, where the RLF report includes an indication of the type of the handover.

In some examples of the method, apparatuses, and non-transitory computer-readable medium described herein, reestablishing the RRC connection further may include operations, features, means, or instructions for transmitting an RRC connection reestablishment request, receiving an RRC connection reestablishment message based on transmitting the RRC connection reestablishment request, and transmitting an RRC connection reestablishment complete message based on receiving the RRC connection reestablishment message.

Some examples of the method, apparatuses, and non-transitory computer-readable medium described herein may further include operations, features, means, or instructions for transmitting an RRC message that includes an indication that one or more RLF reports may be available to report to a network, where transmitting the RLF report may be based on transmitting the RRC message that includes the indication.

Some examples of the method, apparatuses, and non-transitory computer-readable medium described herein may further include operations, features, means, or instructions for receiving an information request message based on transmitting the RRC message that includes the indication, where transmitting the RLF report may be based on receiving the information request message. In some examples of the method, apparatuses, and non-transitory computer-readable medium described herein, the RLF report may be part of an information response message transmitted based on receiving the information request message. In some examples of the method, apparatuses, and non-transitory computer-readable medium described herein, the RRC message includes an RRC connection reestablishment complete message.

Some examples of the method, apparatuses, and non-transitory computer-readable medium described herein may further include operations, features, means, or instructions for performing a handover between a source cell and a target cell, where identifying the RLF event may be based on performing the handover.

A method of wireless communication is described. The method may include reestablishing an RRC connection with a UE after an RLF event, receiving an RLF report from the UE that includes information about one or more directional beams associated with the RLF event, and transmitting a message to another node of a network based on receiving the RLF report, the message including at least a portion of the information about the one or more directional beams associated with the RLF event.

An apparatus for wireless communication is described. The apparatus may include a processor and memory coupled to the processor. The processor and memory may be configured to reestablish an RRC connection with a UE after an RLF event, receive an RLF report from the UE that includes information about one or more directional beams associated with the RLF event, and transmit a message to another node of a network based on receiving the RLF report, the message including at least a portion of the information about the one or more directional beams associated with the RLF event.

Another apparatus for wireless communication is described. The apparatus may include means for reestablishing an RRC connection with a UE after an RLF event, receiving an RLF report from the UE that includes information about one or more directional beams associated with the RLF event, and transmitting a message to another node of a network based on receiving the RLF report, the message including at least a portion of the information about the one or more directional beams associated with the RLF event.

A non-transitory computer-readable medium storing code for wireless communication is described. The code may include instructions executable by a processor to reestablish an RRC connection with a UE after an RLF event, receive an RLF report from the UE that includes information about one or more directional beams associated with the RLF event, and transmit a message to another node of a network based on receiving the RLF report, the message including at least a portion of the information about the one or more directional beams associated with the RLF event.

In some examples of the method, apparatuses, and non-transitory computer-readable medium described herein, transmitting the message to the other node may include operations, features, means, or instructions for transmitting the message to a source node associated with a handover of the UE.

In some examples of the method, apparatuses, and non-transitory computer-readable medium described herein, transmitting the message to the other node may include operations, features, means, or instructions for transmitting the message to a core network component, where the core network component communicates at least some of the information in the message to a source node associated with a handover of the UE.

In some examples of the method, apparatuses, and non-transitory computer-readable medium described herein, the core network component includes at least one component of an EPC. In some examples of the method, apparatuses, and non-transitory computer-readable medium described herein, the core network component includes at least one component of a 5GC.

Some examples of the method, apparatuses, and non-transitory computer-readable medium described herein may further include operations, features, means, or instructions for identifying a type of the RLF event, and selecting a type of the message to transmit based on identifying the type of the RLF event, where transmitting the message may be based on identifying the type of the RLF event. In some examples of the method, apparatuses, and non-transitory computer-readable medium described herein, the message may be an RLF indication. In some examples of the method, apparatuses, and non-transitory computer-readable medium described herein, the message may be a handover report.

In some examples of the method, apparatuses, and non-transitory computer-readable medium described herein, transmitting the message to the other node may include operations, features, means, or instructions for transmitting the message over an Xn interface.

In some examples of the method, apparatuses, and non-transitory computer-readable medium described herein, transmitting the message to the other node may include operations, features, means, or instructions for transmitting the message over an X2 interface.

Some examples of the method, apparatuses, and non-transitory computer-readable medium described herein may further include operations, features, means, or instructions for identifying that a cause of the RLF event may be a beam recovery failure, where the message indicates that a type of the RLF event includes the beam recovery failure.

In some examples of the method, apparatuses, and non-transitory computer-readable medium described herein, a field of the message includes a connection failure type field and may be configured to indicate whether the RLF event may be a radio link failure, a handover failure, the beam recovery failure, or a combination thereof.

Some examples of the method, apparatuses, and non-transitory computer-readable medium described herein may further include operations, features, means, or instructions for identifying a duration of a service interruption based on receiving the RLF report, where the message indicates the duration of the service interruption.

In some examples of the method, apparatuses, and non-transitory computer-readable medium described herein, the RLF report may include a transmission power of a preamble, a number of attempts to successfully send the preamble, a number of transmissions before receiving an acknowledgement that the preamble was received, an RSRP, or an L1 RSRP, or a combination thereof. In some examples of the method, apparatuses, and non-transitory computer-readable medium described herein, the preamble may be a RACH preamble.

In some examples of the method, apparatuses, and non-transitory computer-readable medium described herein, the message includes an identifier of the one or more directional beams associated with the RLF event, beam reference signal received power of the one or more directional beams associated with the RLF event, a beam measurement of the one or more directional beams associated with the RLF event, or a combination thereof.

Some examples of the method, apparatuses, and non-transitory computer-readable medium described herein may further include operations, features, means, or instructions for identifying that the RLF event may be associated with a conditional handover failure based on receiving the RLF report, where the message includes information about the conditional handover failure.

In some examples of the method, apparatuses, and non-transitory computer-readable medium described herein, transmitting the message to the other node may include operations, features, means, or instructions for transmitting the message to a set of candidate target cells associated with a conditional handover, where transmitting the message to the other node may be based on transmitting the message to the set of candidate target cells.

In some examples of the method, apparatuses, and non-transitory computer-readable medium described herein, the message includes a duration between a last handover initialization and a connection failure, a candidate target cell list, measurement information for at least one target cell in the candidate target cell list, an indication about one or more target cells attempted to connect with after the RLF event occurs, a number of connection attempts after the RLF event occurs, or a combination thereof.

Some examples of the method, apparatuses, and non-transitory computer-readable medium described herein may further include operations, features, means, or instructions for transmitting an indication of one or more candidate target cells for a conditional handover, where receiving the RLF report may be based on transmitting the indication of the one or more candidate target cells for the conditional handover.

Some examples of the method, apparatuses, and non-transitory computer-readable medium described herein may further include operations, features, means, or instructions for identifying information about a master cell and a secondary cell in a dual-connectivity configuration based on receiving the RLF report, where the message includes the identified information.

In some examples of the method, apparatuses, and non-transitory computer-readable medium described herein, transmitting the message to the other node may include operations, features, means, or instructions for transmitting the message to an MCG and a SCG in a dual-connectivity configuration.

In some examples of the method, apparatuses, and non-transitory computer-readable medium described herein, the RLF event may be for an MCG in a dual-connectivity configuration. Some examples of the method, apparatuses, and non-transitory computer-readable medium described herein may further include operations, features, means, or instructions for identifying a measurement for an MCG and a measurement for at least one SCG in a dual-connectivity configuration based on receiving the RLF report, where the message includes the measurements.

Some examples of the method, apparatuses, and non-transitory computer-readable medium described herein may further include operations, features, means, or instructions for identifying, based on receiving the RLF report, an RSRP of a last serving cell that includes an MCG and at least one SCG in a dual-connectivity configuration, or an RSRQ of the last serving cell in the dual-connectivity configuration, or a combination thereof, where the message includes the RSRP or the RSRQ or both for the last serving cell.

Some examples of the method, apparatuses, and non-transitory computer-readable medium described herein may further include operations, features, means, or instructions for identifying, based on receiving the RLF report, an RSRP of a neighboring cell configured by a master base station or a secondary base station in a dual-connectivity configuration, an RSRQ of the neighboring cell, a frequency of the neighboring cell, or an identifier of the neighboring cell, or a combination thereof, where the message includes the RSRP, the RSRQ, the frequency, or the identifier, or a combination thereof of the neighboring cell.

Some examples of the method, apparatuses, and non-transitory computer-readable medium described herein may further include operations, features, means, or instructions for identifying, based on receiving the RLF report, a C-RNTI of a master base station and at least one secondary base station in a dual-connectivity configuration, where the message includes the C-RNTIs of the master base station and the least one secondary base station.

Some examples of the method, apparatuses, and non-transitory computer-readable medium described herein may further include operations, features, means, or instructions for identifying, based on receiving the RLF report, an identifier for each cell of a master base station or a secondary base station in a dual-connectivity configuration that may be associated with the RLF event, where the message includes the identifiers for each cell associated with the RLF event.

Some examples of the method, apparatuses, and non-transitory computer-readable medium described herein may further include operations, features, means, or instructions for identifying, based on receiving the RLF report, an identifier of a primary secondary cell in a dual-connectivity configuration when a last RRC reconfiguration message including mobility control information was received, where the message includes the identifier.

In some examples of the method, apparatuses, and non-transitory computer-readable medium described herein, reestablishing the RRC connection further may include operations, features, means, or instructions for receiving an RRC connection reestablishment request from the UE, transmitting an RRC connection reestablishment message based on receiving the RRC connection reestablishment request, and receiving an RRC connection reestablishment complete message based on transmitting the RRC connection reestablishment message.

Some examples of the method, apparatuses, and non-transitory computer-readable medium described herein may further include operations, features, means, or instructions for receiving an RRC message that includes an indication that one or more RLF reports may be available at the UE, where receiving the RLF report may be based on receiving the RRC message that includes the indication.

Some examples of the method, apparatuses, and non-transitory computer-readable medium described herein may further include operations, features, means, or instructions for transmitting an information request message based on receiving the RRC message that includes the indication, where receiving the RLF report may be based on transmitting the information request message.

In some examples of the method, apparatuses, and non-transitory computer-readable medium described herein, the RLF report may be part of an information response message received based on transmitting the information request message.

In some examples of the method, apparatuses, and non-transitory computer-readable medium described herein, the RRC message includes an RRC connection reestablishment complete message.

Some examples of the method, apparatuses, and non-transitory computer-readable medium described herein may further include operations, features, means, or instructions for transmitting a handover command to the UE, where receiving the RLF report may be based on transmitting the handover command.

DETAILED DESCRIPTION

Figure 1:
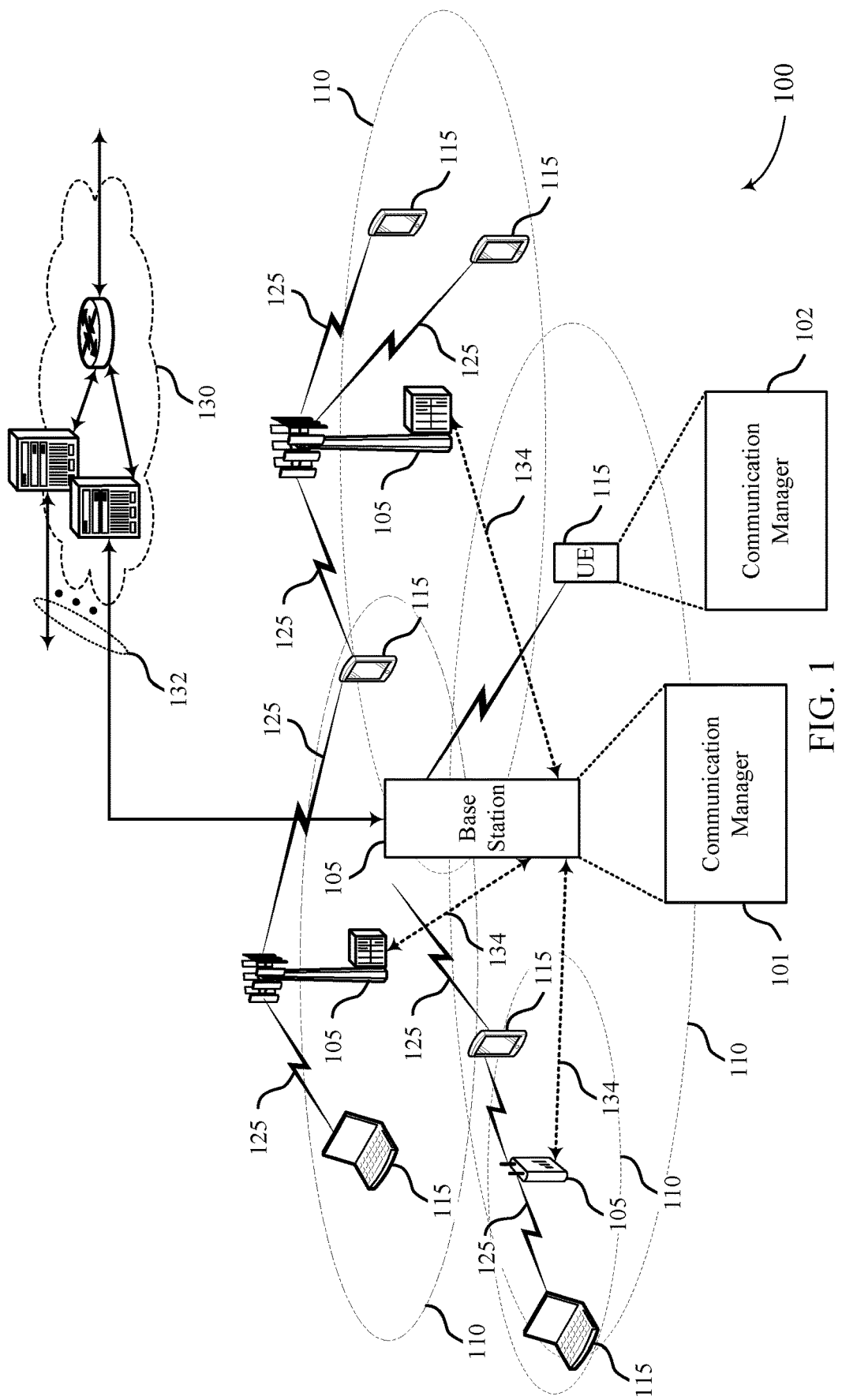
FIG. 1 illustrates an example of a system for wireless communication that supports techniques for communicating mobility information in accordance with one or more aspects of the present disclosure.

A UE may move throughout a coverage of a wireless communication system. To maintain the connectivity of the UE as it moves through a coverage area, the UE may be transferred (e.g., handed-over) to new cells using one or more handover procedures. Network topologies may result in locations or areas where handover procedures are less than optimal and one or more RLF events may occur with a greater frequency. To address certain network topologies, a wireless communication system may be configured to have UEs report details about RLF events. The reporting of information about RLF events may be part of mobility robustness optimization (MRO) procedures implemented by the wireless communication system. The wireless communication system may adjust its handover factors based on the feedback associated with RLF events. In addition, wireless communication systems may utilize directional beams and dual connectivity. The feedback associated with RLF events may be configured to include information about these types of networks.

Techniques are described herein for providing feedback about RLF events that includes information about directional beams. A UE may experience an RLF event and lose connectivity with a network. After the UE reestablishes an RRC connection with the network, the UE may transmit an RLF report that includes information about directional beams, information about a master node and a secondary node in a dual-connectivity procedure, information associated with conditional handover procedures, or information about service time interruptions, or a combination thereof. One or more base stations may be configured to transmit at least portions of the information in the RLF report to other base stations as part of a message that may be an example of an RLF indication or a handover report. The message may be transmitted over an X2 interface or an Xn interface. Aspects of the disclosure are initially described in the context of a wireless communications system. Aspects of the disclosure are further illustrated by and described with reference to process flow diagrams. Aspects of the disclosure are further illustrated by and described with reference to apparatus diagrams, system diagrams, and flowcharts that relate to techniques for communicating mobility information.

In one or more aspects, the described techniques may support improvements in system efficiency such that a device may avoid inefficiently continuing to use a set of communication characteristics associated with an RLF event. For example, a first device may experience an RLF event with a second device using certain communication characteristics and may report the communication characteristics associated with the RLF event in an RLF report, which may enable the first device or the second device, or both, to adjust one or more communication characteristics based on the RLF report. As such, the communications system may feature enhanced network reliability and robustness, which may increase system efficiency and reduce a number of potential retransmissions (e.g., compared to if the first device and the second device continued to use the same communication characteristics). Moreover, the communications system may be associated with less interference based on a reduced number of retransmissions, which may further increase network reliability.

FIG. 1 illustrates an example of a wireless communications system 100 that supports techniques for communicating mobility information in accordance with one or more aspects of the present disclosure. The wireless communications system 100 includes base stations 105, (e.g., gNodeBs (gNBs), and/or radio heads (RHs)), UEs 115, and a core network 130. In some examples, the wireless communications system 100 may be an LTE network, an LTE-A network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. A UE 115 may communicate with the core network 130 through communication link 135. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. As used herein, the term "cell" may refer to a node, a cell group (e.g., an MCG or an SCG), a base station, an eNB, a gNB, etc. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an EPC, which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Techniques are described herein for providing feedback about RLF events that includes information about directional beams. A UE may experience an RLF event and lose connectivity with a network. After the UE reestablishes an RRC connection with the network, the UE may transmit an RLF report that include information about directional beams, information about a master node and a secondary node in a dual-connectivity procedure, information associated conditional handover procedures, or information about service time interruptions, or a combination thereof. One or more base stations may be configured to transmit at least portions of the information in the RLF report to other base stations as part of a message that may be an example of an RLF indication or a handover report. The message may be transmitted over an X2 interface or an Xn interface.

One or more of the base stations 105 may include a communication manager 101, which may receive information related to an RLF event from a UE 115 and may transmit that information to other base stations 105 using a message (e.g., RLF indication or handover report). The RLF information may include information about directional beams, information about a master node and a secondary node in a dual-connectivity procedure, information associated conditional handover procedures, or information about service time interruptions, or a combination thereof.

UEs 115 may include a communication manager 102, which may identify an RLF event and may transmit an RLF report to the network after an RRC connection is reestablished. The RLF report may include information about directional beams, information about a master node and a secondary node in a dual-connectivity procedure, information associated conditional handover procedures, or information about service time interruptions, or a combination thereof.

Figure 2C:
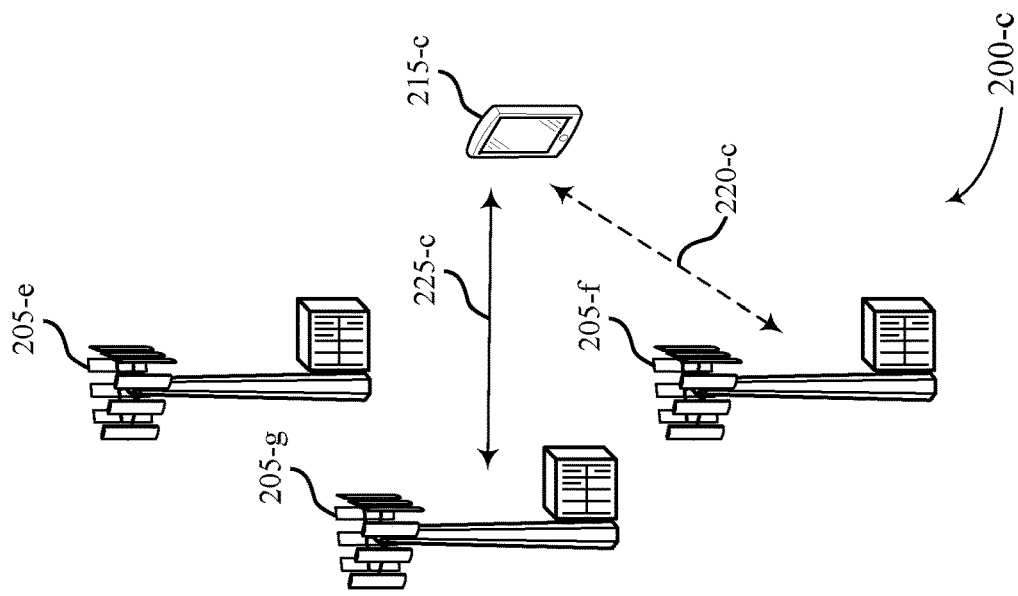
FIGS. 2A-2C illustrate examples of handover procedures that supports techniques for communicating mobility information in accordance with one or more aspects of the present disclosure.
Figure 2B:
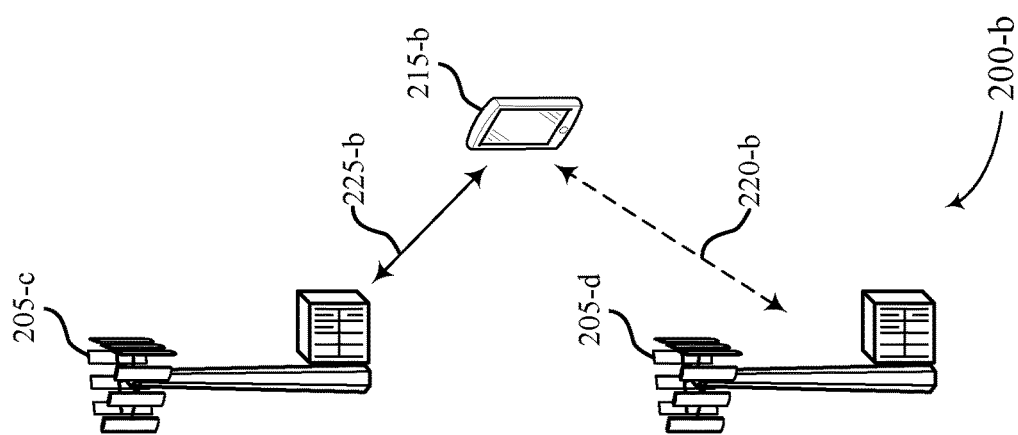
Figure 2A:
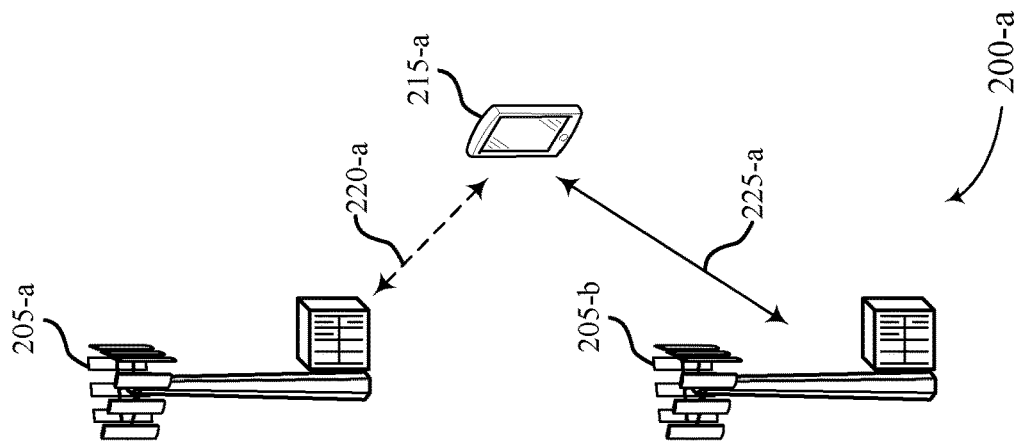

FIGS. 2A-2C illustrate examples of handover procedures that support techniques for communicating mobility information in accordance with one or more aspects of the present disclosure. In some examples, the handover procedures may implement aspects of wireless communications system 100. The wireless communications system 100 may support mobility robust procedures for networks that use directional beams (e.g., 5G).

FIG. 2A illustrates a too-late handover procedure 200-a. In the too-late handover procedure, the UE 215-a may experience an RLF event 220-a with the cell 205-a, which may be a source cell, before the handover procedure is initiated or completed. Thus, a handover from a cell 205-a may be initiated too late and the UE 215-a may experience an RLF event with the source. The UE 215-a may attempt to reestablish an RRC connection 225-a and/or a radio link with a cell 205-b, which may be a target cell. After successfully reestablishing the RRC connection 225-a, the UE 215-a may transmit an RLF report including RLF information to the cell 205-b. The RLF report may allow the UE 215-a to assist the network in reducing the frequency of RLF events by adjusting one or more handover parameters.

FIG. 2B illustrates a too-early handover procedure 200-b. In the too-early handover procedure, the UE 215-b may experience an RLF event 220-b with a cell 205-d, which may be a target cell, before the handover procedure is initiated or completed. Thus, a handover from a cell 205-c may be initiated too early and the UE 215-b may experience an RLF event with the target. The UE 215-b may attempt to reestablish an RRC connection 225-b and/or a radio link with the cell 205-c, which may be a source cell. After successfully reestablishing the RRC connection 225-b, the UE 215-b may transmit an RLF report including RLF information to the cell 205-c. The RLF report may allow the UE 215-b to assist the network in reducing the frequency of RLF events by adjusting one or more handover parameters.

FIG. 2C illustrates a wrong-cell handover procedure 200-c. In the wrong-cell handover procedure, a handover from a cell 205-e may be initiated with a cell 205-f rather than a cell 205-g. The UE 215-c may experience an RLF event 220-c with the cell 205-f, which may be a target cell, before the handover procedure is initiated or completed. The UE 215-c may attempt to reestablish an RRC connection 225-c and/or a radio link with the cell 205-g, which may be a third cell. After successfully reestablishing the RRC connection 225-c, the UE 215-c may transmit an RLF report including RLF information to the cell 205-g. The RLF report may allow the UE 215-c to assist the network in reducing the frequency of RLF events by adjusting one or more handover parameters.

The UE may experience an RLF event due to a variety of reasons. In some examples, the RLF may be associated with a connection failure due to an intra-RAT mobility of the UE within the 5GC. In some examples, the RLF may be associated with a connection failure due to an inter-RAT mobility of the UE within the 5GC. In some examples, the RLF may be associated with a connection failure due to an inter-system mobility of the UE. In some examples, the inter-system mobility of the UE may include a handover from the 5GC to the EPC, or vice versa. In some examples, the mobility case of the UE may include a single connectivity handover case or a dual connectivity handover case.

In some implementations, the UE may experience an RLF event with a first cell associated with a first RAT and may attempt to reestablish a connection (e.g., an RRC connection) with a second cell associated with a second RAT. The RLF event may be associated with an inter-RAT mobility of the UE or an inter-system mobility of the UE from the 5GC to the EPC, or vice versa. For instance, the UE may experience an RLF event with a cell associated with the 5GC and may attempt to reestablish a connection with a first cell associated with the EPC. Accordingly, the UE may establish a connection with the first cell associated with the EPC and, in some examples, may transmit an RLF report to the cell associated with the EPC including information about the RLF event with a second cell associated with the 5GC. In some examples, the first cell and the second cell may be different. In some other examples, the first cell and the second cell may be the same.

The UE may experience an RLF event when the UE is in Multi-RAT Dual Connectivity (MR-DC) configuration. In some examples, a master node of the dual-connectivity configuration may fail. The RLF information may include a signal strength, a frequency, a cell identity, other parameters, or a combination thereof. In some examples, the RLF may include the master node and a secondary node.

The UE may indicate via a flag to the cell that RLF information is available for reporting after the RRC connection setup in the reestablishment failure case. In some examples, the UE may include the flag in an RRC connection reestablishment complete message, an RRC connection setup complete message, an RRC connection reconfiguration complete message, another RRC message, or a combination thereof. The network may respond to the flag with a request that the UE report the RLF information using a UE information request.

The RLF report may include one or more radio measurements, such as a C-RNTI of the master node and/or the secondary node, a cell identity, an indication of a cause of the RLF, time information, location information, the UE RLF report container, an indication of a beam, a service interruption time, a conditional handover failure report, another report, or a combination thereof. In some examples, the radio measurements may include a signal strength (e.g., an RSRP or a RSRQ) of the last serving cell, including an MCG and an SCG measurement; a signal strength, a frequency, and an identity of a neighboring cell as configured by the master node and/or the secondary node; other radio measurements; or a combination thereof. In some examples, the cell identity may include a cell identity of the failed cell, including an identity of the associated master node and/or the associated secondary node; an identity of a previous primary cell (PCell), where the previous PCell may be a source PCell when a last RRC reconfiguration message and a last mobility control information was received; an identity of a previous primary secondary cell (PSCell), where the previous PSCell may be a source PSCell when the last RRC reconfiguration message and the last mobility control information was received; an identity of a reestablishment cell, where the reestablishment cell may be a cell in which a reestablishment attempt was made after the connection failure; another cell identity; or a combination thereof. In some examples, the indication of the cause of the RLF may indicate the RLF was caused by a handover failure, a beam recovery failure (BRF), etc. In some examples, the time information may include an indication of a time elapsed between an initialization of the handover and the connection failure, an indication of a time elapsed between the connection failure and a delivery of the RLF report, etc. In some examples, the indication of the beam may include a beam identifier, a beam measurement, etc. In some examples, the conditional handover failure report may include a candidate cell list, a list of cells attempted after the RLF, an attempted number after the RLF, etc.

In some examples, a BRF may trigger the RLF report. The UE may declare the RLF when an unrecoverable beam failure occurs. In some examples, the unrecoverable beam failure may occur when the UE fails to detect a suitable beam for a beam recovery. The UE may initiate an RRC reestablish procedure, and transmit the RLF indication to the network. In some examples, the RLF indication may indicate the RLF report is available with a beam measurement result. The UE may include the indication of the cause of the RLF. In some examples, the indication of the cause of the RLF may include an indication of the BRF. The network may detect a hole in a beam coverage based on the indication of the BRF, and reconfigure a beam resource distribution based on detecting the hole in beam coverage.

In some examples, the UE may transmit the RLF information in a beam report. In a single or a dual connectivity case, the beam report may be transmitted after a handover failure. In some examples, the beam report may be a BRF triggered RLF report.

In some examples, the UE may transmit the RLF report independent of the RAT type. For an RLF event at a cell in the 5GC, the UE may transmit the RLF report to the 5GC or to the EPC. For an RLF event at a cell in the EPC, the UE may transmit the RLF report to the 5GC or to the EPC.

In some examples, the UE may determine whether to transmit the RLF report based on the RAT type. For the RLF event at the cell in the 5GC, the UE may transmit the RLF report to the 5GC, but not to the EPC. For the RLF event at the cell in the EPC, the UE may transmit the RLF report to the EPC, but not to the 5GC.

In some examples, the handover procedure may include a handover from a first system (e.g., the 5GC) to a second system (e.g., the EPC), which may be referred to as an inter-system mobility case. The inter-system mobility case may include a connection failure. The connection failure may include an RLF event or a ping pong event. The ping pong event may include a plurality of handovers between the systems, which may result in unnecessary signaling between the UE and the systems. In some examples, the connection failure may occur in the single connectivity handover case or the dual connectivity handover.

In some examples, the too-late handover procedure may occur during a handover from the 5GC to the EPC. The connection failure may occur while the UE is connected with a source cell in the 5GC in the single connectivity or the dual connectivity case. There may be no recent handover for the UE prior to the connection failure. The UE may attempt to reestablish the radio link with a target cell in the EPC (e.g., an eNB connecting with the EPC).

In some examples, the too-early handover procedure may occur during a handover from the EPC to the 5GC. The connection failure may occur when the UE attempts to connect with a target cell in the 5GC after a recent inter-system handover. The RLF may occur after a handover from a source cell in the EPC to the target cell in the 5GC, which may have single connectivity or dual connectivity. The UE may attempt to reconnect with the source cell in the EPC or to another source cell in the EPC.

In some examples, the UE may send the RLF report after connecting with the target cell in the 5GC. In some examples, the UE may send the RLF report to the EPC, and the EPC may forward the report to the 5GC via a radio access network (RAN) information management (RIM) procedure.

In some examples, the RLF report may include a cell identity of a cell in the EPC where the UE connects after the connection failure. The cell identity may include a PCID of the source cell in the EPC that the UE selects after the RLF is detected. Additionally or alternatively, the cell identity may include the PCID and a cell global identity (CGI) of a source cell in the EPC from a last handover to the EPC in which the RLF occurred at a target PCell, which may have single connectivity or dual connectivity.

In some examples, the RLF report may include a dual connectivity indication if the cell in the 5GC has dual connectivity when the RLF occurs. In some examples, the dual connectivity indication may include a CGI of the source cell in the 5GC, including the master node PCell CGI and the secondary node PSCell CGI, respectively. In some examples, the dual connectivity indication may include a CGI of the failure cell in the 5GC, including the master node PCell CGI and the secondary node PSCell CGI, respectively.

In some examples, the RLF report may include information about a preamble. The RLF report may include a transmission power of the preamble, a number of attempts to successfully send the preamble, a number of transmissions before receiving an acknowledgement that the preamble was received, an RSRP, or an L1 RSRP, or a combination thereof. In some examples, the transmission power of the preamble may be a UE transmission power to successfully send the preamble. In some examples, the preamble may be a RACH preamble.

In some examples, the UE may transmit a handover report. The handover report may include a conditional handover failure report. In some examples, the conditional handover failure report may include the RLF information, an evaluation time, a candidate cell measurement result, an identified beam, or a combination thereof. In some examples, the conditional handover failure report and the RLF information may be forwarded to a plurality of candidate target cells. In some examples, the conditional handover failure report and the RLF information may be transmitted to the secondary node over an Xn or X2 interface for the inter-system or intra-system mobility cases. In some examples, the UE may transmit a service interruption time report including a length of time of a service interruption during the handover procedure.

In some examples, the UE may transmit the handover report and the RLF information if the connection failure occurs while connecting with a cell in the 5GC with dual connectivity in the EPC and the UE attempts to reconnect with a second cell in the 5GC. The RLF indication may be forwarded over the Xn interface from the second cell in the 5GC to a last serving secondary node, which may in turn forward the RLF indication to a last serving master node. The secondary node may support a standalone or non-standalone configuration. The RLF indication may be routed directly to the last serving master node via the secondary node over the Xn interface or the X2 interface without involving the 5GC.

The UE may receive a conditional handover configuration before performing the handover procedure. The conditional handover configuration may improve mobility robustness and reduce RLF occurrence. The conditional handover configuration may include candidate target cell configurations and one or more conditions for performing the handover procedure. If the one or more conditions are met, the UE may initiate a RACH procedure to connect to the target cell. In some cases, the UE may perform the handover procedure without sending a measurement report (MR) or waiting for an RRC reconfiguration.

The UE may transmit the conditional handover failure report if the one or more conditions are not met. The conditional handover failure report may include one or more of a time indication, a candidate target cell list, an attempted cell list, etc. In some examples, the time indication may indicate a time elapsed from a last handover initialization until the connection failure. In some examples, the candidate target cell list may include a list of corresponding measurement results including a beam quality. In some examples, the attempted cell list may include a number of connection attempts after the RLF occurs.

The handover report may include the conditional handover failure report. The handover report may be forwarded to one or more candidate target cells. The one or more candidate target cells may adjust one or more handover parameters based on the handover report. In some examples, the handover report may be forwarded to the one or more candidate target cells from the source cell. Additionally or alternatively, the handover report may be forwarded to the one or more candidate target cells from the serving cell via the source cell.

In some cases, the UE may transmit a service interruption time report, which may indicate a service interruption time that occurs during the handover procedure. The UE may transmit the service interruption time report to the network. The network may adjust a resource configuration and/or a resource scheduling based on the service interruption time report and a UE traffic interruption requirement. In some examples, the service interruption time may include a duration between a time when the UE loses a data transmission capability at the source cell and a time when the UE may resume data transmission at the target cell. Additionally or alternatively, the service interruption time may include a duration between a time when the UE receives a handover command from the source cell and a time when the UE transmits an RRC reconfiguration complete message to the target cell. The UE may indicate the service interruption time report is available after connection to the target cell. In some examples, the service interruption time may include a service interruption time per node in the dual connectivity case. The network may request via a UE information request message that the UE transmit the service interruption time report. The UE may transmit the service interruption time report via a UE information response message. In some examples, the service interruption time may be forwarded to the source cell. The source cell may adjust a radio resource configuration and/or a radio resource scheduling based on the service interruption time.

In some examples, the handover report may include a handover report type, a handover cause, and/or a UE RLF report container. Additionally or alternatively, the handover report may include the source cell CGI, including the master node PCell CGI and the secondary node PSCell CGI, respectively, in the dual connectivity case. Additionally or alternatively, the handover report may include the failure cell CGI, including the master node PCell CGI and the secondary node PSCell CGI, respectively, in the dual connectivity case. Additionally or alternatively, the handover report may include the reestablishment cell CGI, including the master node PCell CGI and the secondary node PSCell CGI, respectively, in the dual connectivity case.

In some examples, the RLF indication and/or the handover report may be sent from the new serving cell to the source secondary node. The source secondary node may forward the RLF indication and/or the handover report to the source master node via the Xn interface or the X2 interface.

The 5GC may adjust the one or more handover parameters based on a real time RLF reporting and/or a non-real time RLF reporting. In some examples, including when the UE performs the too-late handover procedure, the real time RLF reporting may include the UE declaring the RLF in the source cell and recovering in the target cell. In some examples, including when the UE performs the too-early handover procedure, the real time RLF reporting may include the UE declaring the RLF in the target cell and recovering in the source cell. In some examples, including when the UE performs the wrong-cell handover procedure, the real time RLF reporting may include the UE declaring the RLF in the target cell and recovering in the third cell. In some examples, the non-real time RLF reporting may include the UE reporting the RLF information after the RRC connection setup in the reestablishment failure case.

Figure 3:
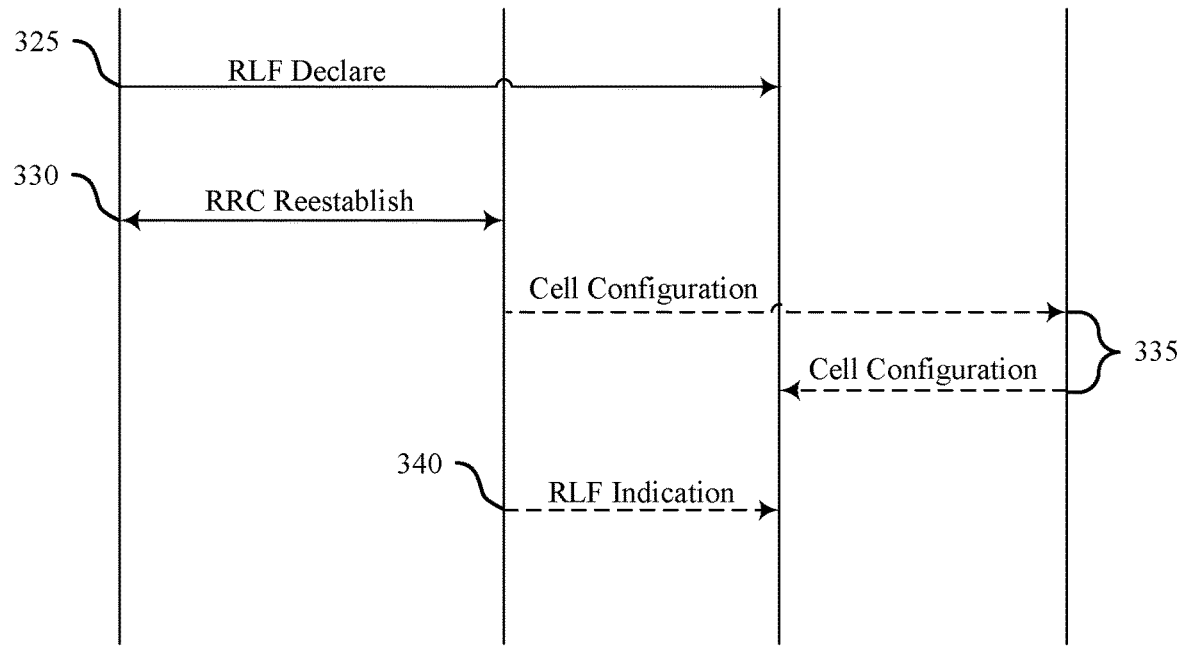
FIG. 3 illustrates an example of a process flow that supports techniques for communicating mobility information in accordance with one or more aspects of the present disclosure.

FIG. 3 illustrates an example of a process flow 300 that supports techniques for communicating mobility information in accordance with one or more aspects of the present disclosure. In some examples, process flow 300 may implement aspects of wireless communications system 100.

In a too-late handover procedure, the handover may be initiated too late and a UE 305 may experience an RLF event with the source cell 315 before the handover procedure is initiated or completed. The UE may attempt to reestablish an RRC connection and/or a radio link with the target cell 310. After successfully reestablishing the RRC connection, the UE 305 may transmit an RLF report including RLF information to the target cell 310.

At 325, the UE 305 may identify an RLF event based on the too-late handover. The UE 305 may declare the RLF event in the source cell 315. For example, the UE 305 may include a flag in a message to indicate that the UE 305 has an RLF report to be communicated to the network.

At 330, the UE 305 may reestablish the RRC connection with the target cell 310 based on identifying the RLF event, according to the RRC reestablishment procedure as described with reference to FIG. 6. The UE 305 may transmit the RLF report to the target cell 310 based on reestablishing the RRC connection. In some examples, the RLF report may include information about one or more directional beams associated with the RLF event.

The target cell 310 may transmit a message to the source cell 315, either directly or indirectly, that indicates at least a portion of the RLF information. The message may be an example of an RLF indication or a handover report. In some cases, the message may be communicated indirectly to the source cell 315 through one or more components of the core network—e.g., the cell configuration at 335. In some cases, the message may be communicated directly to the source cell 315—e.g., RLF indication at 340.

At 335, the target cell 310 may optionally transmit a cell configuration message to the network 320 based on receiving the RLF report from the UE 305. The network 320 may forward the cell configuration message to the source cell 315. In some examples, the cell configuration message may include a portion of the information about the one or more directional beams associated with the RLF event.

At 340, the target cell 310 may optionally transmit an RLF indication to the source cell 315 based on receiving the RLF report from the UE 305. In some aspects, the target cell 310 may transmit the RLF indication to the source cell 315 based on identifying that the RLF event is associated with a too-late handover procedure. In some examples, the RLF indication may include a portion of the information about the one or more directional beams associated with the RLF event. In some implementations, the target cell 310 may transmit the RLF indication to the source cell 315 at 340 if the target cell 310 transmits the cell configuration message to the network 320 at 335. In some other implementations, the target cell 310 may transmit the RLF indication to the source cell 315 at 340 if the target cell does not transmit the cell configuration message to the network 320 at 340. In some other implementations, the target cell 310 may not transmit the RLF indication to the source cell 315 at 340 if the target cell 310 transmits the cell configuration message to the network 320 at 340.

Figure 4:
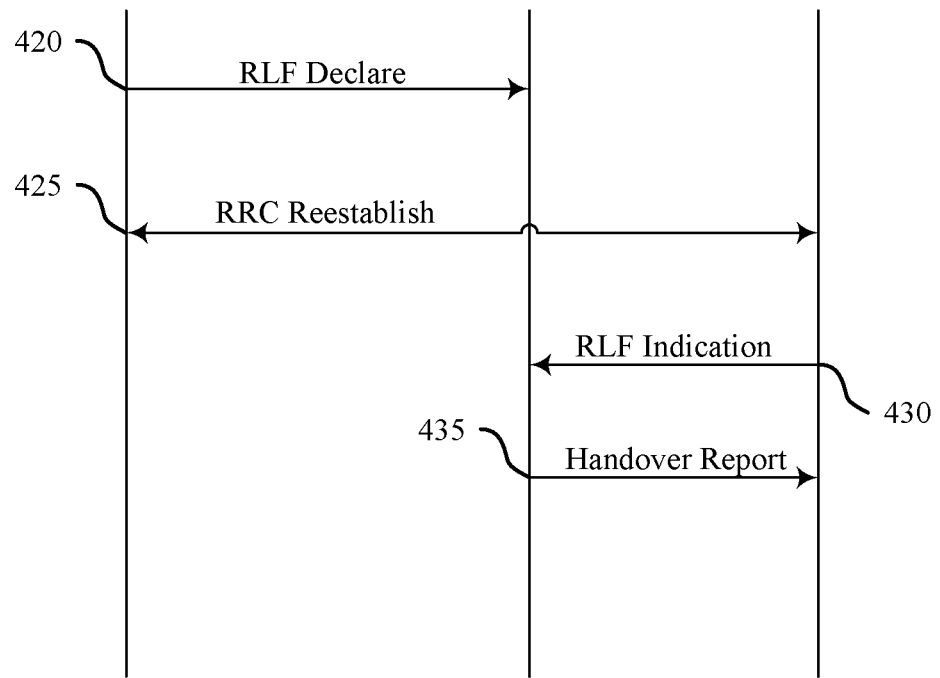
FIG. 4 illustrates an example of a process flow that supports techniques for communicating mobility information in accordance with one or more aspects of the present disclosure.

FIG. 4 illustrates an example of a process flow 400 that supports techniques for communicating mobility information in accordance with one or more aspects of the present disclosure. In some examples, process flow 400 may implement aspects of wireless communications system 100.

In a too-early handover procedure, the handover may be initiated too early and a UE 405 may experience an RLF event with the target cell 410 before the handover procedure is initiated or completed. The UE 405 may attempt to reestablish an RRC connection and/or a radio link with the source cell 415. After successfully reestablishing the RRC connection, the UE 405 may transmit an RLF report including RLF information to the source cell 415.

At 420, the UE 405 may identify an RLF event based on the too-early handover. The UE 405 may declare the RLF event in the target cell 410. For example, the UE 405 may include a flag in a message to indicate that the UE 405 has an RLF report to be communicated to the network At 425, the UE 405 may reestablish the RRC connection with the source cell 415 based on identifying the RLF event, according to the RRC reestablishment procedure as described with reference to FIG. 6. The UE 405 may transmit the RLF report to the source cell 415 based on reestablishing the RRC connection. In some examples, the RLF report may include information about one or more directional beams associated with the RLF event.

The source cell 415 may transmit a message to the target cell 410, either directly or indirectly, that indicates at least a portion of the RLF information. The message may be an example of an RLF indication or a handover report. In some cases, the message may be communicated indirectly to the source cell 415 through one or more components of the core network. In some cases, the message may be communicated directly to the source cell 415—e.g., RLF indication at 430.

At 430, the source cell 415 may transmit an RLF indication to the target cell 410 based on receiving the RLF report from the UE 405. In some examples, the RLF indication may include a portion of the information about the one or more directional beams associated with the RLF event.

At 435, the target cell 410 may transmit a handover report to the source cell 415. In some implementations, the target cell 410 may transmit the handover report to the source cell 415 based on identifying that the RLF event is associated with a too-early handover procedure. In some examples, the handover report may include a handover report type, a handover cause, and/or a UE RLF report container. Additionally or alternatively, the handover report may include the source cell CGI, including the master node PCell CGI and the secondary node PSCell CGI respectively in the dual connectivity case. Additionally or alternatively, the handover report may include the failure cell CGI, including the master node PCell CGI and the secondary node PSCell CGI respectively in the dual connectivity case. Additionally or alternatively, the handover report may include the reestablishment cell CGI, including the master node PCell CGI and the secondary node PSCell CGI respectively in the dual connectivity case.

Figure 5:
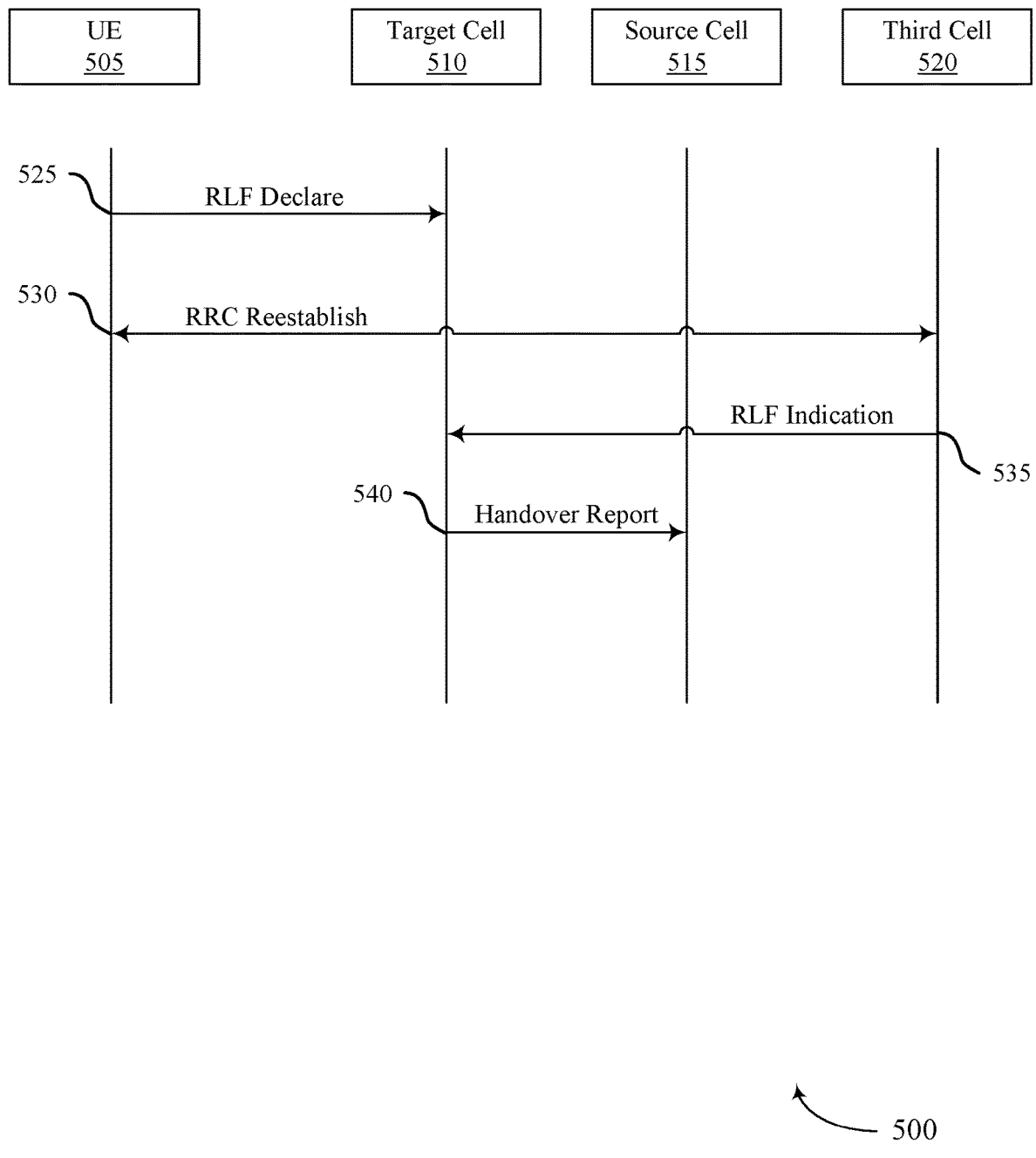
FIG. 5 illustrates an example of a process flow that supports techniques for communicating mobility information in accordance with one or more aspects of the present disclosure.

FIG. 5 illustrates an example of a process flow 500 that supports techniques for communicating mobility information in accordance with one or more aspects of the present disclosure. In some examples, process flow 500 may implement aspects of wireless communications system 100.

In a wrong-cell handover procedure, the handover from a source cell 515 may be initiated with a target cell 510 rather than a third cell 520. A UE 505 may experience an RLF event with the target cell 510 before the handover procedure is initiated or completed. The UE 505 may attempt to reestablish an RRC connection and/or a radio link with the third cell 520. After successfully reestablishing the RRC connection, the UE 505 may transmit an RLF report including RLF information to the third cell 520.

At 525, the UE 505 may identify an RLF event based on the wrong-cell handover. The UE 505 may declare the RLF event in the target cell 510. For example, the UE 505 may include a flag in a message to indicate that the UE 505 has an RLF report to be communicated to the network The third cell 520 may transmit a message to the target cell 510, the source cell 515, or a combination thereof. The message may be transmitted directly with these other cells or indirectly, or a combination thereof. The message may indicate at least a portion of the RLF information received from the UE 505. The message may be an example of an RLF indication or a handover report. In some cases, the message may be communicated indirectly to the target cell 510 or the source cell 515 through one or more components of the core network. In some cases, the message may be communicated directly to the target cell 510—e.g., RLF indication at 535.

At 530, the UE 505 may reestablish the RRC connection with the third cell 520 based on identifying the RLF event, according to the RRC reestablishment procedure as described with reference to FIG. 6. The UE 505 may transmit the RLF report to the third cell 520 based on reestablishing the RRC connection. In some examples, the RLF report may include information about one or more directional beams associated with the RLF event.

At 535, the third cell 520 may transmit an RLF indication to the target cell 510 based on receiving the RLF report from the UE 505. In some examples, the RLF indication may include a portion of the information about the one or more directional beams associated with the RLF event.

At 540, the target cell 510 may transmit a handover report to the source cell 515. In some implementations, the target cell 510 may transmit the handover report to the source cell 515 based on identifying that the RLF event is associated with a wrong-cell handover procedure. In some examples, the handover report may include a handover report type, a handover cause, and/or a UE RLF report container. Additionally or alternatively, the handover report may include the source cell CGI, including the master node PCell CGI and the secondary node PSCell CGI respectively in the dual connectivity case. Additionally or alternatively, the handover report may include the failure cell CGI, including the master node PCell CGI and the secondary node PSCell CGI respectively in the dual connectivity case. Additionally or alternatively, the handover report may include the reestablishment cell CGI, including the master node PCell CGI and the secondary node PSCell CGI respectively in the dual connectivity case.

Figure 6:
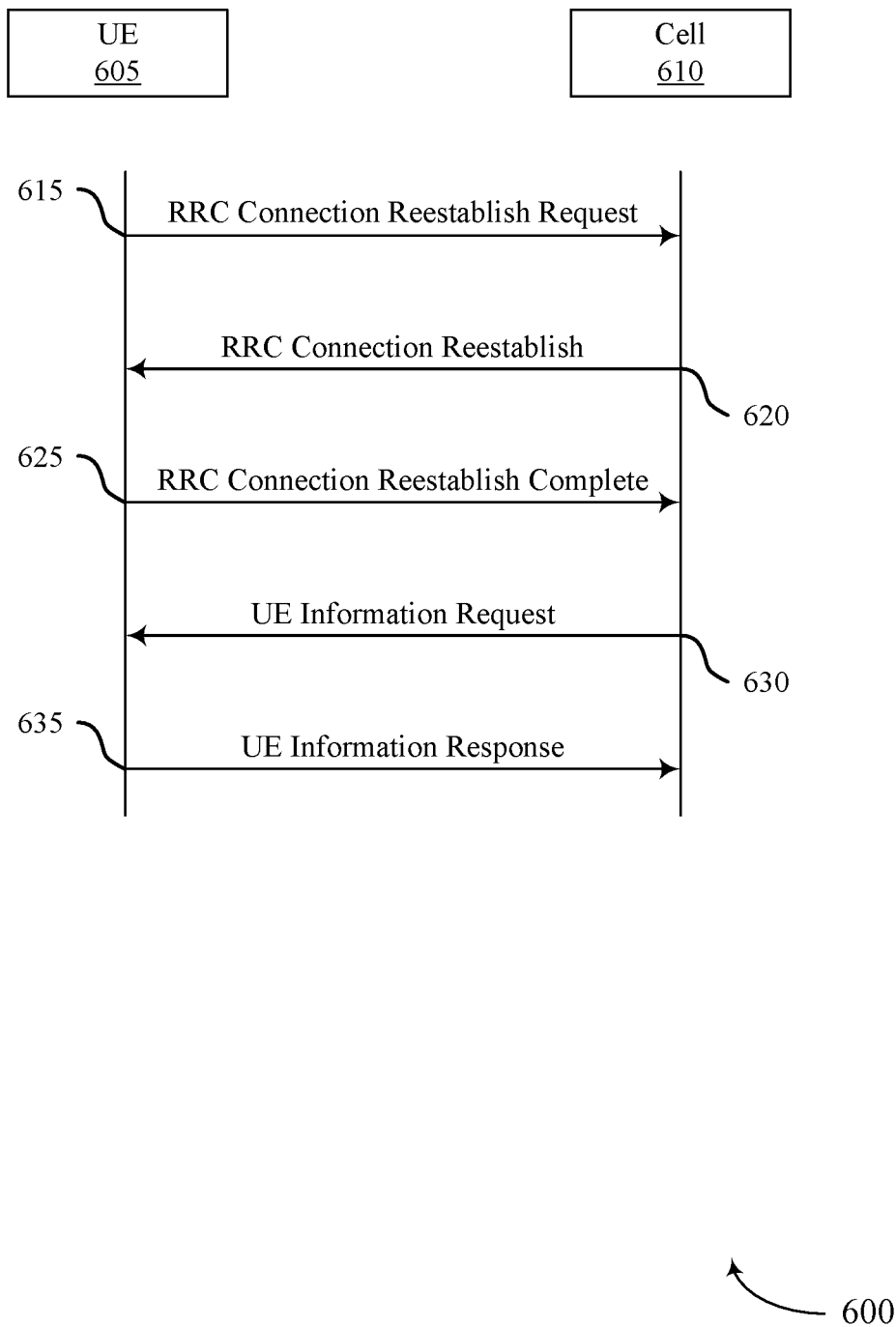
FIG. 6 illustrates an example of a process flow that supports techniques for communicating mobility information in accordance with one or more aspects of the present disclosure.

FIG. 6 illustrates an example of a process flow 600 that supports techniques for communicating mobility information in accordance with one or more aspects of the present disclosure. In some examples, process flow 600 may implement aspects of wireless communications system 100. The process flow 600 illustrates a method or methods for reestablishing an RRC connection, the UE indicating it has RLF information to communicate with the network, or the UE may transmit the RLF report to the network, or a combination thereof.

A UE 605 may indicate via a flag to a cell 610 that RLF information is available for reporting after reestablishing the RRC connection. In some examples, the UE 605 may include the flag in an RRC connection reestablishment complete message, an RRC connection setup complete message, an RRC connection reconfiguration complete message, another RRC message, or a combination thereof. The cell 610 may respond to the flag by transmitting a UE information request message to the UE 605. The UE information request message may include a request that the UE 605 report the RLF information in an RLF report. The UE 605 may transmit a UE information response message including the RLF report based on the UE information request message.

At 615, the UE 605 may transmit, and the cell 610 may receive, an RRC connection reestablishment request message. The RRC connection reestablishment request message may include a PCID of a cell in which the RLF occurs and/or a C-RNTI which identifies the UE 605.

At 620, the cell 610 may transmit, and the UE 605 may receive, an RRC connection reestablishment message based on the RRC connection reestablishment request message.

At 625, the UE 605 may transmit, and the cell 610 may receive, the RRC connection reestablishment complete message. The RRC connection reestablishment complete message may be transmitted based on receiving the RRC connection reestablishment message. In some examples, the RRC connection reestablishment complete message may include an indication that one or more RLF reports are available at the UE 605 to report to the network.

At 630, the cell 610 may transmit, and the UE 605 may receive, the UE information request message. The UE information request message may be transmitted based on receiving the RRC connection reestablishment complete message that includes the indication that the one or more RLF reports are available to report to the network. The UE information request message may include a request that the UE 605 transmit the one or more RLF reports to the network.

At 635, the UE 605 may transmit, and the cell 610 may receive, the UE information response message. The UE information response message may be transmitted based on receiving the UE information request message. The UE information response message may include the one or more RLF reports.

An RLF report transmitted by the UE may include information related to beam forming, dual-connectivity, service time interruptions, conditional handovers, or combinations thereof. The RLF report may include one or more radio measurements, a C-RNTI of the master node and/or the secondary node, a cell identity, an indication of a cause of the RLF, time information, location information, the UE RLF report container, an indication of a beam, a service interruption time, a conditional handover failure report, another report, or a combination thereof. In some examples, the radio measurements may include a signal strength (e.g., a RSRP or a RSRQ) of the last serving cell, including an MCG and a SCG measurement; a signal strength, a frequency, and an identity of a neighboring cell as configured by the master node and/or the secondary node; other radio measurements; or a combination thereof. In some examples, the cell identity may include a cell identity of the failed cell, including an identity of the associated master node and/or the associated secondary node; an identity of a previous PCell, where the previous PCell may be a source PCell when a last RRC reconfiguration message and a last mobility control information was received; an identity of a previous PSCell, where the previous PSCell may be a source PSCell when the last RRC reconfiguration message and the last mobility control information was received; an identity of a reestablishment cell, where the reestablishment cell may be a cell in which a reestablishment attempt was made after the connection failure; another cell identity; or a combination thereof. In some examples, the indication of the cause of the RLF may indicate the RLF was caused by a handover failure, a beam recovery failure, etc. In some examples, the time information may include an indication of a time elapsed between an initialization of the handover and the connection failure, an indication of a time elapsed between the connection failure and a delivery of the RLF report, etc. In some examples, the indication of the beam may include a beam identifier, a beam measurement, etc. In some examples, the conditional handover failure report may include a candidate cell list, a list of cells attempted after the RLF, an attempted number after the RLF, etc.

In some cases, the RLF report may include an indication of a cause of the RLF event. In some implementations, the indication may be included in a field of the RLF report that indicates a cause of the RLF event (e.g., a field dedicated to the indication of the cause of the RLF event). The field in the RLF report including the indication may sometimes be referred to as the connection failure type field. The field may indicate whether the failure was an RLF, a handover failure, a beam recovery failure, or a combination thereof. Because the field indicates more than two possible outcomes, the field may be two or more bits.

In some cases, the RLF report may include information about one or more RACH reports, a preamble, or a combination thereof. The RACH reports may include information about performing a RACH procedure to establish an uplink synchronization between the UE and the cell. The RLF report may include a transmission power of the preamble, a number of attempts to successfully send the preamble, a number of transmissions before receiving an acknowledgement that the preamble was received, an RSRP, or an L1 RSRP, or a combination thereof. In some examples, the transmission power of the preamble may be a UE transmission power to successfully send the preamble. In some examples, the preamble may be a RACH preamble. To successfully send the preamble includes sending one or more preambles and at least one of those preambles being received and decoded by an intended recipient (e.g., a base station).

Figure 7:
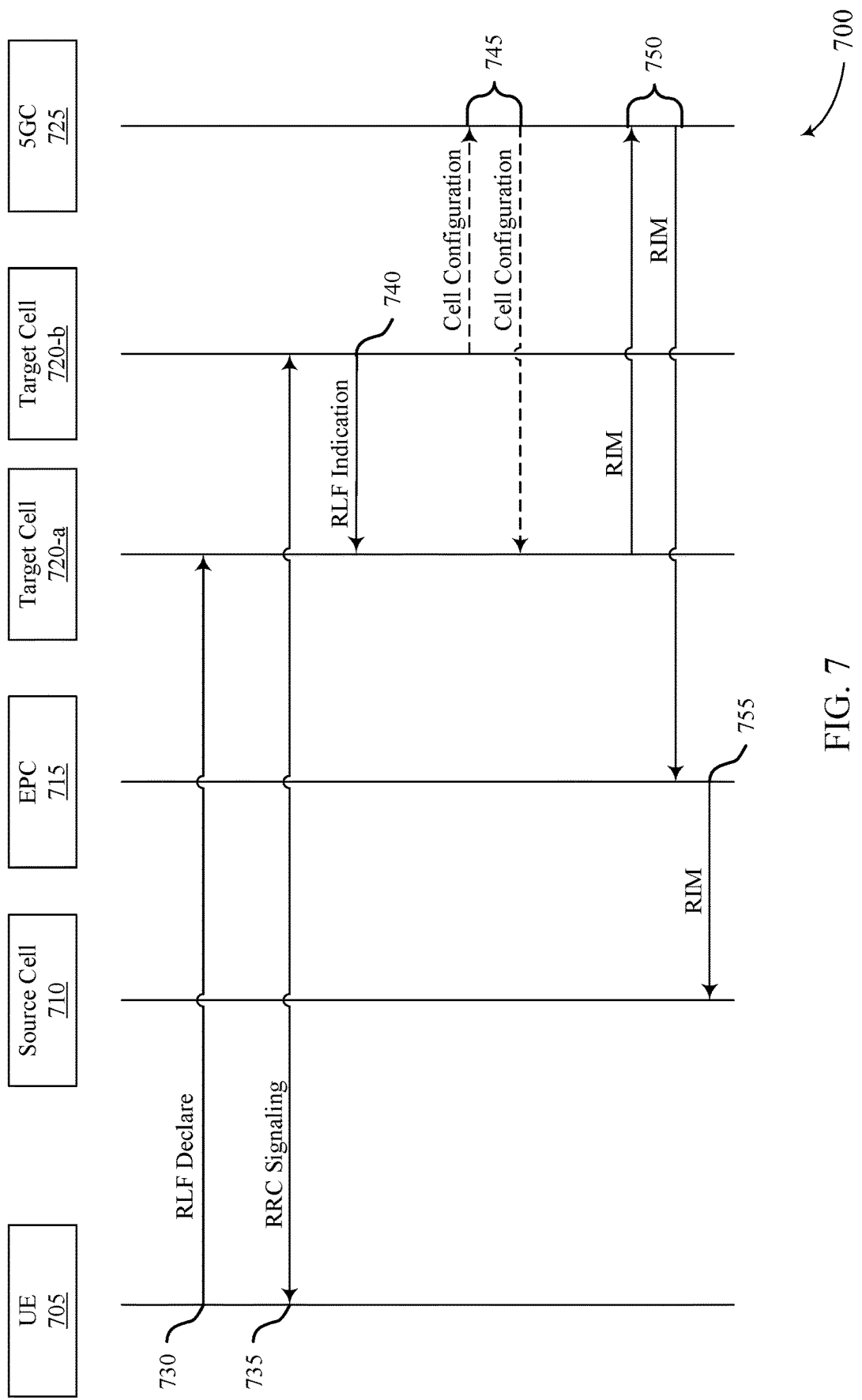
FIG. 7 illustrates an example of a process flow that supports techniques for communicating mobility information in accordance with one or more aspects of the present disclosure.

FIG. 7 illustrates an example of a process flow 700 that supports techniques for communicating mobility information in accordance with one or more aspects of the present disclosure. In some examples, process flow 700 may implement aspects of wireless communications system 100. The process flow 700 may illustrate an inter-system handover from an EPC system to a 5GC system and the RLF information is reported to the 5GC system.

A handover procedure may include a handover between different RATs (e.g., NR to LTE). Such handovers may be referred to as an inter-system handover from a first system (e.g., the EPC) to a second system (e.g., the NGC). The inter-system mobility case may include a connection failure. The connection failure may include an RLF event or a ping pong event. The ping pong event may include a plurality of handovers between the systems, which may result in unnecessary signaling between the UE and the systems. In some examples, the connection failure may occur in the single connectivity handover case or the dual connectivity handover.

The inter-system mobility case may include a wrong-cell handover procedure. In the wrong-cell handover procedure, the handover from a source cell 710, which may be a source cell connected to the EPC 715, may be initiated with a target cell 720-a rather than a target cell 720-b. Target cells 720-a and 720-b may be target cells connected to the 5GC 725. A UE 705 may experience an RLF event with the target cell 720-a before the handover procedure is initiated or completed. The UE 705 may attempt to reestablish an RRC connection and/or a radio link with the target cell 720-b. If an attempt to reestablish the RRC connection is successful, the UE 705 may transmit an RLF report including RLF information to the target cell 720-b. The target cell 720-b may forward the RLF report through the 5GC 725 and the EPC 715 to the source cell 710 via a RIM procedure.

At 730, the UE 705 may identify an RLF event based on the wrong-cell handover. The UE 705 may declare the RLF event in the target cell 720-a. For example, the UE 705 may include a flag in a message to indicate that the UE 705 has an RLF report to be communicated to the network At 735, the UE 705 may reestablish the RRC connection with the target cell 720-b based on identifying the RLF event, according to the RRC reestablishment procedure as described with reference to FIG. 6. The UE 705 may transmit the RLF report to the target cell 720-b based on reestablishing the RRC connection. In some examples, the RLF report may include information about one or more directional beams associated with the RLF event.

At 740, the target cell 720-b may transmit an RLF indication to the target cell 720-a based on receiving the RLF report from the UE 705. In some examples, the RLF indication may include a portion of the information about the one or more directional beams associated with the RLF event.

At 745, the target cell 720-b may optionally transmit a cell configuration message to the 5GC 725 based on receiving the RLF report from the UE 705. The 5GC 725 may forward the cell configuration message to the target cell 720-a. In some examples, the cell configuration message may include a portion of the information about the one or more directional beams associated with the RLF event.

At 750, the target cell 720-b may transmit a message including the RLF report to the 5GC 725 based on receiving the RLF report from the UE 705 via the RIM procedure. The 5GC 725 may forward the message to the EPC 715.

At 755, the EPC 715 may forward the message to the source cell 710 based on receiving the message from the 5GC 725. In some examples, the EPC 715 may forward the message to the source cell 710 based on identifying that the RLF event is associated with a wrong-cell handover procedure.

Figure 8:
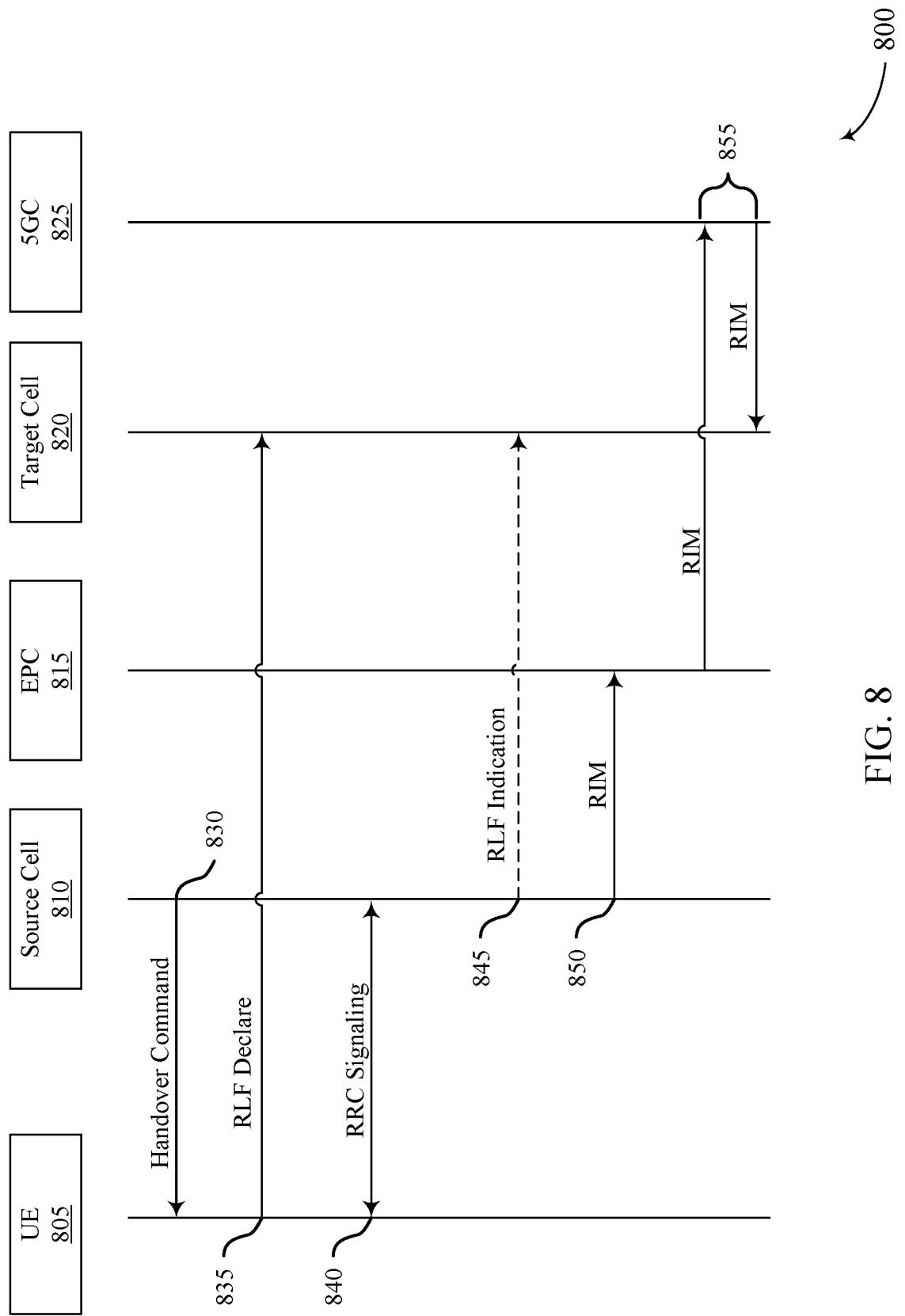
FIG. 8 illustrates an example of a process flow that supports techniques for communicating mobility information in accordance with one or more aspects of the present disclosure.

FIG. 8 illustrates an example of a process flow 800 that supports techniques for communicating mobility information in accordance with one or more aspects of the present disclosure. In some examples, process flow 800 may implement aspects of wireless communications system 100. The process flow 800 may illustrate an inter-system handover from an EPC system to a 5GC system and the RLF information is reported to the EPC system.

A handover procedure may include a handover from a first system (e.g., the EPC) to a second system (e.g., the NGC) in the inter-system mobility case. The inter-system mobility case may include a connection failure. The connection failure may include a too-early handover procedure. In the too-early handover procedure, the handover from a source cell 810, which may be a source cell in the EPC 815, may be initiated too early with a target cell 820, which may be a target cell in the 5GC 825. A UE 805 may experience an RLF event with the target cell 820 before the handover procedure is initiated or completed. The UE 805 may attempt to reestablish an RRC connection and/or a radio link with the source cell 810. After successfully reestablishing the RRC connection, the UE 805 may transmit an RLF report including RLF information to the source cell 810. The source cell 810 may forward the RLF report through the EPC 815 and the 5GC 825 to the target cell 820 via an RIM procedure based on the too-early handover procedure. In some examples, the source cell 810 may transmit an RLF indication including a portion of the RLF report directly to the target cell 820 based on the too-early handover procedure.

At 830, the source cell 810 may transmit, and the UE 805 may receive, a handover command to initiate a handover to the target cell 820. The UE 805 may initiate the handover procedure based on receiving the handover command. The handover may be initiated too early, and may include a too-early handover procedure.

At 835, the UE 805 may identify an RLF event based on the too-early handover. The UE 805 may declare the RLF event in the target cell 820. For example, the UE 805 may include a flag in a message to indicate that the UE 805 has an RLF report to be communicated to the network At 840, the UE 805 may reestablish the RRC connection with the source cell 810 based on identifying the RLF event, according to the RRC reestablishment procedure as described with reference to FIG. 6. The UE 805 may transmit the RLF report to the source cell 810 based on reestablishing the RRC connection. In some examples, the RLF report may include information about one or more directional beams associated with the RLF event.

At 845, the source cell 810 may optionally transmit an RLF indication directly to the target cell 820 based on receiving the RLF report from the UE 805. In some examples, the RLF indication may include a portion of the information about the one or more directional beams associated with the RLF event.

At 850, the source cell 810 may transmit a message including the RLF report to the EPC 815 based on receiving the RLF report from the UE 805 via the RIM procedure. In some examples, the source cell 810 may transmit the message including the RLF report to the EPC 815 based on identifying that the RLF event is associated with a too-early handover procedure.

At 855, the EPC 815 may forward the message to the 5GC 825 based on receiving the message from the source cell 810. The 5GC 825 may forward the message to the target cell 820. In some examples, the 5GC 825 may forward the message to the target cell 820 based on identifying that the RLF event is associated with a too-early handover procedure.

Figure 9:
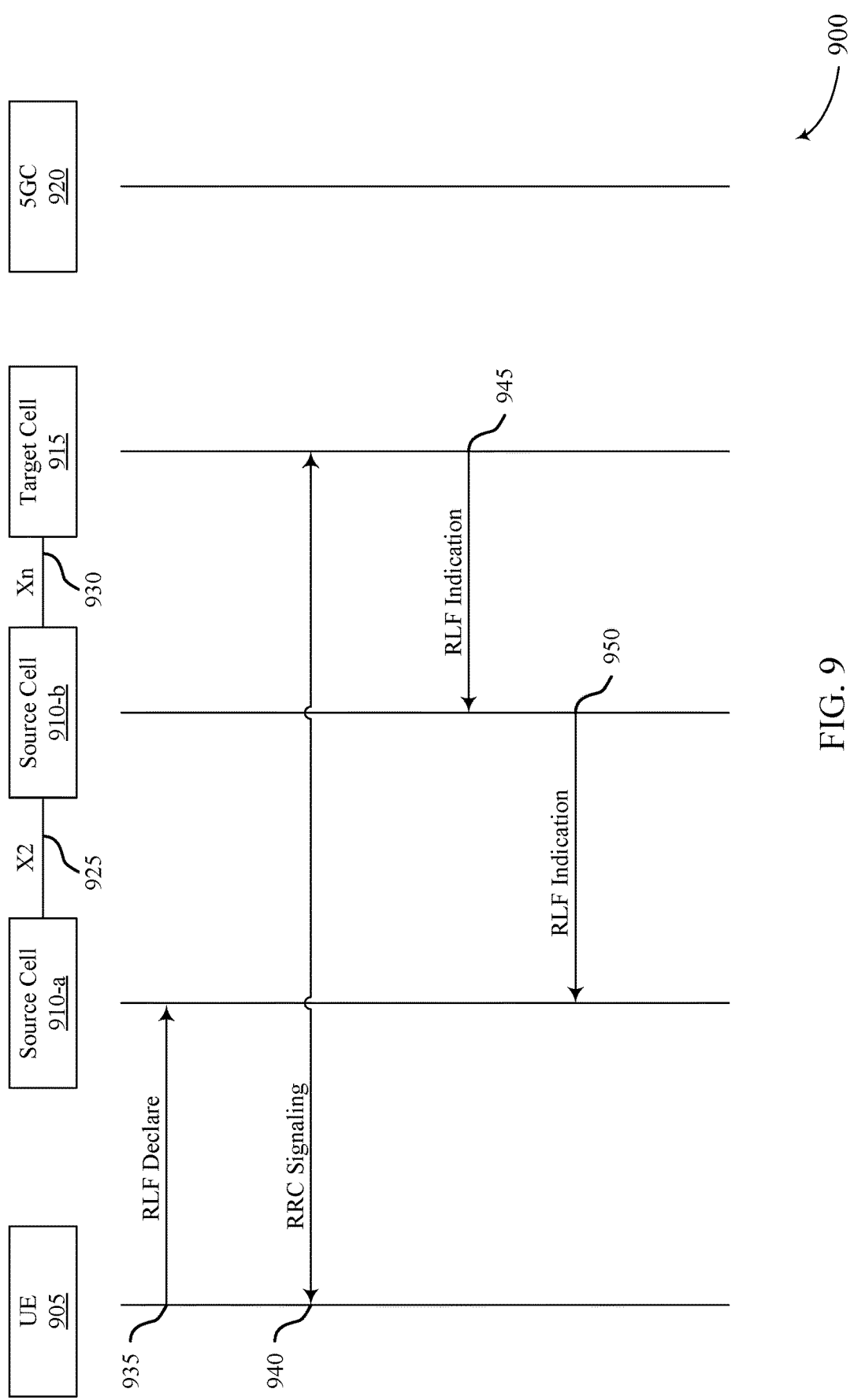
FIG. 9 illustrates an example of a process flow that supports techniques for communicating mobility information in accordance with one or more aspects of the present disclosure.

FIG. 9 illustrates an example of a process flow 900 that supports techniques for communicating mobility information in accordance with one or more aspects of the present disclosure. In some examples, process flow 900 may implement aspects of wireless communications system 100.

A connection failure may include a too-late handover procedure. In the too-late handover procedure, the handover may be initiated too-late and the UE 905 may experience an RLF event with the source cell 910-a before the handover procedure is initiated or completed. In some examples, the source cell 910-a may be a master node of a dual-connectivity source cell in the 5GC 920. The source cell 910-a may be in communication with a source cell 910-b via an X2 interface 925. The source cell 910-b may be a secondary node of the dual-connectivity source cell. Additionally or alternatively, a source cell may have dual connectivity with the EPC and the 5GC 920. The source cell 910-a may be a source cell in the EPC (e.g., an eNB in the EPC) and the source cell 910-b may be a source cell in the 5GC 920.

The UE 905 may attempt to reestablish an RRC connection and/or a radio link with the target cell 915. After successfully reestablishing the RRC connection, the UE 905 may transmit an RLF report including RLF information to the target cell 915. In some examples, the UE 905 may transmit the RLF report if the connection failure occurs while connecting with the source cell 910-a in the EPC with dual connectivity in the 5GC 920 via the source cell 910-b, and the UE attempts to reconnect with the target cell 915 in the 5GC 920. The target cell 915 may transmit one or more messages to other devices or cells (e.g., source cell 910) that includes at least some of the RLF information received from the UE 905. The message (e.g., RLF indication or handover report) may be transmitted over an Xn interface 930 from the target cell 915 to the source cell 910-b, which may in turn forward the message (e.g., RLF indication or handover report) to the source cell 910-a via the X2 interface 925. The source cell 910-b may support a standalone or non-standalone configuration. The message (e.g., RLF indication or handover report) may be routed directly to the source cell 910-a via the source cell 910-b over the Xn interface 930 or the X2 interface 925 without involving the 5GC 920. The message transmitted between cells may include any combination of the information included in the RLF report received from the UE 905.

At 935, the UE 905 may identify an RLF event. The UE 905 may declare the RLF event in the source cell 910-a. For example, the UE 905 may include a flag in a message to indicate that the UE 905 has an RLF report to be communicated to the network At 940, the UE 905 may reestablish the RRC connection with the target cell 915 based on identifying the RLF event, according to the RRC reestablishment procedure as described with reference to FIG. 6. The UE 905 may transmit the RLF report to the target cell 915 based on reestablishing the RRC connection. In some examples, the RLF report may include information about one or more directional beams associated with the RLF event.

At 945, the target cell 915 may transmit an RLF indication to the source cell 910-b based on receiving the RLF report from the UE 905. The target cell 915 may transmit the RLF indication via the Xn interface 930. In some examples, the RLF indication may include a portion of the information about the one or more directional beams associated with the RLF event.

At 950, the source cell 910-*b* may forward the RLF indication to the source cell 910-*a* based on receiving the RLF indication from the target cell 915. The source cell 910-*b* may forward the RLF indication to the source cell 910-*a* via the X2 interface 925. In some examples, the source cell 910-*b* may forward the RLF indication to the source cell 910-*a* based on identifying that the RLF event is associated with a too-late handover procedure.

Figure 10:
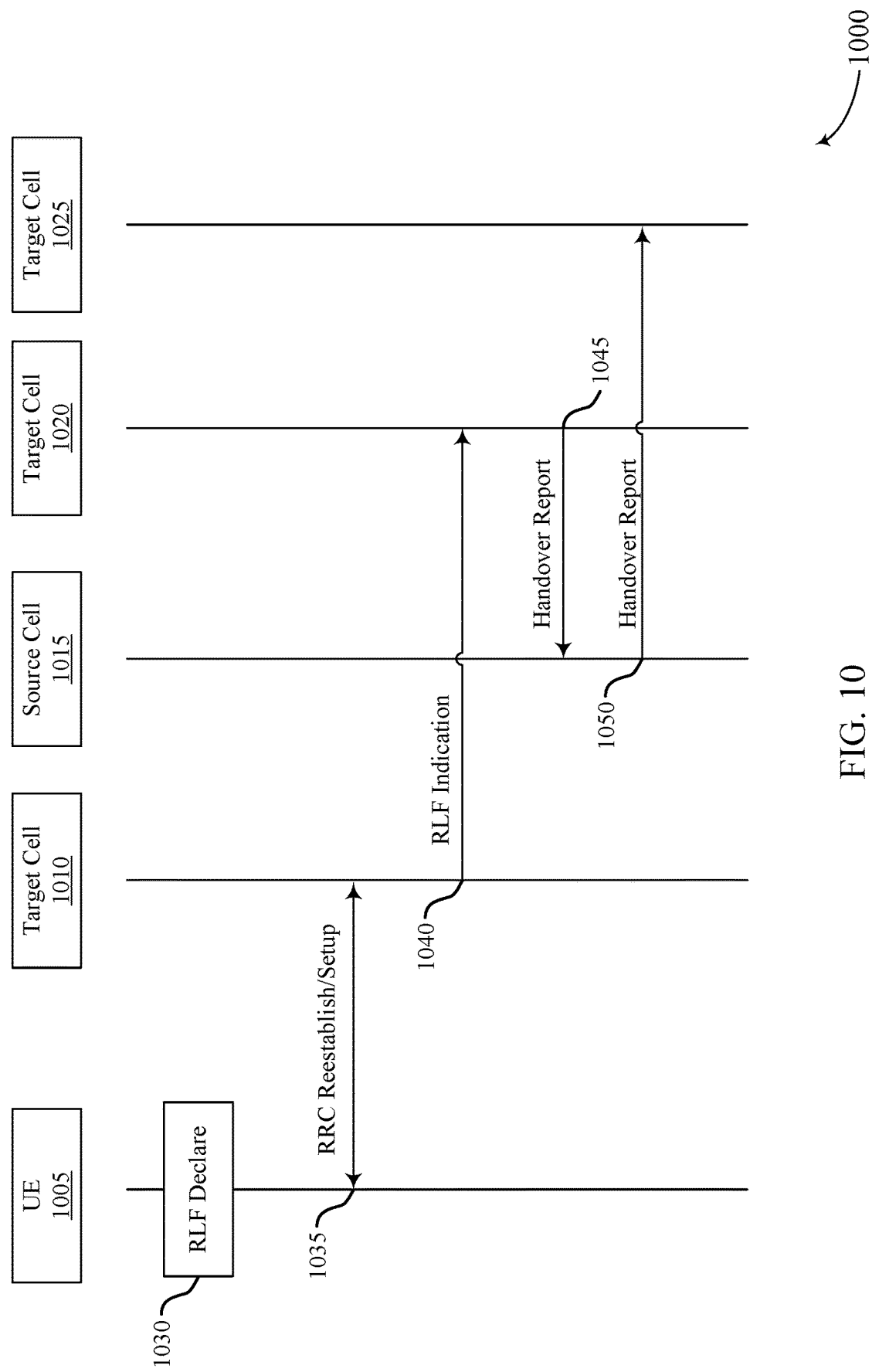
FIG. 10 illustrates an example of a process flow that supports techniques for communicating mobility information in accordance with one or more aspects of the present disclosure.

FIG. 10 illustrates an example of a process flow 1000 that supports techniques for communicating mobility information in accordance with one or more aspects of the present disclosure. In some examples, process flow 1000 may implement aspects of wireless communications system 100. The process flow 1000 may illustrate features related to RLF reporting and conditional handover procedures.

A UE 1005 may receive a conditional handover configuration before performing the handover procedure. Conditional handover procedures may allow a UE 1005 to initiate a handover procedure when at least one candidate target cell satisfies the criteria. The conditional handover configuration may improve mobility robustness and reduce RLF occurrence. The conditional handover configuration may include candidate target cell configurations and one or more conditions for performing the handover procedure. If the one or more conditions are met, the UE 1005 may initiate a RACH procedure to connect with the target cell. In some examples, the UE 1005 may perform the handover procedure waiting for an RRC reconfiguration.

The UE 1005 may transmit a measurement report to the source cell 1015. The source cell 1015 may initiate a conditional handover procedure and identify one or more candidate target cells (e.g., target cells 1010, 1020, or 1025). In some cases, the source cell 1015 may transmit a conditional handover request to each of the identified candidate target cells. After the candidate target cells acknowledge the conditional handover request, the source cell 1015 may transmit an RRC message that includes conditional handover procedure information and/or a list of the candidate target cells for the conditional handover. The UE 1005 may measure characteristics associated with each of the candidate target cells. When at least one of the target cells satisfies one or more thresholds, the UE 1005 may initiate the handover procedure to the identified target cell (without intervention of the source cell) based at least in part on this being part of a conditional handover procedure.

After an RLF event during a conditional handover, the UE 1005 may transmit an RLF report. The RLF report may include information about a conditional handover failure. In some examples, the RLF report may include information about one or more directional beams associated with the RLF event and information about the conditional handover failure. In some examples, the report may include the RLF information, an evaluation time, a candidate cell measurement result, an identified beam, or a combination thereof. In some examples, the RLF report and/or the RLF information may be forwarded to a plurality of candidate target cells, including a target cell 1020 and a target cell 1025.

The UE 1005 may transmit the RLF report if the one or more conditions are not met. The RLF report may include one or more of a time indication, a candidate target cell list, an attempted cell list, etc. In some examples, the time indication may indicate a time elapsed from a last handover initialization until the connection failure. In some examples, the candidate target cell list may include a list of corresponding measurement results including a beam quality. In some examples, the attempted cell list may include a number of connection attempts after the RLF occurs.

The UE 1005 may transmit the RLF report to a target cell 1010 as part of the RRC reestablishment procedure. The RLF report may include the information about the conditional handover failure. The RLF report, or portions thereof, may be transmitted from the target cell 1010 to the target cell 1020 in a message (e.g., an RLF indication or a handover report). The RLF report, or portions thereof, may be forwarded from the target cell 1020 to a source cell 1015, and the source cell 1015 may forward at least portions of the RLF report to the target cell 1025. The target cell 1020, the target cell 1025, and the source cell 1015 may adjust one or more handover parameters based on the information in the RLF report.

At 1030, the UE 1005 may identify an RLF event. The RLF event may be based on a conditional handover procedure which may include a too-late handover or a wrong-cell handover. The UE 1005 may declare the RLF event in the source cell 1015, the target cell 1020, the target cell 1025, or a combination thereof, based on the type of handover scenario that occurs.

At 1035, the UE 1005 may reestablish the RRC connection with the target cell 1010 based on identifying the RLF event, according to the RRC reestablishment procedure as described with reference to FIG. 6. The UE 1005 may transmit the RLF report to the target cell 1010 based on reestablishing the RRC connection. In some examples, the RLF report may include information about one or more directional beams associated with the RLF event. In some cases, the RLF report may include information about each candidate target cell involved in the conditional handover procedure.

At 1040, the target cell 1010 may transmit a message (e.g., an RLF indication or a handover report) to the target cell 1020 based on receiving the RLF report from the UE 1005. The message may include at least a portion of information of the RLF report. In some examples, the message may include a portion of the information about the one or more directional beams associated with the RLF event. In some cases, the message may include information about each candidate target cell involved in the conditional handover procedure.

At 1045, the target cell 1020 may forward at least portions of the RLF report to the source cell 1015 based on receiving the RLF indication (e.g., in a message such as an RLF indication or a handover report). At 1050, the source cell 1015 may forward at least portions of the RLF report to one or more candidate target cells (e.g., in a message such as an RLF indication or a handover report), which may include the target cell 1025. In some examples, the source cell 1015 may forward at least the portions of the RLF report to one or more candidate target cells (e.g., target cell 1025) to enable the candidate target cells to adjust one or more handover parameters based on the information in the RLF report based on the conditional handover failure. The candidate target cells may adjust one or more handover parameters based on the RLF information, an evaluation time, a candidate cell measurement result, or an identified beam, or a combination thereof, included in the RLF report.

Figure 11:
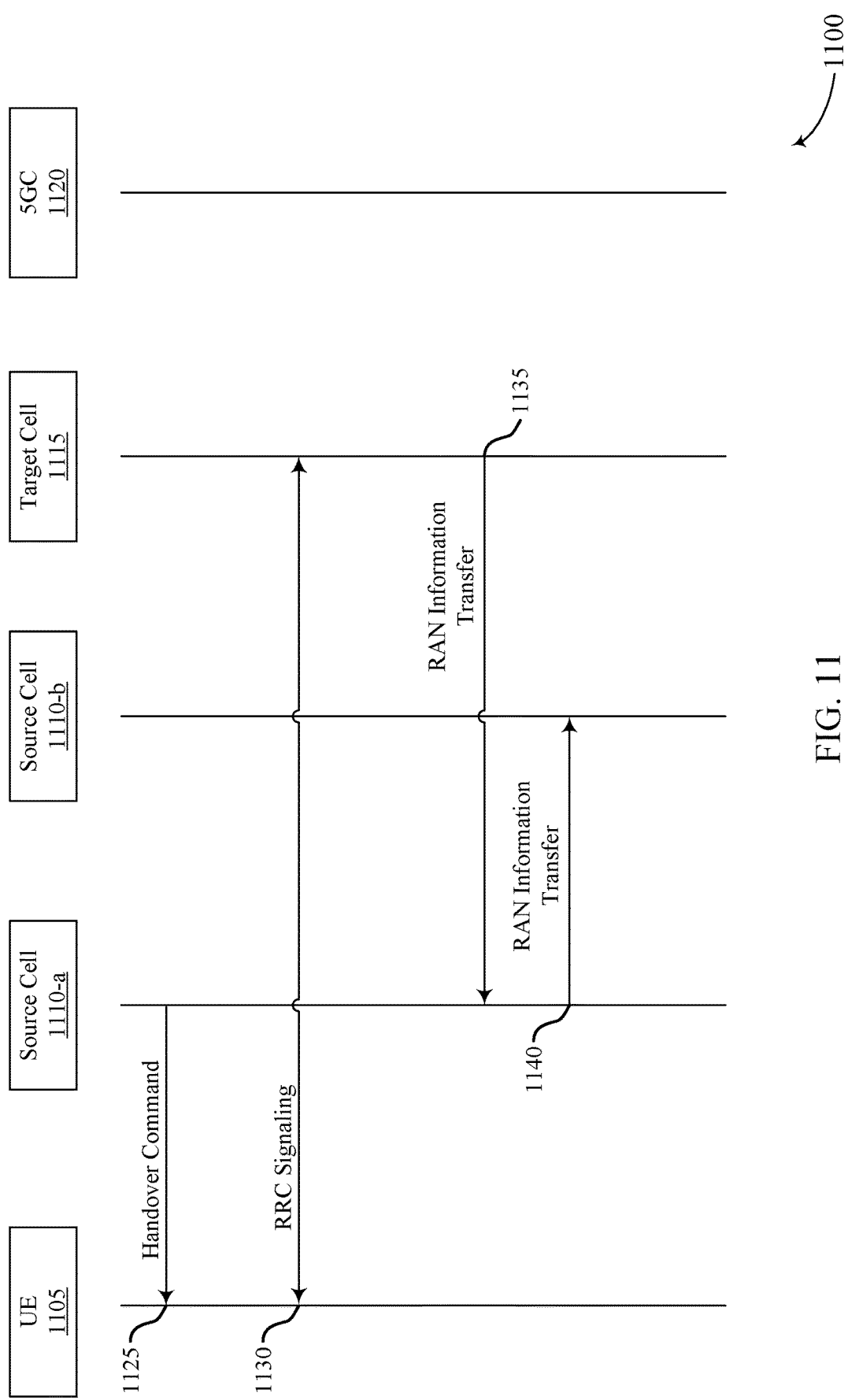
FIG. 11 illustrates an example of a process flow that supports techniques for communicating mobility information in accordance with one or more aspects of the present disclosure.

FIG. 11 illustrates an example of a process flow 1100 that supports techniques for communicating mobility information in accordance with one or more aspects of the present disclosure. In some examples, process flow 1100 may implement aspects of wireless communications system 100.

A UE 1105 may transmit an indication of a service interruption time, which may indicate a service interruption time that occurs during the handover procedure. In some cases, the indication of the service interruption time may be included in an RLF report. In some cases, the indication of the service interruption time may be transmitted as its own report or part of a different report. The UE may transmit the service interruption time information to a target cell 1115. In some examples, the service interruption time may include a duration between a time when the UE 1105 loses a data transmission capability at a source cell 1110-*a* and a time when the UE 1105 may resume data transmission at the target cell 1115. Additionally or alternatively, the service interruption time may include a duration between a time when the UE 1105 receives a handover command from the source cell 1110-*a* and a time when the UE 1105 transmits an RRC reconfiguration complete message to the target cell 1115. The UE 1105 may indicate the service interruption time information is available after connection to the target cell 1115. In some examples, the service interruption time information may include a service interruption time per node (e.g., for each of a master node and a secondary node) in the dual connectivity case. In some examples, the service interruption time information may be forwarded to the source cell 1110-*a*, which may forward the service interruption time information to a source cell 1110-*b*. The source cell 1110-*a* may be a master node and the source cell 1110-*b* may be a secondary node in the dual connectivity case. The source cell 1110-*a* and the source cell 1110-*b* may adjust a radio resource configuration and/or a radio resource scheduling based on the service interruption time information.

The UE 1105 may attempt to reestablish an RRC connection and/or a radio link with the target cell 1115. After successfully reestablishing the RRC connection, the UE 1105 may transmit the service interruption time information to the target cell 1115. The service interruption time information may be forwarded from the target cell 1115 to the source cell 1110-*a*, which may in turn forward the service interruption time information to the source cell 1110-*b*. The service interruption time information may be routed directly to the source cell 1110-*a* and forwarded to the source cell 1110-*b* without involving the 5GC 1120.

At 1125, the source cell 1110-*a* may transmit, and the UE 1105 may receive, a handover command to initiate a handover to the target cell 1115. The UE 1105 may initiate the handover procedure based on receiving the handover command.

At 1130, the UE 1105 may reestablish the RRC connection with the target cell 1115 based on the handover procedure, according to the RRC reestablishment procedure as described with reference to FIG. 6. The UE 1105 may transmit the service interruption time information to the target cell 1115 based on reestablishing the RRC connection.

At 1135, the target cell 1115 may forward the service interruption time information to the source cell 1110-*a* via a RAN information transfer based on receiving the service interruption time information from the UE 1105. The service interruption time information may be forwarded to the source cell 1110-*a* without involving the 5GC 1120.

At 1140, the source cell 1110-*a* may forward the service interruption time information to the source cell 1110-*b* via a RAN information transfer based on receiving the service interruption time information from the target cell 1115. The service interruption time information may be forwarded to the source cell 1110-*b* without involving the 5GC 1120.

Figure 12:
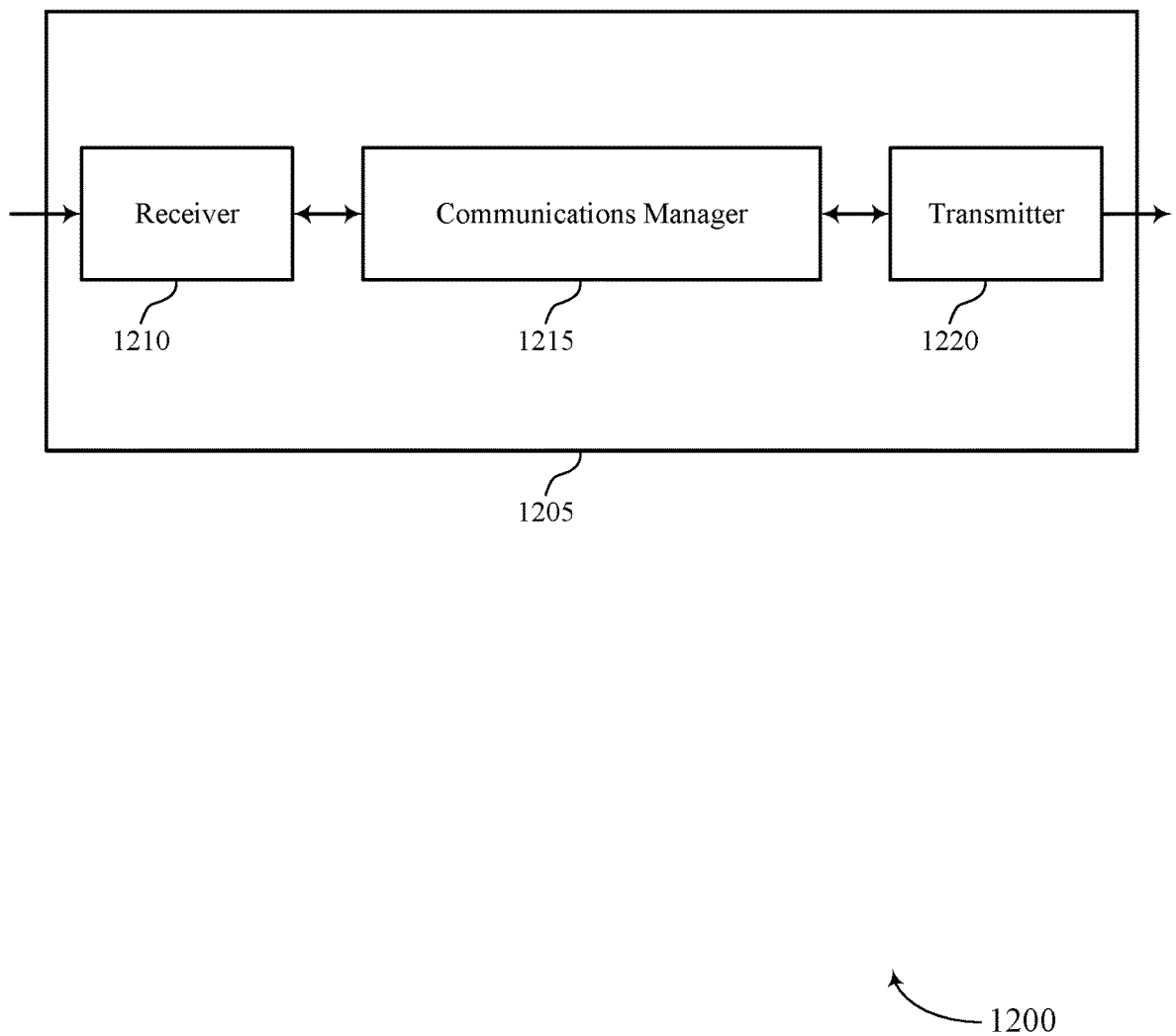
FIGS. 12 and 13 show block diagrams of devices that support techniques for communicating mobility information in accordance with one or more aspects of the present disclosure.

FIG. 12 shows a block diagram 1200 of a device 1205 that supports techniques for communicating mobility information in accordance with one or more aspects of the present disclosure. The device 1205 may be an example of aspects of a UE 115 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for communicating mobility information, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may identify an RLF event, reestablish an RRC connection with a cell based on identifying the RLF event, and transmit an RLF report to the cell based on reestablishing the RRC connection, the RLF report including information about one or more directional beams associated with the RLF event. The communications manager 1215 may be an example of aspects of the communications manager 1510 described herein.

Additionally or alternatively, the communications manager 1215 may identify an RLF event associated with a first RAT, reestablish an RRC connection with a cell of a second RAT based on identifying the RLF event associated with the first RAT, and transmit an RLF report to the cell based at least in part on reestablishing the RRC connection, the RLF report including information about one or more directional beams associated with the RLF event.

Additionally or alternatively, the communications manager 1215 may identify an RLF event, reestablish an RRC connection with a cell based on identifying the RLF event, and transmit an RLF report to the cell based at least in part on reestablishing the RRC connection, the RLF report including a connection failure type indication indicating the RLF event is a beam recovery failure and information about one or more directional beams associated with the RLF event.

Additionally or alternatively, the communications manager 1215 may receive an indication of one or more candidate target cells for a conditional handover, determine that a handover condition is satisfied for at least one candidate target cell of the one or more candidate target cells, and identify an RLF event associated with the conditional handover. The communications manager 1215 may additionally reestablish an RRC connection with a cell based on identifying the RLF event and transmit an RLF report to the cell based on reestablishing the RRC connection, the RLF report including information about one or more directional beams associated with the RLF event and information about a conditional handover failure.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

In some examples, the communications manager 1215 may be implemented as an integrated circuit or chipset for a mobile device modem, and the receiver 1210 and transmitter 1220 may be implemented as analog components (e.g., amplifiers, filters, antennas) coupled with the mobile device modem to enable wireless transmission and reception over one or more bands.

In some aspects, the communication manager 1215 may be implemented to enable the device 1205 to communicate more efficiently with another device (e.g., a base station) based on fewer RLF events. For example, the communications system in which the device 1205 operates may feature enhanced reliability and robustness based on one or more adjusted communication characteristics associated with an RLF event, which may reduce a number of RLF events the device 1205 may experience.

Based on techniques for enhancing network reliability and robustness, the device 1205 may maintain a more consistent connection status and, likewise, transmit fewer connection requests. Accordingly, the communications manager 1215 may perform fewer processing operations associated with network connectivity and connection request transmissions. For example, the processor of the device 1205 may power one or more processing units for identifying network connectivity and transmitting connection requests less often, which may result in lower power usage and improved battery life.

Figure 13:
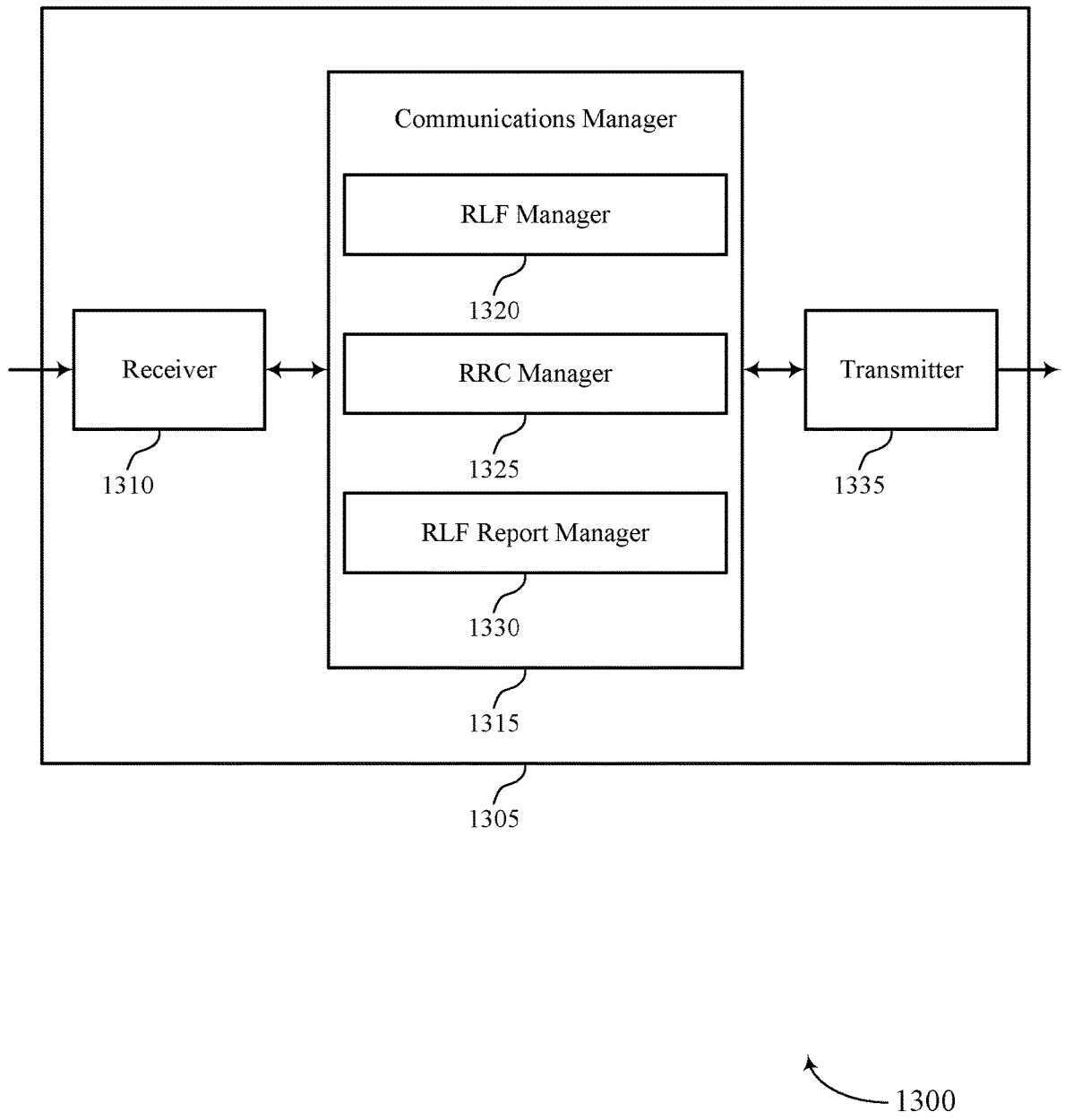

FIG. 13 shows a block diagram 1300 of a device 1305 that supports techniques for communicating mobility information in accordance with one or more aspects of the present disclosure. The device 1305 may be an example of aspects of a device 1205, or a UE 115 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to techniques for communicating mobility information, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include an RLF manager 1320, an RRC manager 1325, and an RLF report manager 1330. The communications manager 1315 may be an example of aspects of the communications manager 1510 described herein.

The RLF manager 1320 may identify an RLF event. The RRC manager 1325 may reestablish an RRC connection with a cell based on identifying the RLF event. The RLF report manager 1330 may transmit an RLF report to the cell based on reestablishing the RRC connection, the RLF report including information about one or more directional beams associated with the RLF event.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
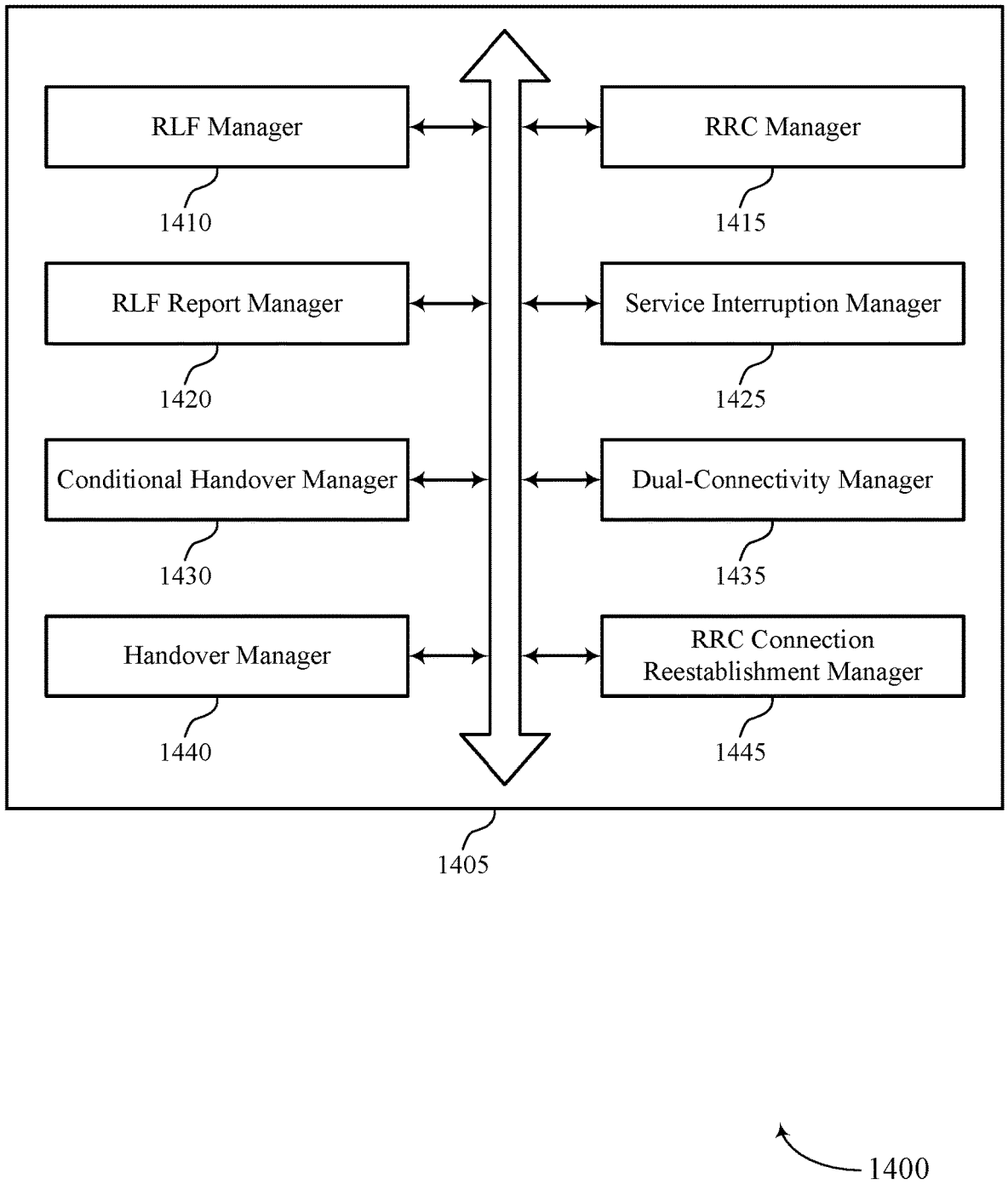
FIG. 14 shows a block diagram of a communications manager that supports techniques for communicating mobility information in accordance with one or more aspects of the present disclosure.

FIG. 14 shows a block diagram 1400 of a communications manager 1405 that supports techniques for communicating mobility information in accordance with one or more aspects of the present disclosure. The communications manager 1405 may be an example of aspects of a communications manager 1215, a communications manager 1315, or a communications manager 1510 described herein. The communications manager 1405 may include an RLF manager 1410, an RRC manager 1415, an RLF report manager 1420, a service interruption manager 1425, a conditional handover manager 1430, a dual-connectivity manager 1435, a handover manager 1440, and an RRC connection reestablishment manager 1445. Each of these modules may communicate, directly or indirectly, with one another (e.g., via one or more buses).

The RLF manager 1410 may identify an RLF event. In some examples, the RLF manager 1410 may identify an RLF event associated with a first RAT. In some examples, the RLF manager 1410 may identify a beam recovery failure for at least one directional beam, where identifying the RLF event is based on identifying the beam recovery failure. In some examples, the RLF manager 1410 may identify a beam recovery failure for at least one directional beam associated with the first RAT, where identifying the RLF event is based on identifying the beam recovery failure. In some examples, the RLF manager 1410 may identify a beam recovery failure for at least one directional beam associated with a conditional handover, where identifying the RLF event is based on identifying the beam recovery failure. In some examples, the RLF manager 1410 may identify that a beam recovery fails for at least one directional beam, where identifying the RLF event is based on identifying that the beam recovery fails, where a field in the RLF report indicates that a type of the RLF event includes a beam recovery failure.

The RRC manager 1415 may reestablish an RRC connection with a cell based on identifying the RLF event. In some examples, the RRC manager 1415 may reestablish an RRC connection with a cell of a second RAT based on identifying the RLF event associated with the first RAT. In some examples, the first RAT is associated with a 5GC and the second RAT is associated with an EPC. The RLF report manager 1420 may transmit an RLF report to the cell based on reestablishing the RRC connection, the RLF report including information about one or more directional beams associated with the RLF event. In some examples, the RLF report manager 1420 may transmit an RLF report to the cell based on reestablishing the RRC connection, the RLF report including information about one or more directional beams associated with the RLF event and information about a conditional handover failure. In some examples, the RLF report manager 1420 may transmit an RRC message that includes an indication that one or more RLF reports are available to report to a network, where transmitting the RLF report is based on transmitting the RRC message that includes the indication. In some examples, the RLF report manager 1420 may receive an information request message based on transmitting the RRC message that includes the indication, where transmitting the RLF report is based on receiving the information request message.

In some cases, a field in the RLF report is configured to indicate whether the RLF event is a radio link failure, a handover failure, the beam recovery failure, or a combination thereof. In some cases, the field in the RLF report is a connection failure type indication and is configured to indicate whether the RLF event is a radio link failure, a handover failure, the beam recovery failure, or a combination thereof. In some cases, the RLF report includes an identifier of the one or more directional beams associated with the RLF event, beam reference signal received power of the one or more directional beams associated with the RLF event, a beam measurement of the one or more directional beams associated with the RLF event, or a combination thereof.

In some cases, the RLF report is part of an information response message transmitted based on receiving the information request message. In some cases, the RRC message includes an RRC connection reestablishment complete message. In some cases, the RLF report may include a transmission power of a preamble, a number of attempts to successfully send the preamble, a number of transmissions before receiving an acknowledgement that the preamble was received, an RSRP, or an L1 RSRP, or a combination thereof. In some cases, the preamble may be a RACH preamble.

The service interruption manager 1425 may identify a duration of a service interruption based on identifying the RLF event, where the RLF report indicates the duration of the service interruption. In some examples, the service interruption manager 1425 may identify the duration between a first time when a UE loses data transmission capability at a source cell and a second time when the UE can resume data transmission at a target cell. In some examples, the service interruption manager 1425 may identify the duration between when a UE loses data transmission capability at a source cell of the first RAT and a time when the UE can resume data transmission at the cell, where the cell is of the second RAT. In some examples, the service interruption manager 1425 may identify the duration between a first time when a UE receives a handover command from a source cell and a second time the UE transmits an RRC reconfiguration complete message to a target cell. In some cases, the duration is identified for each node when dual connectivity is configured.

The conditional handover manager 1430 may identify that the RLF event is associated with a conditional handover failure, where the RLF report includes information about the conditional handover failure. In some examples, the conditional handover manager 1430 may receive an indication of one or more candidate target cells for a conditional handover. In some examples, the conditional handover manager 1430 may determine that a handover condition is satisfied for at least one candidate target cell of the one or more candidate target cells. In some examples, the conditional handover manager 1430 may initiate a RACH to the at least one candidate target cell that satisfied the handover condition, where identifying that the RLF event is associated with the conditional handover failure is based on initiating the RACH to the at least one candidate target cell. In some cases, the RLF report includes a duration between a last handover initialization and a connection failure, a candidate target cell list including at least the cell, measurement information for at least one target cell in the candidate target cell list, an indication about one or more target cells attempted to connect with after the RLF event occurs, a number of connection attempts after the RLF event occurs, or a combination thereof.

In some examples, the conditional handover manager 1430 may measure one or more characteristics associated with the one or more candidate target cells. In some examples, the conditional handover manager 1430 may determine that the one or more characteristics associated with at least one of the one or more candidate target cells satisfies one or more thresholds, where determining that the handover condition is satisfied is based on determining that the one or more characteristics associated with at least one of the one or more candidate target cells satisfies the one or more thresholds. In some examples, the conditional handover manager 1430 may identify whether the RLF event associated with the conditional handover is based on a too-late handover scenario from a source cell to one of the one or more candidate target cells or a wrong-cell handover scenario to a wrong cell, where the RLF report includes information indicating whether the RLF event associated with the conditional handover is based on the too-late handover scenario or the wrong-cell handover scenario.

The dual-connectivity manager 1435 may identify information about a master cell and a secondary cell in a dual-connectivity configuration, where the RLF report includes the identified information. In some examples, the dual-connectivity manager 1435 may identify a measurement for an MCG and a measurement for at least one SCG in a dual-connectivity configuration, where the RLF report includes the measurements. In some examples, the dual-connectivity manager 1435 may identify an RSRP of a last serving cell that includes an MCG and at least one SCG in a dual-connectivity configuration, or an RSRQ of the last serving cell in the dual-connectivity configuration, or a combination thereof, where the RLF report includes the RSRP or the RSRQ or both for the last serving cell.

In some examples, the dual-connectivity manager 1435 may identify an RSRP of a neighboring cell configured by a master base station or a secondary base station in a dual-connectivity configuration, an RSRQ of the neighboring cell, a frequency of the neighboring cell, or an identifier of the neighboring cell, or a combination thereof, where the RLF report includes the RSRP, the RSRQ, the frequency, or the identifier, or a combination thereof of the neighboring cell.

In some examples, the dual-connectivity manager 1435 may identify a C-RNTI of a master base station and at least one secondary base station in a dual-connectivity configuration, where the RLF report includes the C-RNTIs of the master base station and the at least one secondary base station.

In some examples, the dual-connectivity manager 1435 may identify an identifier for each cell of a master base station or a secondary base station in a dual-connectivity configuration that is associated with the RLF event, where the RLF report includes the identifiers for each cell associated with the RLF event.

In some examples, the dual-connectivity manager 1435 may identify an identifier of a primary secondary cell in a dual-connectivity configuration when a last RRC reconfiguration message including mobility control information was received, where the RLF report includes the identifier. In some cases, the RLF event is for an MCG in a dual-connectivity configuration.

The handover manager 1440 may identify whether a type of a handover is an inter-RAT handover or an intra-RAT handover, where the RLF report includes an indication of the type of the handover. In some examples, the handover manager 1440 may perform a handover between a source cell and a target cell, where identifying the RLF event is based on performing the handover.

The RRC connection reestablishment manager 1445 may transmit an RRC connection reestablishment request. In some examples, the RRC connection reestablishment manager 1445 may receive an RRC connection reestablishment message based on transmitting the RRC connection reestablishment request. In some examples, the RRC connection reestablishment manager 1445 may transmit an RRC connection reestablishment complete message based on receiving the RRC connection reestablishment message.

Figure 15:
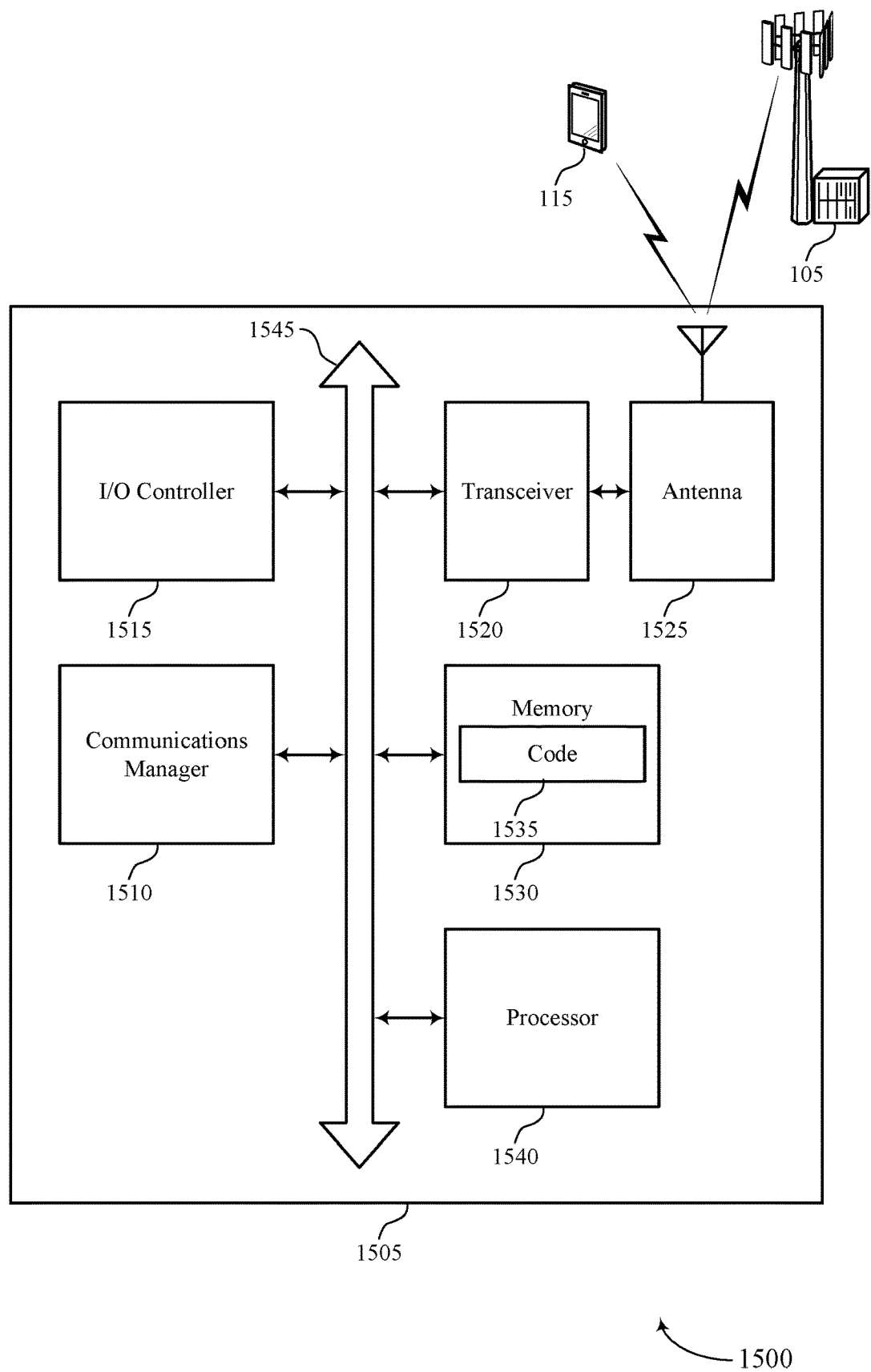
FIG. 15 shows a diagram of a system including a device that supports techniques for communicating mobility information in accordance with one or more aspects of the present disclosure.

FIG. 15 shows a diagram of a system 1500 including a device 1505 that supports techniques for communicating mobility information in accordance with one or more aspects of the present disclosure. The device 1505 may be an example of or include the components of device 1205, device 1305, or a UE 115 as described herein. The device 1505 may include components for bi-directional voice and data communications including components for transmitting and receiving communications, including a communications manager 1510, an I/O controller 1515, a transceiver 1520, an antenna 1525, memory 1530, and a processor 1540. These components may be in electronic communication via one or more buses (e.g., bus 1545).

The communications manager 1510 may identify an RLF event, reestablish an RRC connection with a cell based on identifying the RLF event, and transmit an RLF report to the cell based on reestablishing the RRC connection, the RLF report including information about one or more directional beams associated with the RLF event.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include random access memory (RAM) and read-only memory (ROM). The memory 1530 may store computer-readable, computer-executable code 1535 including instructions that, when executed, cause the processor to perform various functions described herein. In some cases, the memory 1530 may contain, among other things, a basic I/O system (BIOS) which may control basic hardware or software operation such as the interaction with peripheral components or devices.

The processor 1540 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting techniques for communicating mobility information).

The code 1535 may include instructions to implement aspects of the present disclosure, including instructions to support wireless communication. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
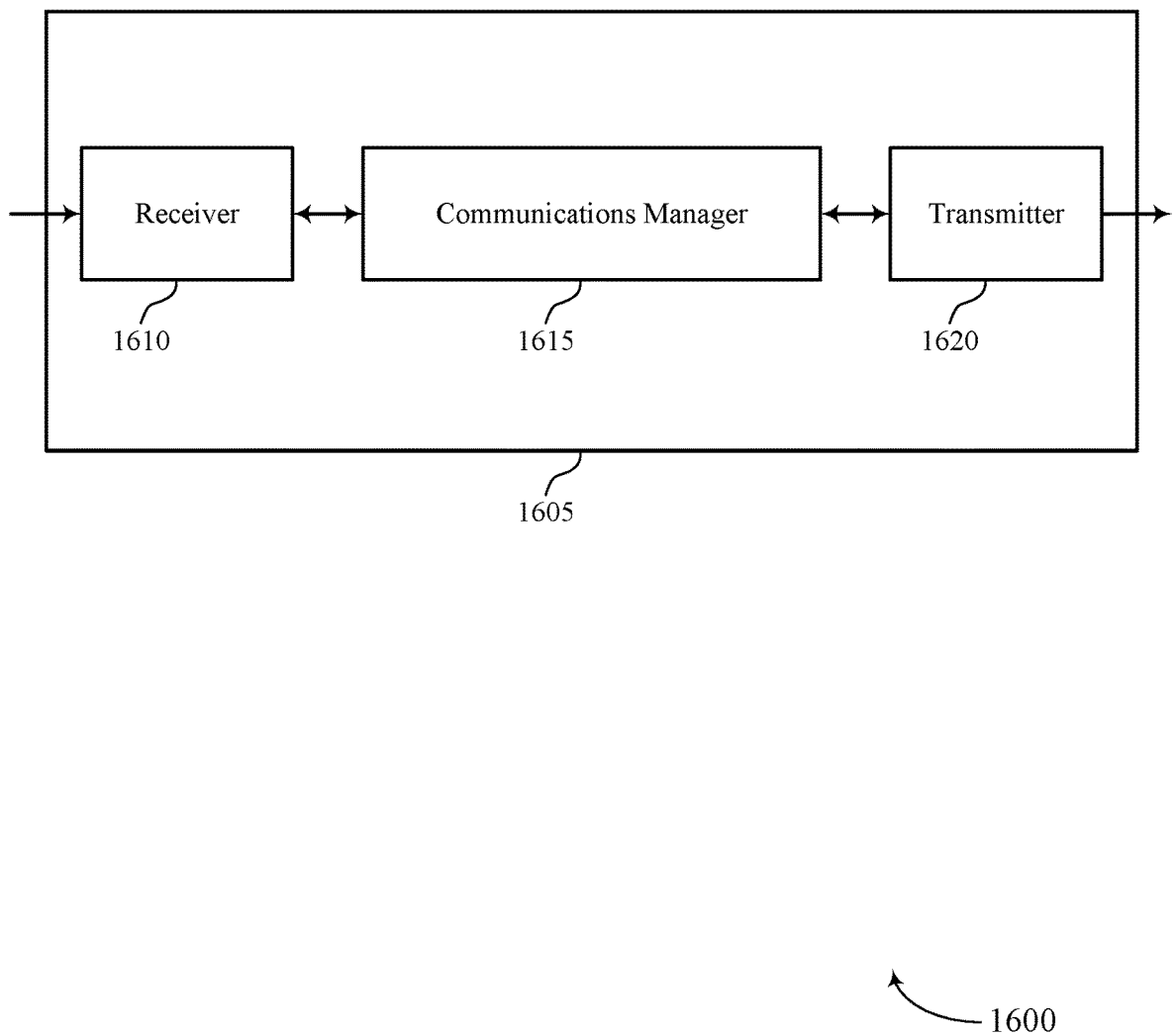
FIGS. 16 and 17 show block diagrams of devices that support techniques for communicating mobility information in accordance with one or more aspects of the present disclosure.

FIG. 16 shows a block diagram 1600 of a device 1605 that supports techniques for communicating mobility information in accordance with one or more aspects of the present disclosure. The device 1605 may be an example of aspects of a base station 105 as described herein. In some examples, the device 1605 may be an example of a cell, a node, a cell group, or any combination thereof. The device 1605 may include a receiver 1610, a communications manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to techniques for communicating mobility information, etc.). Information may be passed on to other components of the device 1605. The receiver 1610 may be an example of aspects of the transceiver 1920 described with reference to FIG. 19. The receiver 1610 may utilize a single antenna or a set of antennas.

The communications manager 1615 may reestablish an RRC connection with a UE after an RLF event, receive an RLF report from the UE that includes information about one or more directional beams associated with the RLF event, and transmit a message to another node of a network based on receiving the RLF report, the message including at least a portion of the information about the one or more directional beams associated with the RLF event. The communications manager 1615 may be an example of aspects of the communications manager 1910 described herein.

Additionally or alternatively, the communications manager 1615 may reestablish an RRC connection with a UE after an RLF event, where the RLF event is associated with a first RAT and the RRC connection is associated with a second RAT. Additionally, the communications manager 1615 may receive, over the RRC connection of the second RAT, an RLF report from the UE that includes information about one or more directional beams associated with the RLF event and transmit a message to another cell of a network based on receiving the RLF report, the message including at least a portion of the information about the one or more directional beams associated with the RLF event.

Additionally or alternatively, the communications manager 1615 may reestablish an RRC connection with a UE after an RLF event, receive an RLF report from the UE that includes a connection failure type indication indicating that the RLF event is a beam recovery failure and information about one or more directional beams associated with the RLF event, and transmit a message to another cell of a network based on receiving the RLF report, the message including at least a portion of the information about the one or more directional beams associated with the RLF event.

Additionally or alternatively, the communications manager 1615 may reestablish an RRC connection with a UE after an RLF event, receive an RLF report from the UE that includes information about one or more directional beams associated with the RLF event, identify that the RLF event is associated with a conditional handover failure based on receiving the RLF report, and transmit a message to another cell of a network based on receiving the RLF report, the message including at least a portion of the information about the one or more directional beams associated with the RLF event and information about the conditional handover failure.

The communications manager 1615, or its sub-components, may be implemented in hardware, code (e.g., software or firmware) executed by a processor, or any combination thereof. If implemented in code executed by a processor, the functions of the communications manager 1615, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1615, or its sub-components, may be physically located at various positions, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

In some aspects, the communication manager 1615 may be implemented to enable the device 1605 to maintain more consistent connections with other devices (e.g., such as UEs) and, likewise, to perform fewer connection reestablishment procedures associated with RLF events. Accordingly, the device 1605 may power one or more processing units associated with monitoring for connection requests and transmitting establishment messages less often, which may result in less power consumption.

Figure 17:
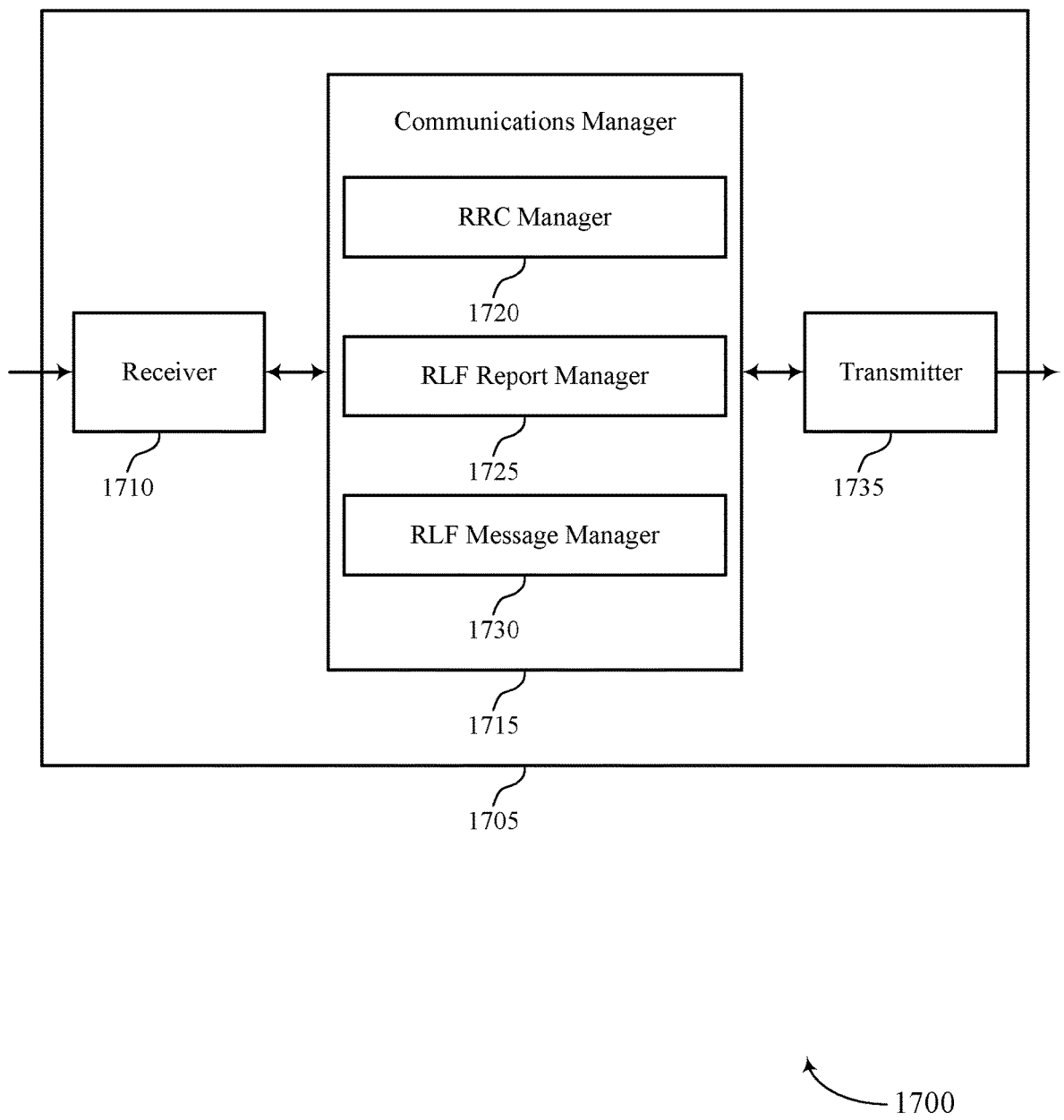

FIG. 17 shows a block diagram 1700 of a device 1705 that supports techniques for communicating mobility information in accordance with one or more aspects of the present disclosure. The device 1705 may be an example of aspects of a device 1605, or a base station 105 as described herein. The device 1705 may include a receiver 1710, a communications manager 1715, and a transmitter 1735. The device 1705 may also include a processor. Each of these components may be in communication with one another (e.g., via one or more buses).

The receiver 1710 may receive information such as packets, user data, or control information associated with various information channels (e.g., control channels, data channels, and information related to techniques for communicating mobility information, etc.). Information may be passed on to other components of the device 1705. The receiver 1710 may be an example of aspects of the transceiver 1920 described with reference to FIG. 19. The receiver 1710 may utilize a single antenna or a set of antennas.

The communications manager 1715 may be an example of aspects of the communications manager 1615 as described herein. The communications manager 1715 may include an RRC manager 1720, an RLF report manager 1725, and an RLF message manager 1730. The communications manager 1715 may be an example of aspects of the communications manager 1910 described herein.

The RRC manager 1720 may reestablish an RRC connection with a UE after an RLF event. The RLF report manager 1725 may receive an RLF report from the UE that includes information about one or more directional beams associated with the RLF event. The RLF message manager 1730 may transmit a message to another node of a network based on receiving the RLF report, the message including at least a portion of the information about the one or more directional beams associated with the RLF event.

The transmitter 1735 may transmit signals generated by other components of the device 1705. In some examples, the transmitter 1735 may be collocated with a receiver 1710 in a transceiver module. For example, the transmitter 1735 may be an example of aspects of the transceiver 1920 described with reference to FIG. 19. The transmitter 1735 may utilize a single antenna or a set of antennas.

Figure 18:
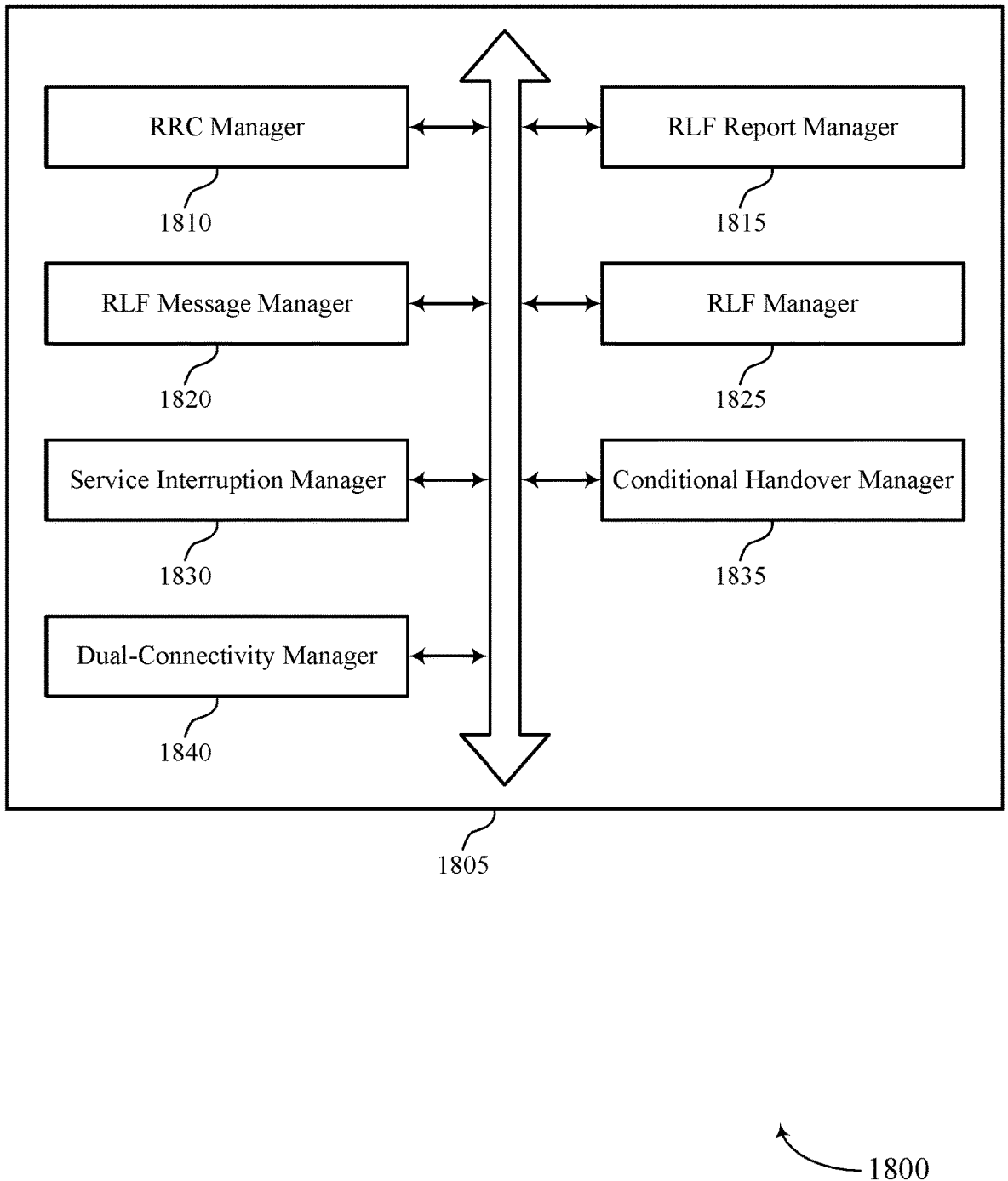
FIG. 18 shows a block diagram of a communications manager that supports techniques for communicating mobility information in accordance with one or more aspects of the present disclosure.

FIG. 18 shows a block diagram 1800 of a communications manager 1805 that supports techniques for communicating mobility information in accordance with one or more aspects of the present disclosure. The communications manager 1805 may be an example of aspects of a communications manager 1615, a communications manager 1715, or a communications manager 1910 described herein. The communications manager 1805 may include an RRC manager 1810, an RLF report manager 1815, an RLF message manager 1820, an RLF manager 1825, a service interruption manager 1830, a conditional handover manager 1835, and a dual-connectivity manager 1840. Each of these modules may communicate, directly or indirectly, with one another (e.g., via one or more buses).

The RRC manager 1810 may reestablish an RRC connection with a UE after an RLF event. In some examples, the RRC manager 1810 may reestablish an RRC connection with a UE after an RLF event, where the RLF event is associated with a first RAT and the RRC connection is associated with a second RAT. In some examples, the first RAT may be a 5GC and the second RAT may be an EPC. In some examples, the RRC manager 1810 may receive an RRC connection reestablishment request from the UE. In some examples, the RRC manager 1810 may transmit an RRC connection reestablishment message based on receiving the RRC connection reestablishment request. In some examples, the RRC manager 1810 may receive an RRC connection reestablishment complete message based on transmitting the RRC connection reestablishment message.

The RLF report manager 1815 may receive an RLF report from the UE that includes information about one or more directional beams associated with the RLF event. In some examples, the RLF report manager 1815 may receive, over the RRC connection of the second RAT, an RLF report from the UE that includes information about one or more directional beams associated with the RLF event. In some examples, the RLF report manager 1815 may receive an RLF report from the UE that includes a connection failure type indication indicating that the RLF event is a beam recovery failure and information about one or more directional beams associated with the RLF event. In some examples, the RLF report manager 1815 may receive an RRC message that includes an indication that one or more RLF reports are available at the UE, where receiving the RLF report is based on receiving the RRC message that includes the indication. In some examples, the RLF report manager 1815 may transmit an information request message based on receiving the RRC message that includes the indication, where receiving the RLF report is based on transmitting the information request message. In some examples, the RLF report manager 1815 may transmit a handover command to the UE, where receiving the RLF report is based on transmitting the handover command. In some cases, the RLF report is part of an information response message received based on transmitting the information request message. In some cases, the RRC message includes an RRC connection reestablishment complete message.

The RLF message manager 1820 may transmit a message to another node of a network based on receiving the RLF report, the message including at least a portion of the information about the one or more directional beams associated with the RLF event. In some examples, the RLF message manager 1820 may transmit the message to a source node associated with a handover of the UE. In some examples, the RLF message manager 1820 may transmit the message to a core network component, where the core network component communicates at least some of the information in the message to a source node associated with a handover of the UE. In some examples, the RLF message manager 1820 may transmit the message over an Xn interface. In some examples, the RLF message manager 1820 may transmit the message over an X2 interface. In some examples, identifying that a cause of the RLF event is a beam recovery failure, where the message indicates that a type of the RLF event includes the beam recovery failure. In some cases, the core network component includes at least one component of an EPC. In some cases, the core network component includes at least one component of 5GC. In some cases, the message is an RLF indication. In some cases, the message is a handover report. In some cases, a field of the message includes a connection failure type field and is configured to indicate whether the RLF event is a radio link failure, a handover failure, the beam recovery failure, or a combination thereof. In some cases, the message includes an identifier of the one or more directional beams associated with the RLF event, beam reference signal received power of the one or more directional beams associated with the RLF event, a beam measurement of the one or more directional beams associated with the RLF event, or a combination thereof.

The RLF manager 1825 may identify a type of the RLF event. In some examples, a connection failure type indication in the RLF report is configured to indicate whether the RLF event is a radio link failure, a handover failure, the beam recovery failure, or a combination thereof. In some examples, the RLF manager 1825 may identify that a cause of the RLF event is a beam recovery failure associated with the first RAT. In some examples, the RLF manager 1825 may select a type of the message to transmit based on identifying the type of the RLF event, where transmitting the message is based on identifying the type of the RLF event. The service interruption manager 1830 may identify a duration of a service interruption based on receiving the RLF report, where the message indicates the duration of the service interruption.

The conditional handover manager 1835 may identify that the RLF event is associated with a conditional handover failure based on receiving the RLF report, where the message includes information about the conditional handover failure. In some examples, the conditional handover manager 1835 may identify that the RLF event is associated with a conditional handover failure based on receiving the RLF report, where the message includes at least a portion of information about the one or more directional beams associated with the RLF event and information about the conditional handover failure. In some examples, the conditional handover manager 1835 may transmit the message to a set of candidate target cells associated with a conditional handover, where transmitting the message to the other node is based on transmitting the message to the set of candidate target cells. In some examples, the conditional handover manager 1835 may transmit an indication of one or more candidate target cells for a conditional handover, where receiving the RLF report is based on transmitting the indication of the one or more candidate target cells for the conditional handover. In some cases, the message includes a duration between a last handover initialization and a connection failure, a candidate target cell list, measurement information for at least one target cell in the candidate target cell list, an indication about one or more target cells attempted to connect with after the RLF event occurs, a number of connection attempts after the RLF event occurs, or a combination thereof.

In some examples, the conditional handover manager 1835 may identify whether the RLF event associated with a conditional handover is based on a too-late handover scenario from a source cell to one of one or more candidate target cells or a wrong-cell handover scenario to a wrong cell, where the RLF report may include information indicating whether the RLF event associated with the conditional handover is based on the too-late handover scenario or the wrong-cell handover scenario. In some examples, the conditional handover manager 1835 may identify a set of candidate target cells for the conditional handover with the UE. In some examples, the conditional handover manager 1835 may transmit a conditional handover request to the set of candidate target cells, where transmitting the indication to the UE is based on transmitting the conditional handover request.

The dual-connectivity manager 1840 may identify information about a master cell and a secondary cell in a dual-connectivity configuration based on receiving the RLF report, where the message includes the identified information. In some examples, the dual-connectivity manager 1840 may transmit the message to an MCG and a SCG in a dual-connectivity configuration. In some examples, the dual-connectivity manager 1840 may identify a measurement for an MCG and a measurement for at least one SCG in a dual-connectivity configuration based on receiving the RLF report, where the message includes the measurements. In some examples, the dual-connectivity manager 1840 may identify, based on receiving the RLF report, a RSRP of a last serving cell that includes an MCG and at least one SCG in a dual-connectivity configuration, or a RSRQ of the last serving cell in the dual-connectivity configuration, or a combination thereof, where the message includes the RSRP or the RSRQ or both for the last serving cell. In some examples, the dual-connectivity manager 1840 may identify, based on receiving the RLF report, a RSRP of a neighboring cell configured by a master base station or a secondary base station in a dual-connectivity configuration, a RSRQ of the neighboring cell, a frequency of the neighboring cell, or an identifier of the neighboring cell, or a combination thereof, where the message includes the RSRP, the RSRQ, the frequency, or the identifier, or a combination thereof of the neighboring cell.

In some examples, the dual-connectivity manager 1840 may identify, based on receiving the RLF report, a C-RNTI of a master base station and at least one secondary base station in a dual-connectivity configuration, where the message includes the C-RNTIs of the master base station and the least one secondary base station. In some examples, the dual-connectivity manager 1840 may identify, based on receiving the RLF report, an identifier for each cell of a master base station or a secondary base station in a dual-connectivity configuration that is associated with the RLF event, where the message includes the identifiers for each cell associated with the RLF event. In some examples, the dual-connectivity manager 1840 may identify, based on receiving the RLF report, an identifier of a primary secondary cell in a dual-connectivity configuration when a last RRC reconfiguration message including mobility control information was received, where the message includes the identifier. In some cases, the RLF event is for an MCG in a dual-connectivity configuration.

Figure 19:
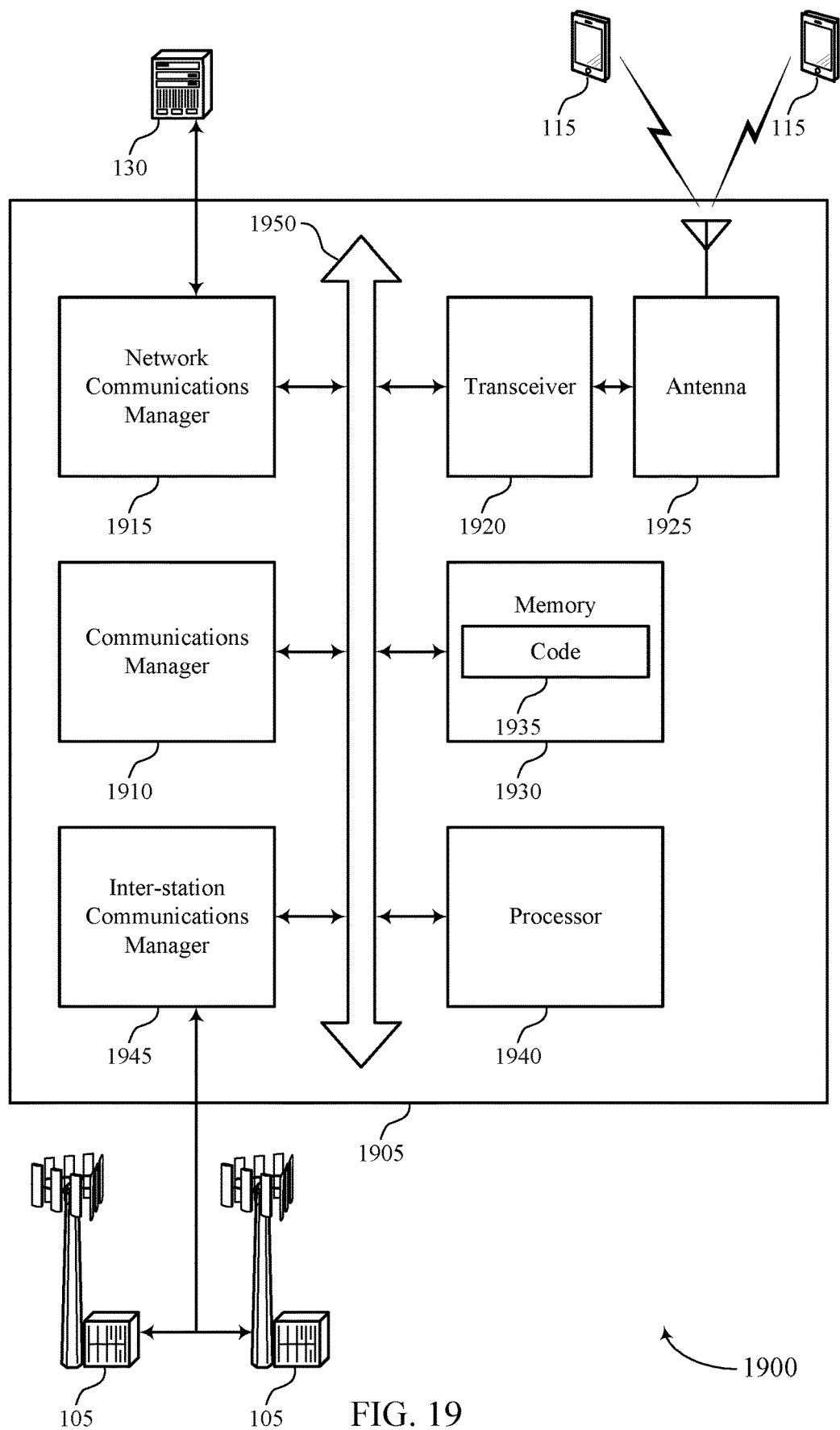
FIG. 19 shows a diagram of a system including a device that supports techniques for communicating mobility information in accordance with one or more aspects of the present disclosure.

FIG. 19 shows a diagram of a system 1900 including a device 1905 that supports techniques for communicating mobility information in accordance with one or more aspects of the present disclosure. The device 1905 may be an example of or include the components of device 1605, device 1705, or a base station 105 as described herein. The device 1905 may include components for bi-directional voice and data communications including components for transmitting and receiving communications, including a communications manager 1910, a network communications manager 1915, a transceiver 1920, an antenna 1925, memory 1930, a processor 1940, and an inter-station communications manager 1945. These components may be in electronic communication via one or more buses (e.g., bus 1950).

The communications manager 1910 may reestablish an RRC connection with a UE after an RLF event, receive an RLF report from the UE that includes information about one or more directional beams associated with the RLF event, and transmit a message to another node of a network based on receiving the RLF report, the message including at least a portion of the information about the one or more directional beams associated with the RLF event.

The network communications manager 1915 may manage communications with the core network (e.g., via one or more wired backhaul links). For example, the network communications manager 1915 may manage the transfer of data communications for client devices, such as one or more UEs 115. The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions. The memory 1930 may include RAM, ROM, or a combination thereof. The memory 1930 may store computer-readable code 1935 including instructions that, when executed by a processor (e.g., the processor 1940) cause the device to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some cases, a memory controller may be integrated into processor 1940. The processor 1940 may be configured to execute computer-readable instructions stored in a memory (e.g., the memory 1930) to cause the device 1905 to perform various functions (e.g., functions or tasks supporting techniques for communicating mobility information).

The inter-station communications manager 1945 may manage communications with other base station 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communication network technology to provide communication between base stations 105.

The code 1935 may include instructions to implement aspects of the present disclosure, including instructions to support wireless communication. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

Figure 20:
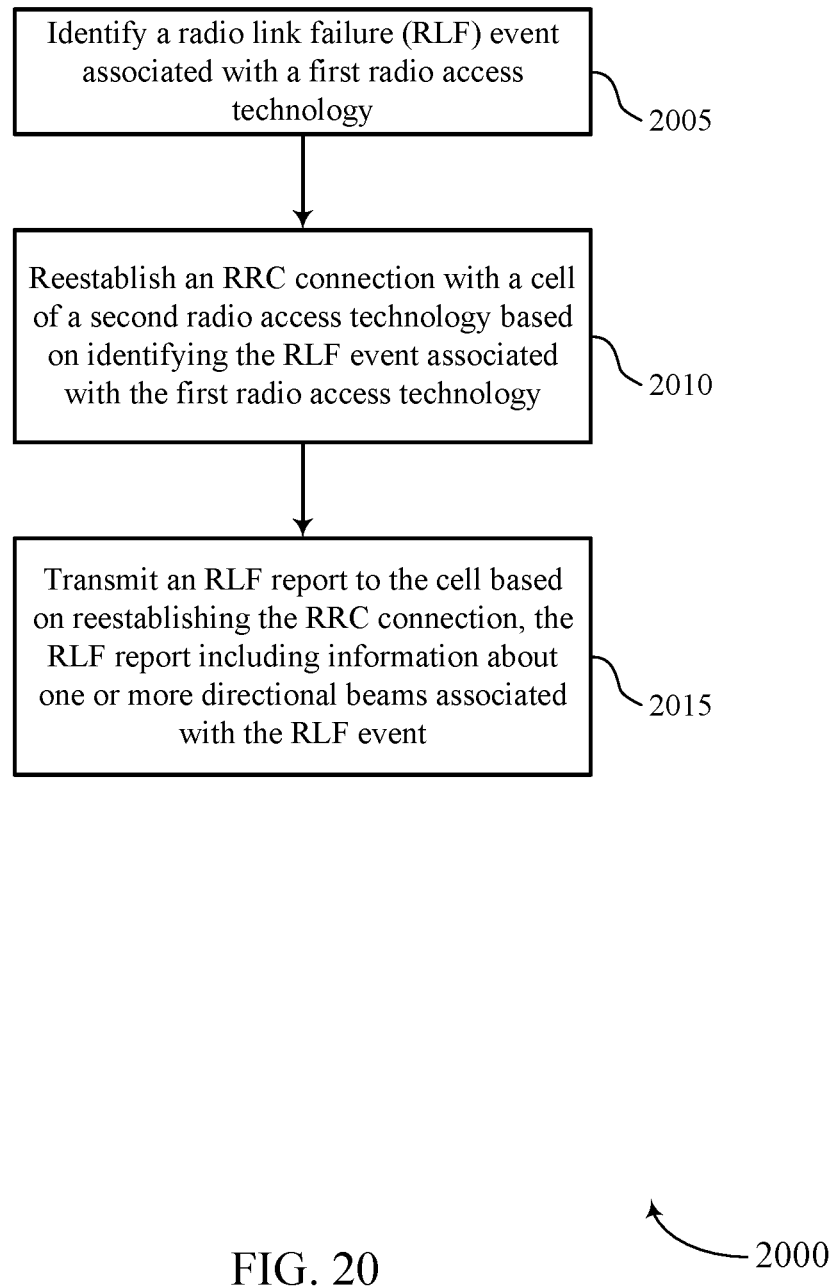
FIGS. 20 through 35 show flowcharts illustrating methods that support techniques for communicating mobility information in accordance with one or more aspects of the present disclosure.

FIG. 20 shows a flowchart illustrating a method 2000 that supports techniques for communicating mobility information in accordance with aspects of the present disclosure. The operations of method 2000 may be implemented by a UE 115 or its components as described herein. For example, the operations of method 2000 may be performed by a UE Coding Manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2005, the UE may identify an RLF event associated with a first RAT. The operations of 2005 may be performed according to the methods described herein. In some examples, aspects of the operations of 2005 may be performed by an RLF manager as described with reference to FIGS. 12 through 15.

At 2010, the UE may reestablish an RRC connection with a cell of a second RAT based on identifying the RLF event associated with the first radio access technology. The operations of 2010 may be performed according to the methods described herein. In some examples, aspects of the operations of 2010 may be performed by an RRC manager as described with reference to FIGS. 12 through 15.

At 2015, the UE may transmit an RLF report to the cell based on reestablishing the RRC connection, the RLF report including information about one or more directional beams associated with the RLF event. The operations of 2015 may be performed according to the methods described herein. In some examples, aspects of the operations of 2015 may be performed by an RLF report manager as described with reference to FIGS. 12 through 15.

Figure 21:
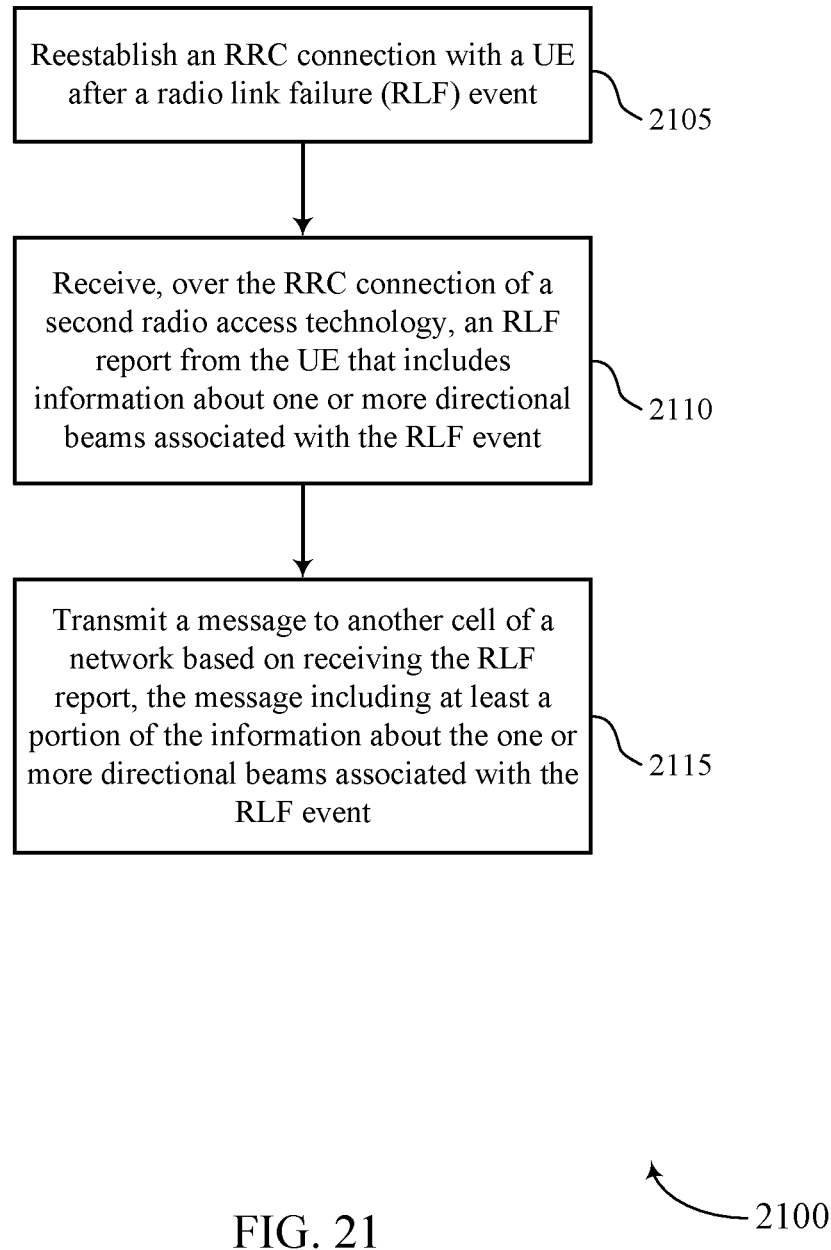

FIG. 21 shows a flowchart illustrating a method 2100 that supports techniques for communicating mobility information in accordance with aspects of the present disclosure. The operations of method 2100 may be implemented by a base station 105 or its components as described herein. For example, the operations of method 2100 may be performed by a communications manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2105, the base station may reestablish an RRC connection with a UE after an RLF event. The RLF event may be associated with a first radio access technology and the RRC connection is associated with a second radio access technology. The operations of 2105 may be performed according to the methods described herein. In some examples, aspects of the operations of 2105 may be performed by an RRC manager as described with reference to FIGS. 16 through 19.

At 2110, the base station may receive, over the RRC connection of a second radio access technology, an RLF report from the UE that includes information about one or more directional beams associated with the RLF event. The operations of 2110 may be performed according to the methods described herein. In some examples, aspects of the operations of 2110 may be performed by an RLF report manager as described with reference to FIGS. 16 through 19.

At 2115, the base station may transmit a message to another cell of a network based on receiving the RLF report, the message including at least a portion of the information about the one or more directional beams associated with the RLF event. The operations of 2115 may be performed according to the methods described herein. In some examples, aspects of the operations of 2115 may be performed by an RLF message manager as described with reference to FIGS. 16 through 19.

Figure 22:
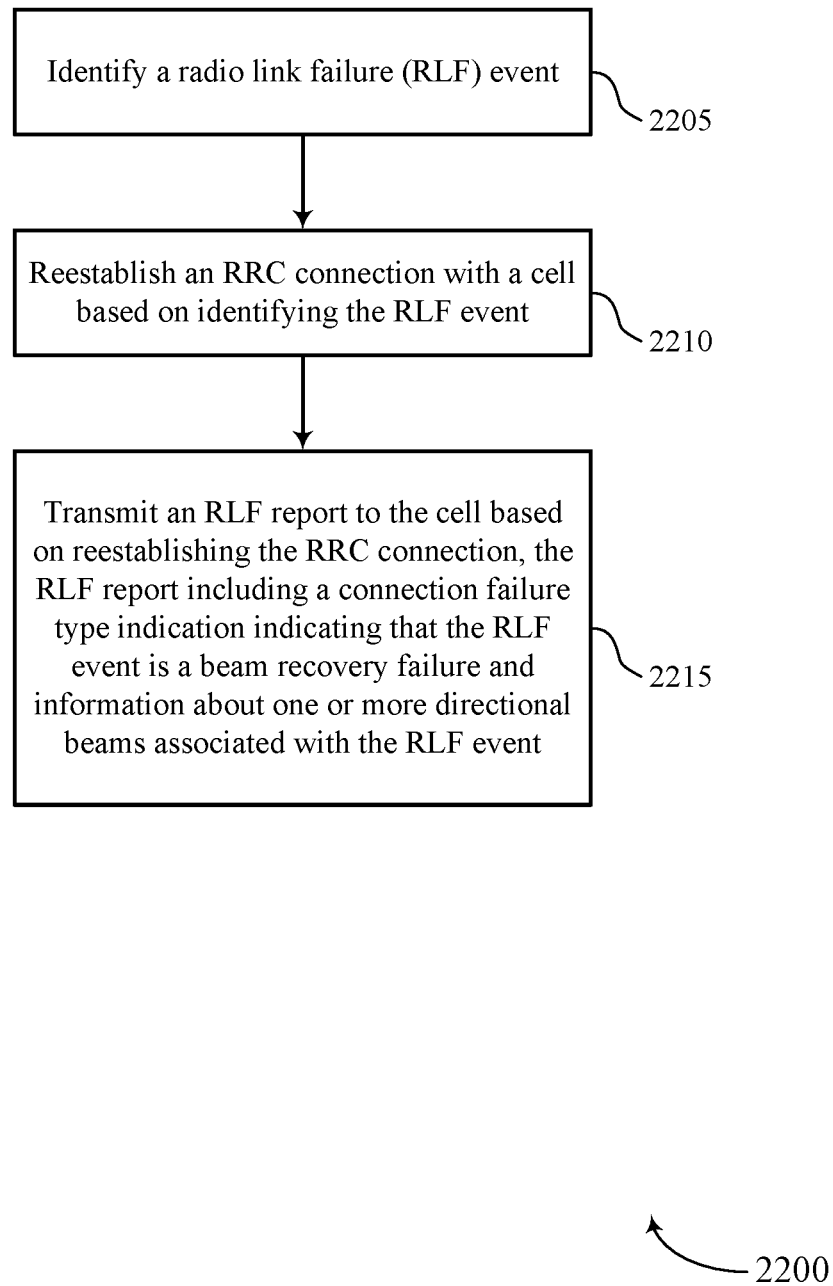

FIG. 22 shows a flowchart illustrating a method 2200 that supports techniques for communicating mobility information in accordance with aspects of the present disclosure. The operations of method 2200 may be implemented by a UE 115 or its components as described herein. For example, the operations of method 2200 may be performed by a UE Coding Manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2205, the UE may identify an RLF event. The operations of 2205 may be performed according to the methods described herein. In some examples, aspects of the operations of 2205 may be performed by an RLF manager as described with reference to FIGS. 12 through 15.

At 2210, the UE may reestablish an RRC connection with a cell based on identifying the RLF event. The operations of 2210 may be performed according to the methods described herein. In some examples, aspects of the operations of 2210 may be performed by an RRC manager as described with reference to FIGS. 12 through 15.

At 2215, the UE may transmit an RLF report to the cell based on reestablishing the RRC connection, the RLF report including a connection failure type indication indicating that the RLF event is a beam recovery failure and information about one or more directional beams associated with the RLF event. The operations of 2215 may be performed according to the methods described herein. In some examples, aspects of the operations of 2215 may be performed by an RLF report manager as described with reference to FIGS. 12 through 15.

Figure 23:
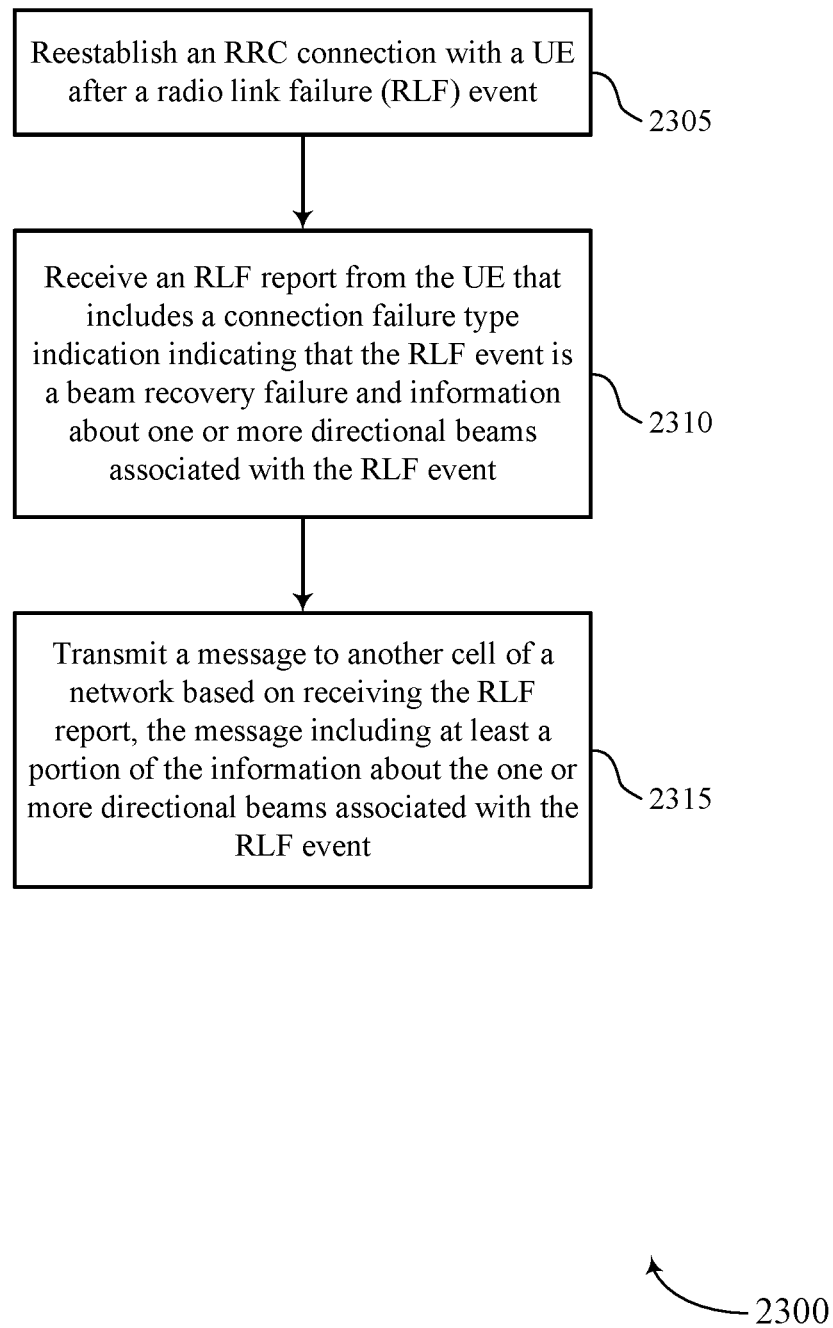

FIG. 23 shows a flowchart illustrating a method 2300 that supports techniques for communicating mobility information in accordance with aspects of the present disclosure. The operations of method 2300 may be implemented by a base station 105 or its components as described herein. For example, the operations of method 2300 may be performed by a communications manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2305, the base station may reestablish an RRC connection with a UE after an RLF event. The operations of 2305 may be performed according to the methods described herein. In some examples, aspects of the operations of 2305 may be performed by an RRC manager as described with reference to FIGS. 16 through 19.

At 2310, the base station may receive an RLF report from the UE that includes a connection failure type indication indicating that the RLF event is a beam recovery failure and information about one or more directional beams associated with the RLF event. The operations of 2310 may be performed according to the methods described herein. In some examples, aspects of the operations of 2310 may be performed by an RLF report manager as described with reference to FIGS. 16 through 19.

At 2315, the base station may transmit a message to another cell of a network based on receiving the RLF report, the message including at least a portion of the information about the one or more directional beams associated with the RLF event. The operations of 2315 may be performed according to the methods described herein. In some examples, aspects of the operations of 2315 may be performed by an RLF message manager as described with reference to FIGS. 16 through 19.

Figure 24:
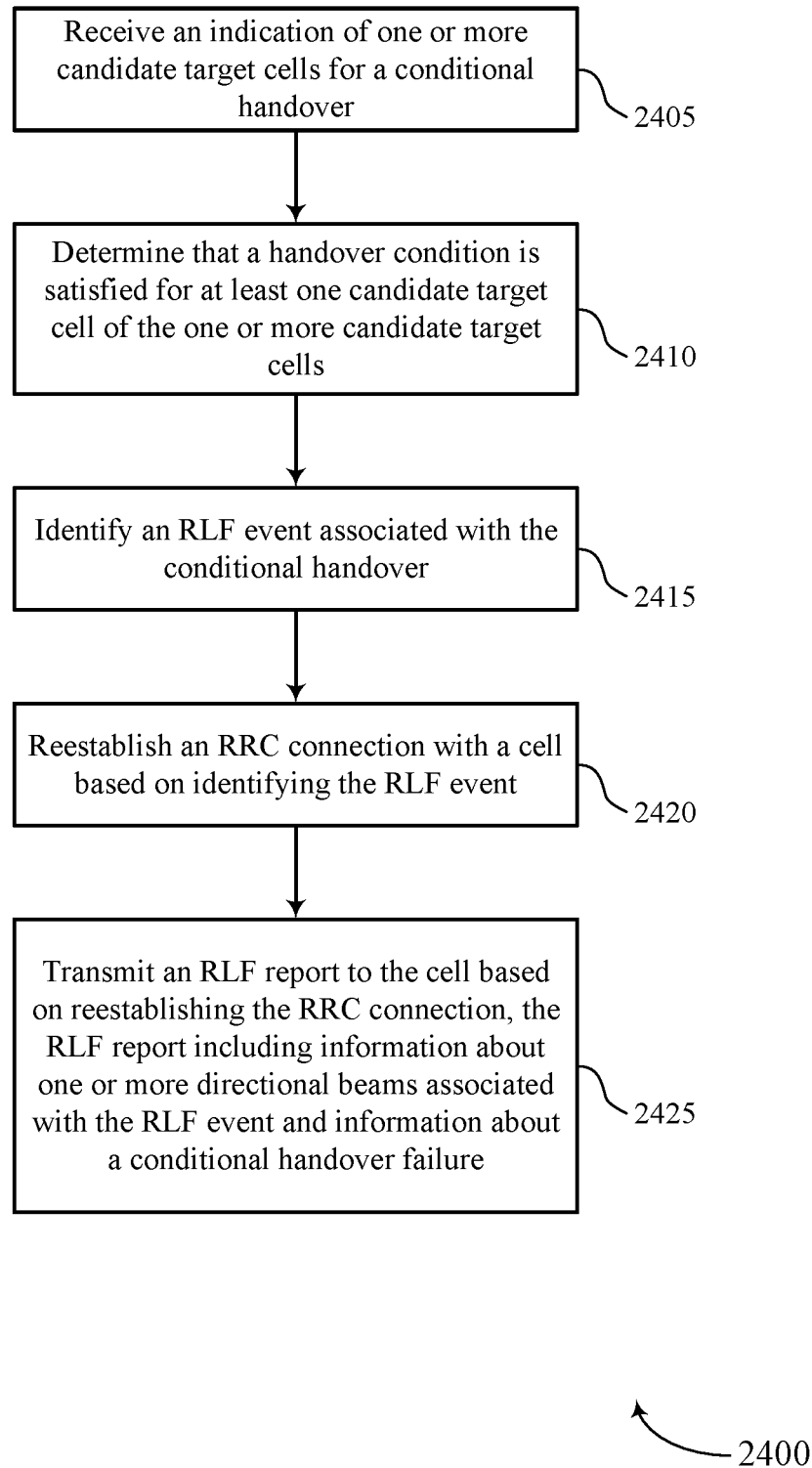

FIG. 24 shows a flowchart illustrating a method 2400 that supports techniques for communicating mobility information in accordance with aspects of the present disclosure. The operations of method 2400 may be implemented by a UE 115 or its components as described herein. For example, the operations of method 2400 may be performed by a UE Coding Manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2405, the UE may receive an indication of one or more candidate target cells for a conditional handover. The operations of 2405 may be performed according to the methods described herein. In some examples, aspects of the operations of 2405 may be performed by a conditional handover manager as described with reference to FIGS. 12 through 15.

At 2410, the UE may determine that a handover condition is satisfied for at least one candidate target cell of the one or more candidate target cells. The operations of 2410 may be performed according to the methods described herein. In some examples, aspects of the operations of 2410 may be performed by a conditional handover manager as described with reference to FIGS. 12 through 15.

At 2415, the UE may identify an RLF event associated with the conditional handover. The operations of 2415 may be performed according to the methods described herein. In some examples, aspects of the operations of 2415 may be performed by an RLF manager as described with reference to FIGS. 12 through 15.

At 2420, the UE may reestablish an RRC connection with a cell based on identifying the RLF event. The operations of 2420 may be performed according to the methods described herein. In some examples, aspects of the operations of 2420 may be performed by an RRC manager as described with reference to FIGS. 12 through 15.

At 2425, the UE may transmit an RLF report to the cell based on reestablishing the RRC connection, the RLF report including information about one or more directional beams associated with the RLF event and information about a conditional handover failure. The operations of 2425 may be performed according to the methods described herein. In some examples, aspects of the operations of 2425 may be performed by an RLF report manager as described with reference to FIGS. 12 through 15.

Figure 25:
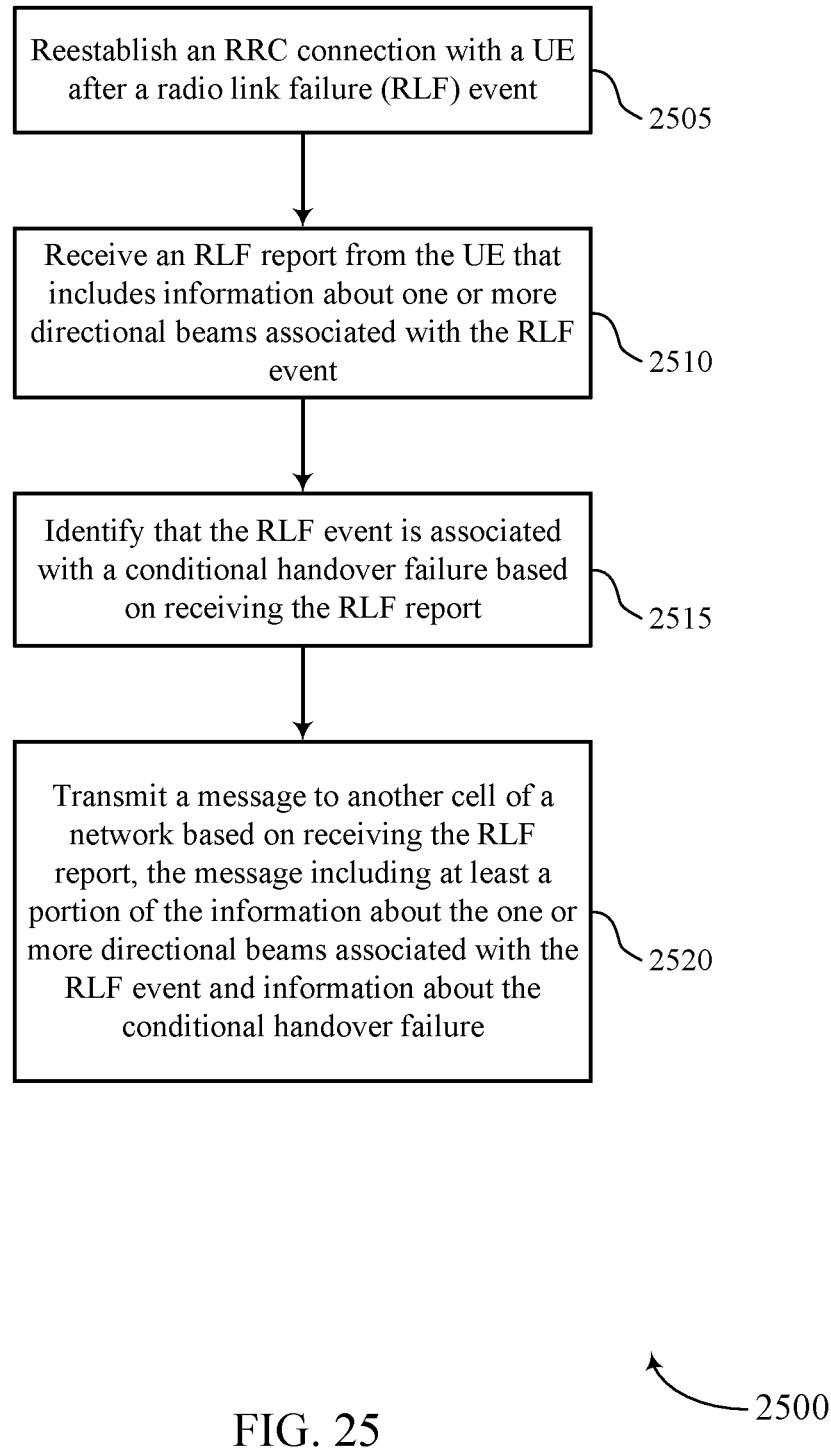

FIG. 25 shows a flowchart illustrating a method 2500 that supports techniques for communicating mobility information in accordance with aspects of the present disclosure. The operations of method 2500 may be implemented by a base station 105 or its components as described herein. For example, the operations of method 2500 may be performed by a communications manager as described with reference to FIGS. 16 through 19. In some examples, a base station may execute a set of instructions to control the functional elements of the base station to perform the functions described below. Additionally or alternatively, a base station may perform aspects of the functions described below using special-purpose hardware.

At 2505, the base station may reestablish an RRC connection with a UE after an RLF event. The operations of 2505 may be performed according to the methods described herein. In some examples, aspects of the operations of 2505 may be performed by an RRC manager as described with reference to FIGS. 16 through 19.

At 2510, the base station may receive an RLF report from the UE that includes information about one or more directional beams associated with the RLF event. The operations of 2510 may be performed according to the methods described herein. In some examples, aspects of the operations of 2510 may be performed by an RLF report manager as described with reference to FIGS. 16 through 19.

At 2515, the base station may identify that the RLF event is associated with a conditional handover failure based on receiving the RLF report. The operations of 2515 may be performed according to the methods described herein. In some examples, aspects of the operations of 2515 may be performed by a conditional handover manager as described with reference to FIGS. 16 through 19.

At 2520, the base station may transmit a message to another cell of a network based on receiving the RLF report, the message including at least a portion of the information about the one or more directional beams associated with the RLF event and information about the conditional handover failure. The operations of 2520 may be performed according to the methods described herein. In some examples, aspects of the operations of 2520 may be performed by an RLF message manager as described with reference to FIGS. 16 through 19.

Figure 26:
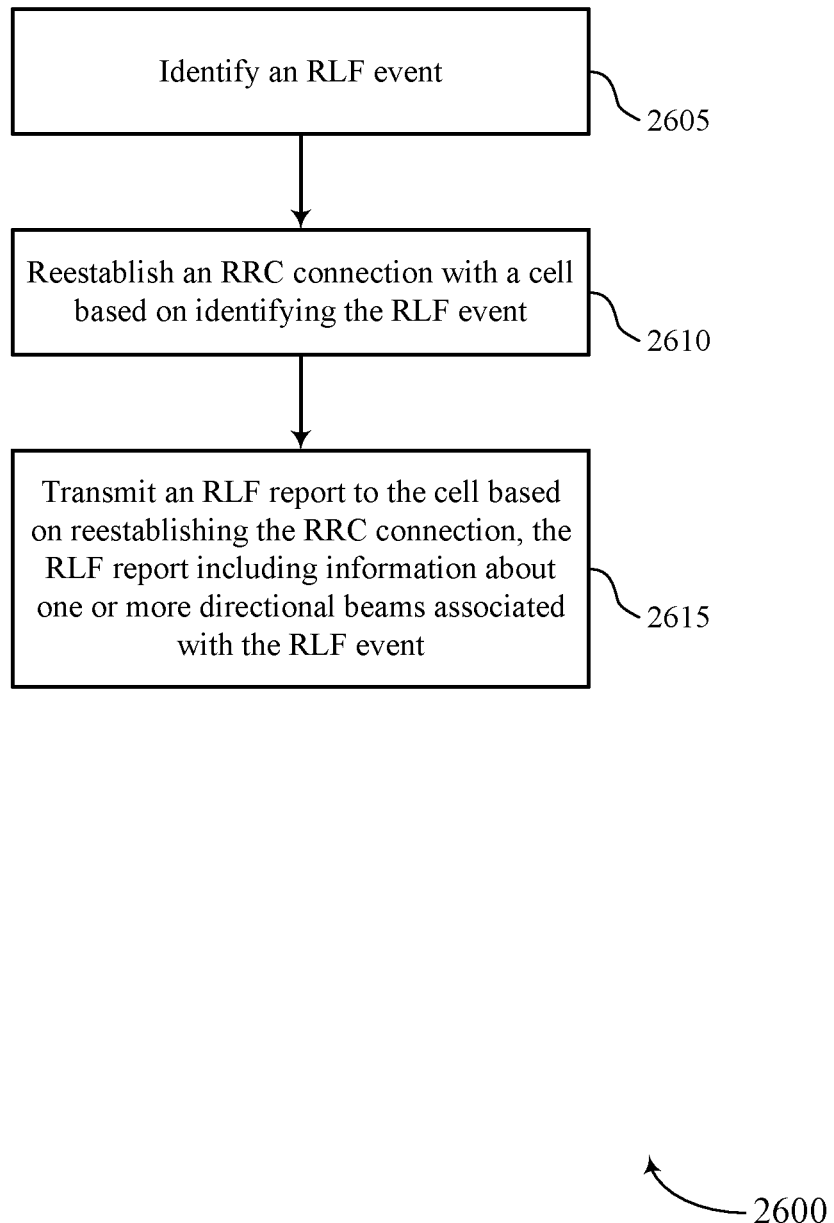

FIG. 26 shows a flowchart illustrating a method 2600 that supports techniques for communicating mobility information in accordance with one or more aspects of the present disclosure. The operations of method 2600 may be implemented by a UE 115 or its components as described herein. For example, the operations of method 2600 may be performed by a communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2605, the UE may identify an RLF event. The operations of 2605 may be performed according to the methods described herein. In some examples, aspects of the operations of 2605 may be performed by an RLF manager as described with reference to FIGS. 12 through 15.

At 2610, the UE may reestablish an RRC connection with a cell based on identifying the RLF event. The operations of 2610 may be performed according to the methods described herein. In some examples, aspects of the operations of 2610 may be performed by an RRC manager as described with reference to FIGS. 12 through 15.

At 2615, the UE may transmit an RLF report to the cell based on reestablishing the RRC connection, the RLF report including information about one or more directional beams associated with the RLF event. The operations of 2615 may be performed according to the methods described herein. In some examples, aspects of the operations of 2615 may be performed by an RLF report manager as described with reference to FIGS. 12 through 15.

Figure 27:
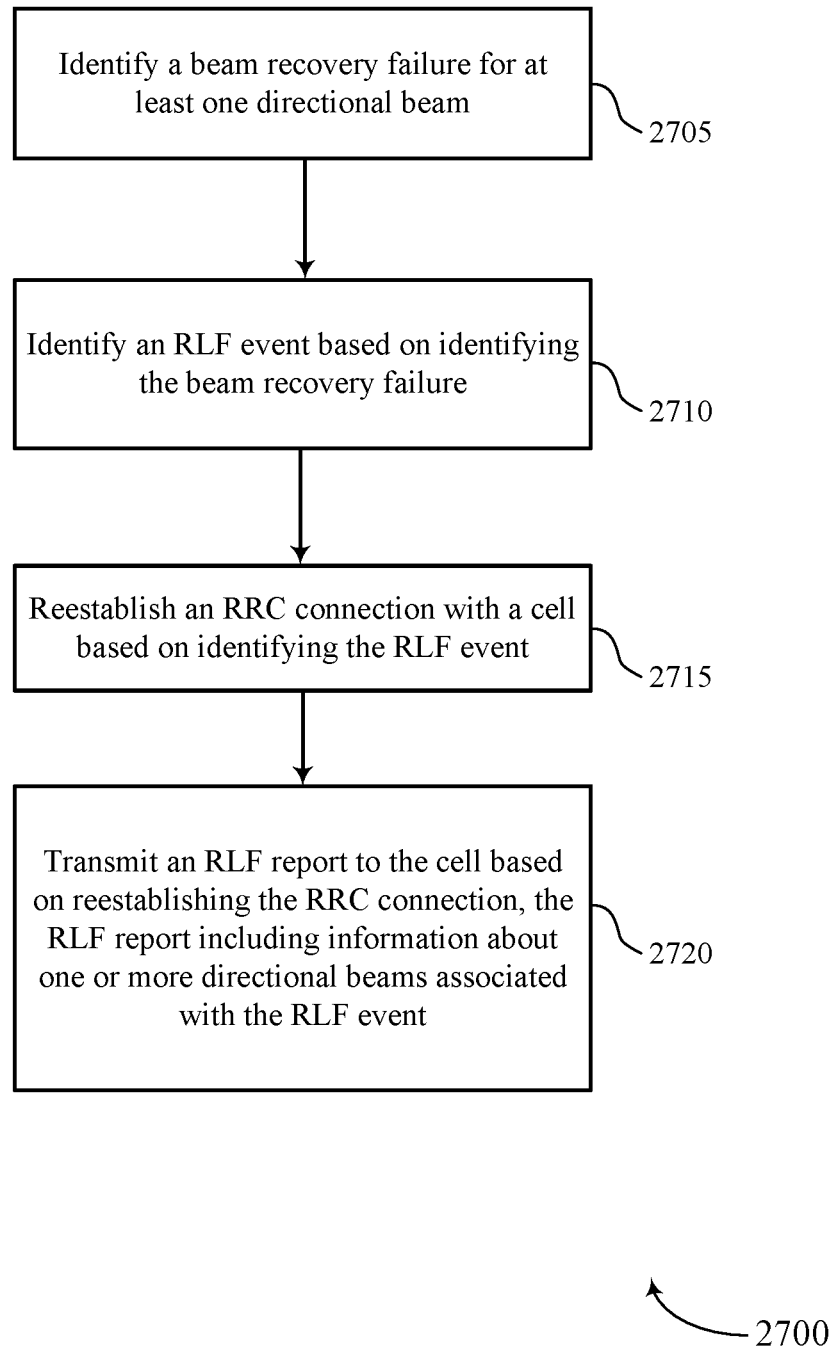

FIG. 27 shows a flowchart illustrating a method 2700 that supports techniques for communicating mobility information in accordance with one or more aspects of the present disclosure. The operations of method 2700 may be implemented by a UE 115 or its components as described herein. For example, the operations of method 2700 may be performed by a communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2705, the UE may identify a beam recovery failure for at least one directional beam. The operations of 2705 may be performed according to the methods described herein. In some examples, aspects of the operations of 2705 may be performed by an RLF manager as described with reference to FIGS. 12 through 15.

At 2710, the UE may identify an RLF event based on identifying the beam recovery failure. The operations of 2710 may be performed according to the methods described herein. In some examples, aspects of the operations of 2710 may be performed by an RLF manager as described with reference to FIGS. 12 through 15.

At 2715, the UE may reestablish an RRC connection with a cell based on identifying the RLF event. The operations of 2715 may be performed according to the methods described herein. In some examples, aspects of the operations of 2715 may be performed by an RRC manager as described with reference to FIGS. 12 through 15.

At 2720, the UE may transmit an RLF report to the cell based on reestablishing the RRC connection, the RLF report including information about one or more directional beams associated with the RLF event. In some examples a field in the RLF report may indicate that a type of the RLF event includes a beam recovery failure. The operations of 2720 may be performed according to the methods described herein. In some examples, aspects of the operations of 2720 may be performed by an RLF report manager as described with reference to FIGS. 12 through 15.

Figure 28:
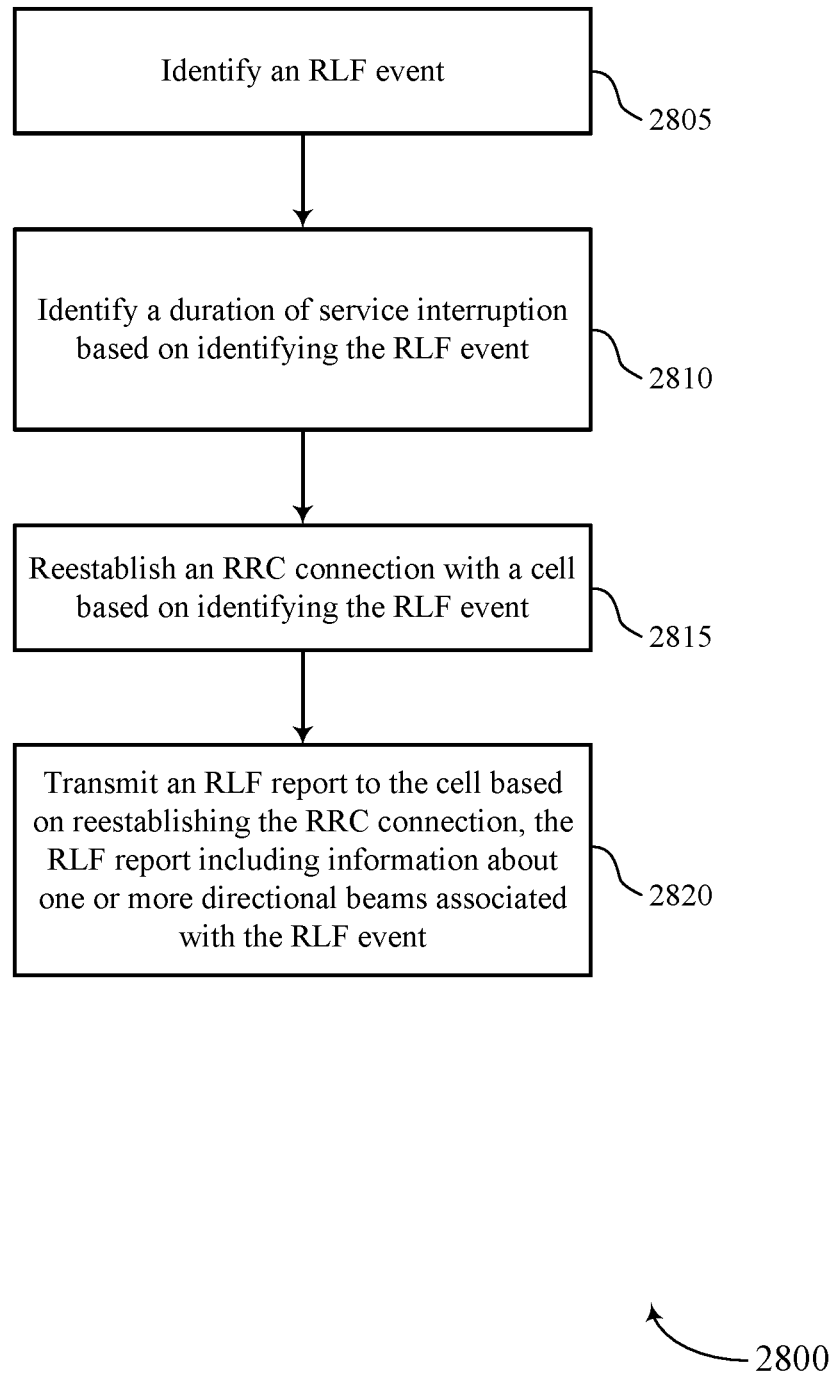

FIG. 28 shows a flowchart illustrating a method 2800 that supports techniques for communicating mobility information in accordance with one or more aspects of the present disclosure. The operations of method 2800 may be implemented by a UE 115 or its components as described herein. For example, the operations of method 2800 may be performed by a communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2805, the UE may identify an RLF event. The operations of 2805 may be performed according to the methods described herein. In some examples, aspects of the operations of 2805 may be performed by an RLF manager as described with reference to FIGS. 12 through 15.

At 2810, the UE may identify a duration of a service interruption based on identifying the RLF event. The operations of 2810 may be performed according to the methods described herein. In some examples, aspects of the operations of 2810 may be performed by a service interruption manager as described with reference to FIGS. 12 through 15.

At 2815, the UE may reestablish an RRC connection with a cell based on identifying the RLF event. The operations of 2815 may be performed according to the methods described herein. In some examples, aspects of the operations of 2815 may be performed by an RRC manager as described with reference to FIGS. 12 through 15.

At 2820, the UE may transmit an RLF report to the cell based on reestablishing the RRC connection, the RLF report including information about one or more directional beams associated with the RLF event. The RLF report may indicate the duration of the service interruption. The operations of 2820 may be performed according to the methods described herein. In some examples, aspects of the operations of 2820 may be performed by an RLF report manager as described with reference to FIGS. 12 through 15.

Figure 29:
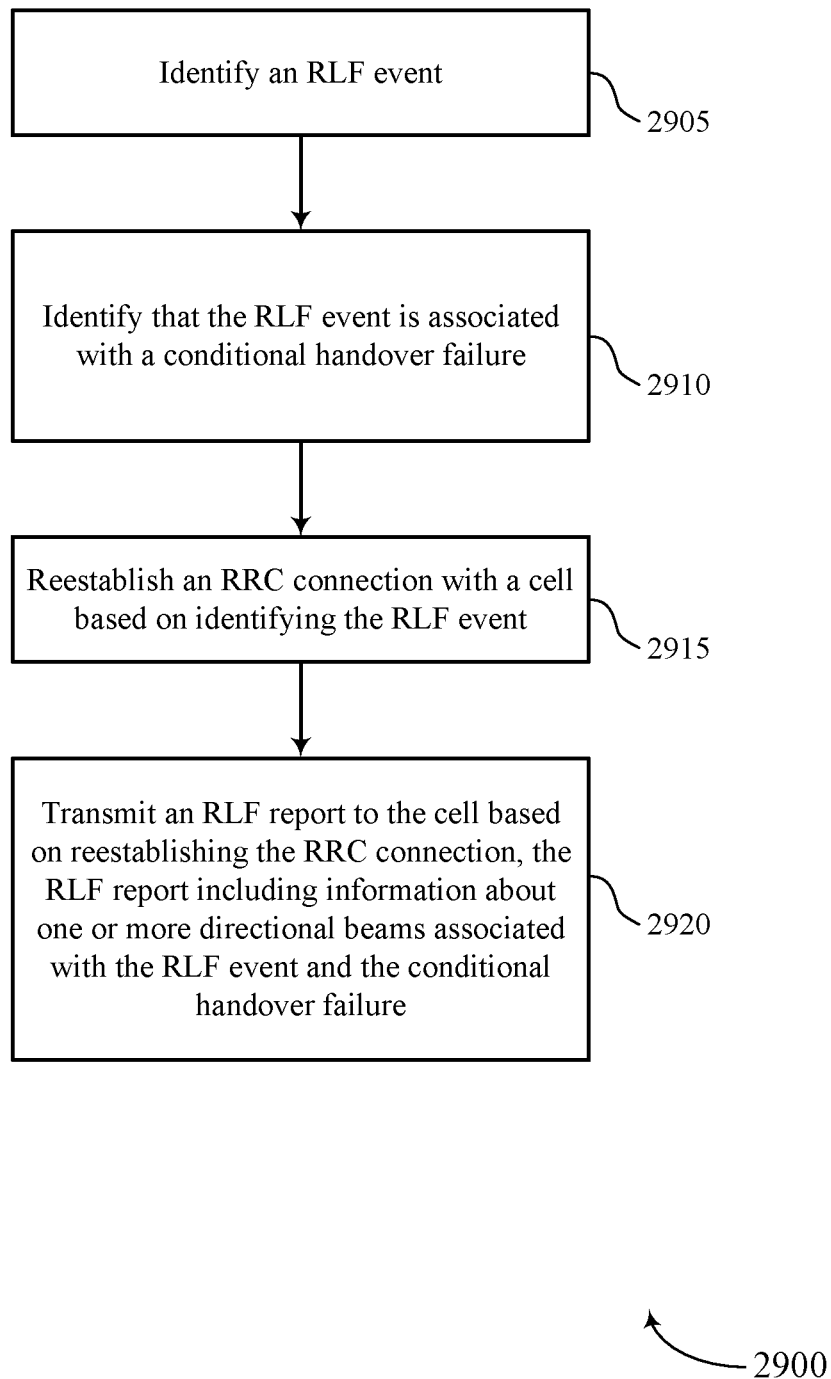

FIG. 29 shows a flowchart illustrating a method 2900 that supports techniques for communicating mobility information in accordance with one or more aspects of the present disclosure. The operations of method 2900 may be implemented by a UE 115 or its components as described herein. For example, the operations of method 2900 may be performed by a communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 2905, the UE may identify an RLF event. The operations of 2905 may be performed according to the methods described herein. In some examples, aspects of the operations of 2905 may be performed by an RLF manager as described with reference to FIGS. 12 through 15.

At 2910, the UE may identify that the RLF event is associated with a conditional handover failure. The operations of 2910 may be performed according to the methods described herein. In some examples, aspects of the operations of 2910 may be performed by a conditional handover manager as described with reference to FIGS. 12 through 15.

At 2915, the UE may reestablish an RRC connection with a cell based on identifying the RLF event. The operations of 2915 may be performed according to the methods described herein. In some examples, aspects of the operations of 2915 may be performed by an RRC manager as described with reference to FIGS. 12 through 15.

At 2920, the UE may transmit an RLF report to the cell based on reestablishing the RRC connection, the RLF report including information about one or more directional beams associated with the RLF event and the conditional handover failure. The operations of 2920 may be performed according to the methods described herein. In some examples, aspects of the operations of 2920 may be performed by an RLF report manager as described with reference to FIGS. 12 through 15.

Figure 30:
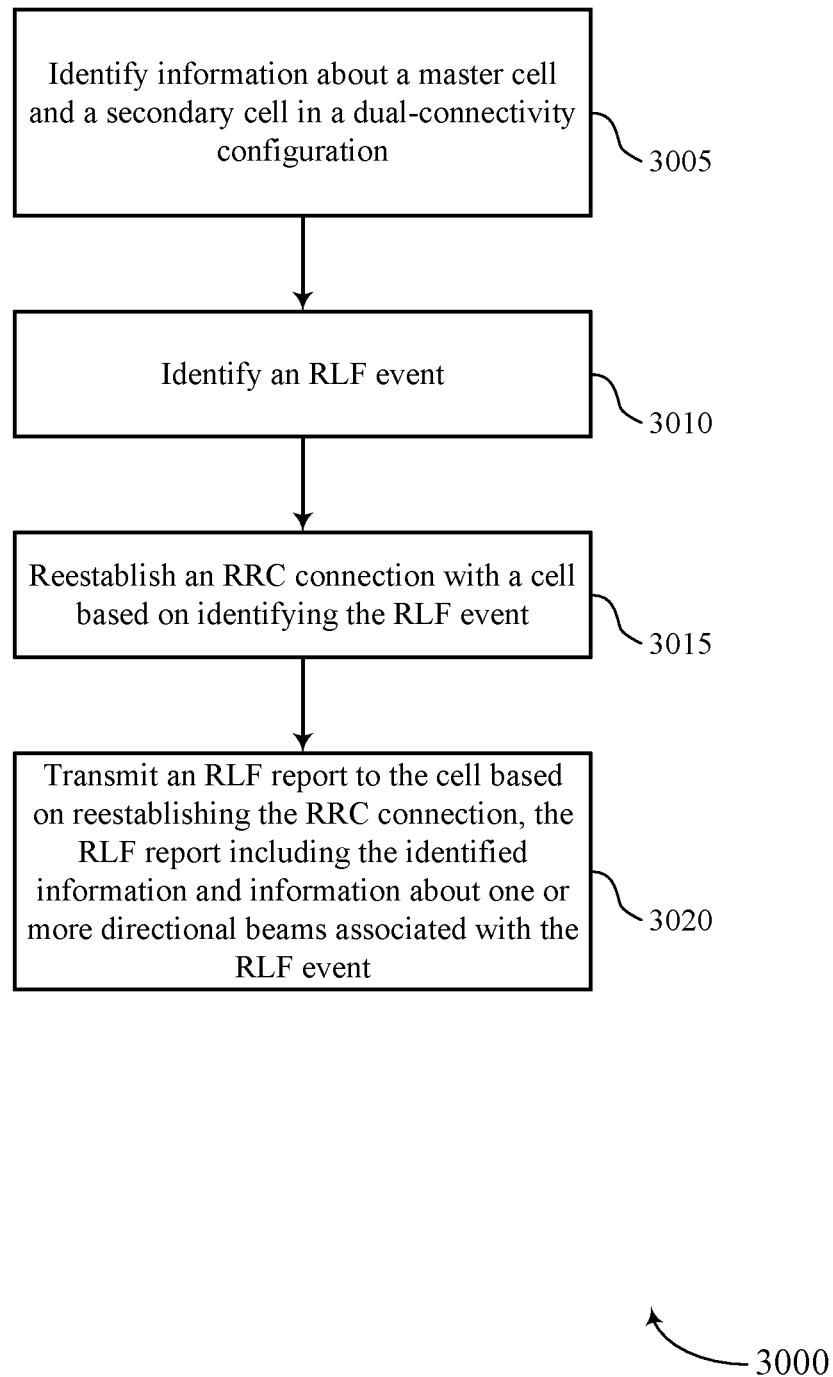

FIG. 30 shows a flowchart illustrating a method 3000 that supports techniques for communicating mobility information in accordance with one or more aspects of the present disclosure. The operations of method 3000 may be implemented by a UE 115 or its components as described herein. For example, the operations of method 3000 may be performed by a communications manager as described with reference to FIGS. 12 through 15. In some examples, a UE may execute a set of instructions to control the functional elements of the UE to perform the functions described below. Additionally or alternatively, a UE may perform aspects of the functions described below using special-purpose hardware.

At 3005, the UE may identify information about a master cell and a secondary cell in a dual-connectivity configuration. The RLF report may include the identified information. The operations of 3005 may be performed according to the methods described herein. In some examples, aspects of the operations of 3005 may be performed by a dual-connectivity manager as described with reference to FIGS. 12 through 15.

At 3010, the UE may identify an RLF event. The operations of 3010 may be performed according to the methods described herein. In some examples, aspects of the operations of 3010 may be performed by an RLF manager as described with reference to FIGS. 12 through 15.

At 3015, the UE may reestablish an RRC connection with a cell based on identifying the RLF event. The operations of 3015 may be performed according to the methods described herein. In some examples, aspects of the operations of 3015 may be performed by an RRC manager as described with reference to FIGS. 12 through 15.

At 3020, the UE may transmit an RLF report to the cell based on reestablishing the RRC connection, the RLF report including the identified information and information about one or more directional beams associated with the RLF event. The operations of 3020 may be performed according to the methods described herein. In some examples, aspects of the operations of 3020 may be performed by an RLF report manager as described with reference to FIGS. 12 through 15.

Figure 31:
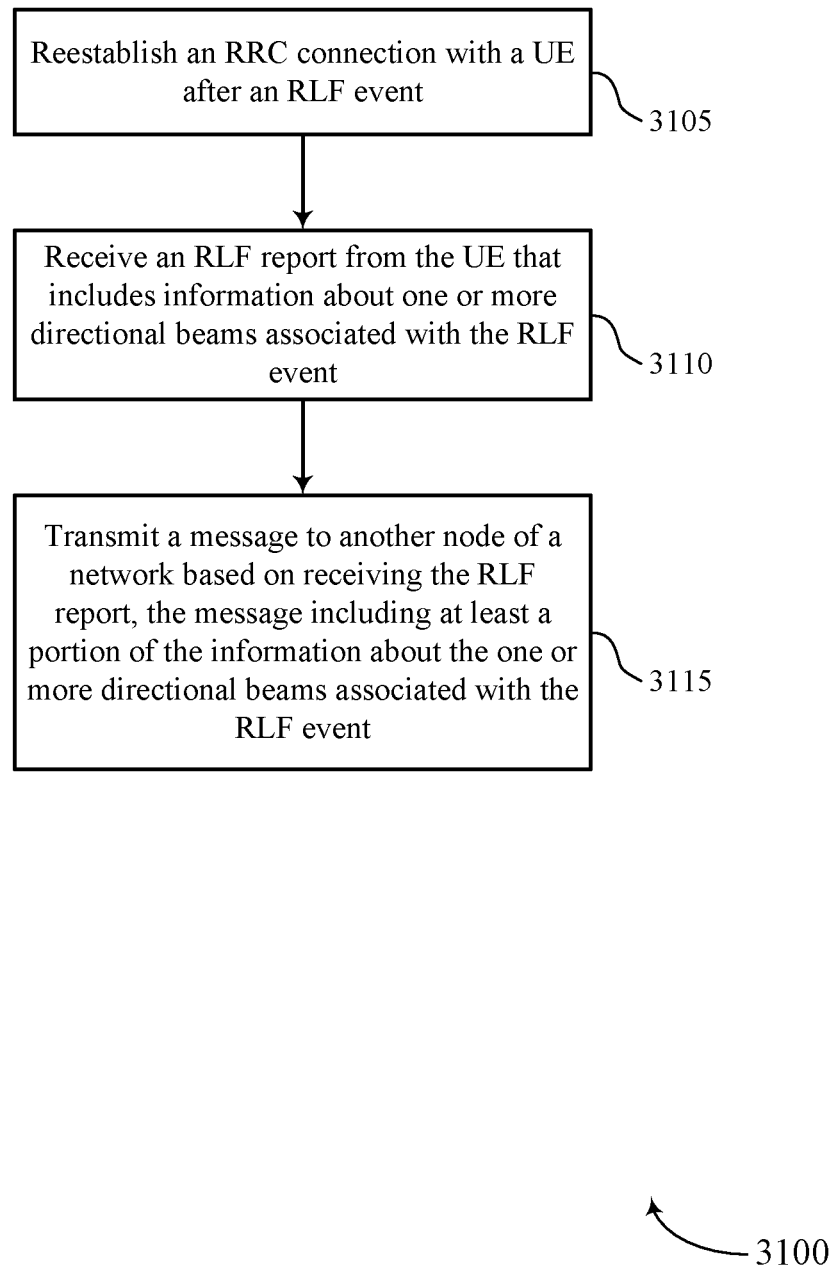

FIG. 31 shows a flowchart illustrating a method 3100 that supports techniques for communicating mobility information in accordance with one or more aspects of the present disclosure. The operations of method 3100 may be implemented by a base station 105 or its components as described herein. For example, the operations of method 3100 may be performed by a communications manager as described with reference to FIGS. 16 through 19. In some examples, the base station 105 may be an example of a cell, a node, a cell group, or any combination thereof. In some examples, a base station may execute a set of instructions to control the functional elements of the base station to perform the functions described below. Additionally or alternatively, a base station may perform aspects of the functions described below using special-purpose hardware.

At 3105, the base station may reestablish an RRC connection with a UE after an RLF event. The operations of 3105 may be performed according to the methods described herein. In some examples, aspects of the operations of 3105 may be performed by an RRC manager as described with reference to FIGS. 16 through 19.

At 3110, the base station may receive an RLF report from the UE that includes information about one or more directional beams associated with the RLF event. The operations of 3110 may be performed according to the methods described herein. In some examples, aspects of the operations of 3110 may be performed by an RLF report manager as described with reference to FIGS. 16 through 19.

At 3115, the base station may transmit a message to another node of a network based on receiving the RLF report, the message including at least a portion of the information about the one or more directional beams associated with the RLF event. The operations of 3115 may be performed according to the methods described herein. In some examples, aspects of the operations of 3115 may be performed by an RLF message manager as described with reference to FIGS. 16 through 19.

Figure 32:
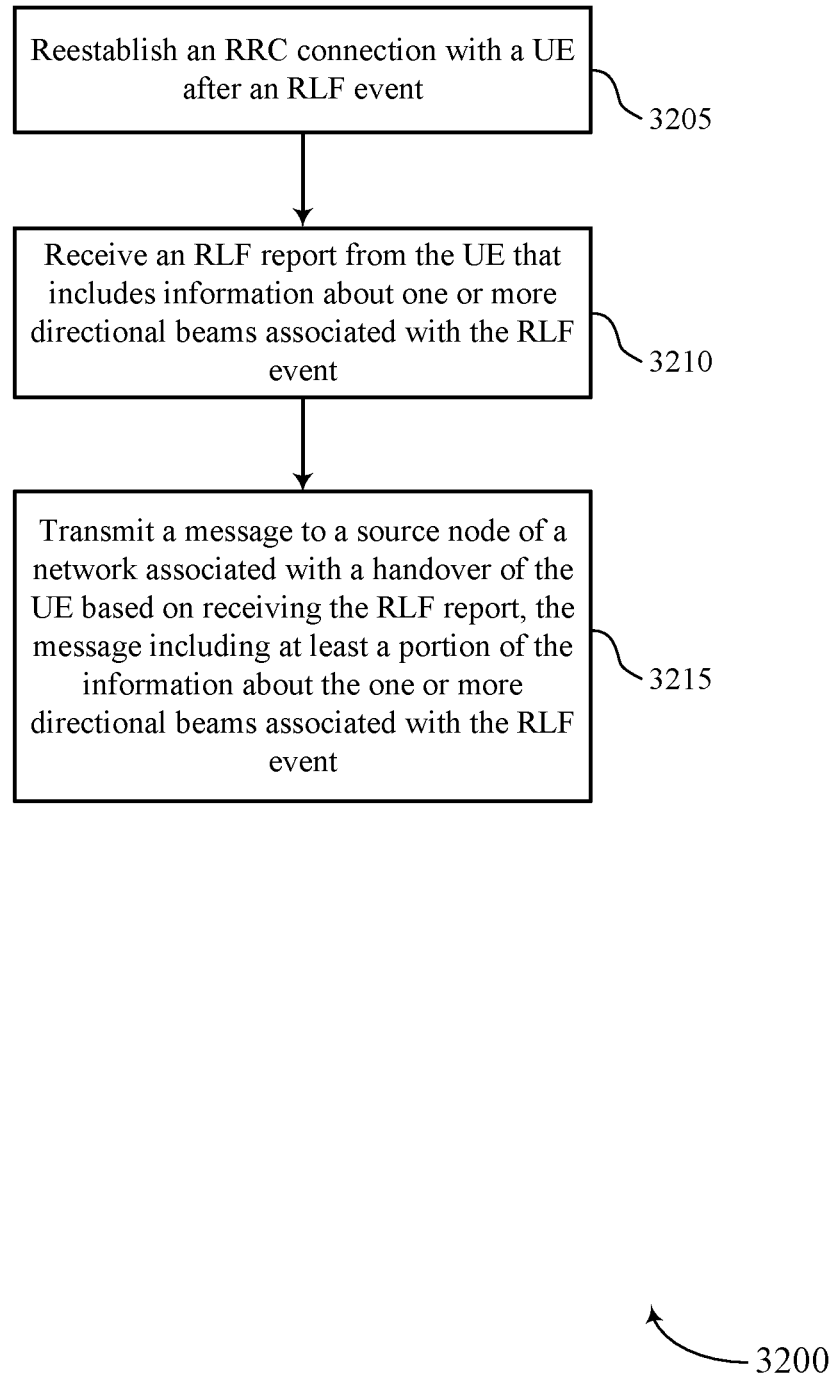

FIG. 32 shows a flowchart illustrating a method 3200 that supports techniques for communicating mobility information in accordance with one or more aspects of the present disclosure. The operations of method 3200 may be implemented by a base station 105 or its components as described herein. For example, the operations of method 3200 may be performed by a communications manager as described with reference to FIGS. 16 through 19. In some examples, the base station 105 may be an example of a cell, a node, a cell group, or any combination thereof. In some examples, a base station may execute a set of instructions to control the functional elements of the base station to perform the functions described below. Additionally or alternatively, a base station may perform aspects of the functions described below using special-purpose hardware.

At 3205, the base station may reestablish an RRC connection with a UE after an RLF event. The operations of 3205 may be performed according to the methods described herein. In some examples, aspects of the operations of 3205 may be performed by an RRC manager as described with reference to FIGS. 16 through 19.

At 3210, the base station may receive an RLF report from the UE that includes information about one or more directional beams associated with the RLF event. The operations of 3210 may be performed according to the methods described herein. In some examples, aspects of the operations of 3210 may be performed by an RLF report manager as described with reference to FIGS. 16 through 19.

At 3215, the base station may transmit a message to a source node of a network associated with a handover of the UE based on receiving the RLF report, the message including at least a portion of the information about the one or more directional beams associated with the RLF event. The operations of 3215 may be performed according to the methods described herein. In some examples, aspects of the operations of 3215 may be performed by an RLF message manager as described with reference to FIGS. 16 through 19.

Figure 33:
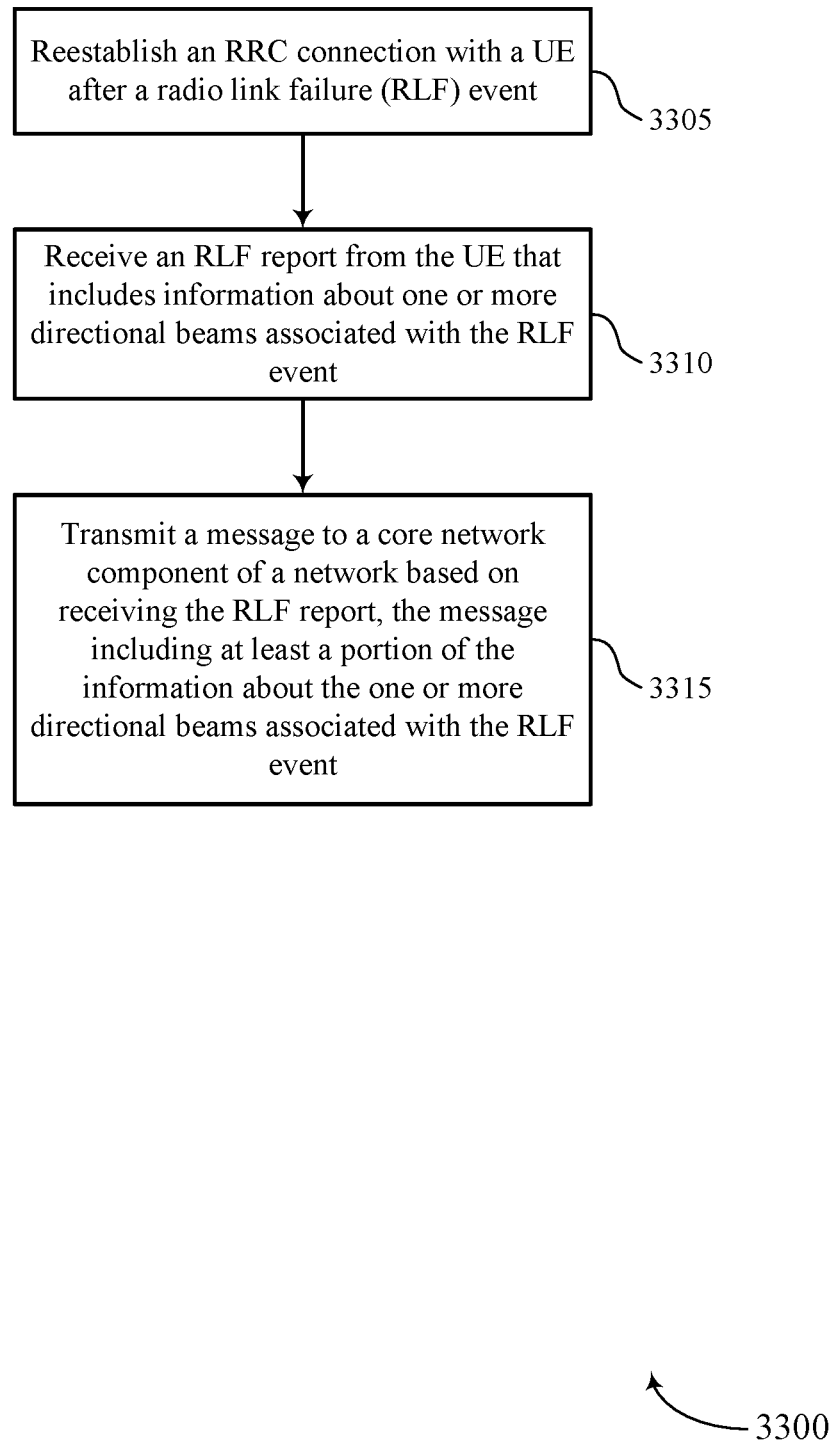

FIG. 33 shows a flowchart illustrating a method 3300 that supports techniques for communicating mobility information in accordance with one or more aspects of the present disclosure. The operations of method 3300 may be implemented by a base station 105 or its components as described herein. In some examples, the operations of method 2700 may be implemented by a cell, a node, a cell group, or any combination thereof. For example, the operations of method 3300 may be performed by a communications manager as described with reference to FIGS. 16 through 19. In some examples, the base station 105 may be an example of a cell, a node, a cell group, or any combination thereof. In some examples, a base station may execute a set of instructions to control the functional elements of the base station to perform the functions described below. Additionally or alternatively, a base station may perform aspects of the functions described below using special-purpose hardware.

At 3305, the base station may reestablish an RRC connection with a UE after an RLF event. The operations of 3305 may be performed according to the methods described herein. In some examples, aspects of the operations of 3305 may be performed by an RRC manager as described with reference to FIGS. 16 through 19.

At 3310, the base station may receive an RLF report from the UE that includes information about one or more directional beams associated with the RLF event. The operations of 3310 may be performed according to the methods described herein. In some examples, aspects of the operations of 3310 may be performed by an RLF report manager as described with reference to FIGS. 16 through 19.

At 3315, the base station may transmit a message to core network component of a network based on receiving the RLF report, the message including at least a portion of the information about the one or more directional beams associated with the RLF event. The core network component may communicate at least some of the information in the message to a source node associated with a handover of the UE. The operations of 3315 may be performed according to the methods described herein. In some examples, aspects of the operations of 3315 may be performed by an RLF message manager as described with reference to FIGS. 16 through 19.

Figure 34:
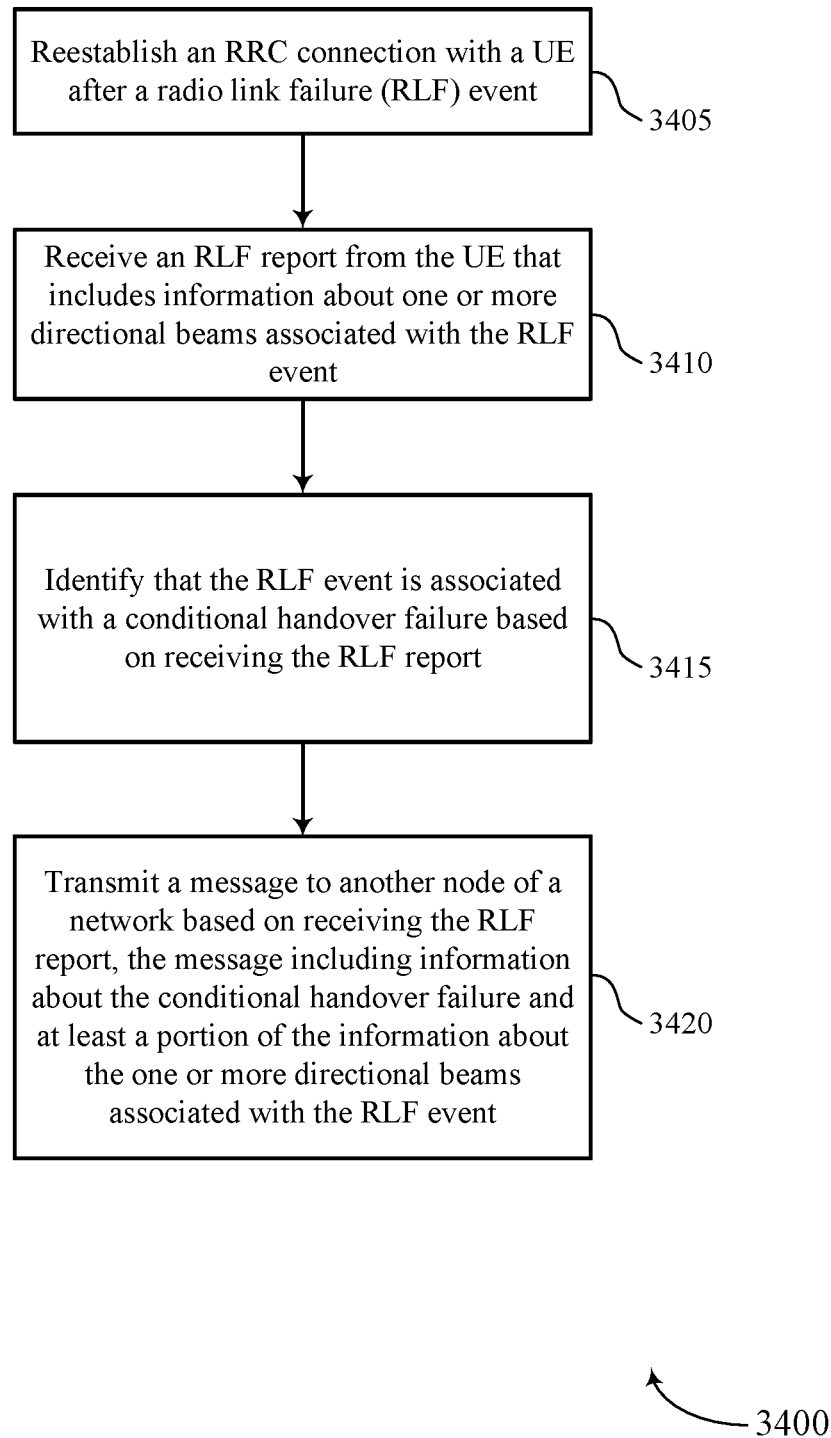

FIG. 34 shows a flowchart illustrating a method 3400 that supports techniques for communicating mobility information in accordance with one or more aspects of the present disclosure. The operations of method 3400 may be implemented by a base station 105 or its components as described herein. In some examples, the operations of method 2800 may be implemented by a cell, a node, a cell group, or any combination thereof. For example, the operations of method 3400 may be performed by a communications manager as described with reference to FIGS. 16 through 19. In some examples, the base station 105 may be an example of a cell, a node, a cell group, or any combination thereof. In some examples, a base station may execute a set of instructions to control the functional elements of the base station to perform the functions described below. Additionally or alternatively, a base station may perform aspects of the functions described below using special-purpose hardware.

At 3405, the base station may reestablish an RRC connection with a UE after an RLF event. The operations of 3405 may be performed according to the methods described herein. In some examples, aspects of the operations of 3405 may be performed by an RRC manager as described with reference to FIGS. 16 through 19.

At 3410, the base station may receive an RLF report from the UE that includes information about one or more directional beams associated with the RLF event. The operations of 3410 may be performed according to the methods described herein. In some examples, aspects of the operations of 3410 may be performed by an RLF report manager as described with reference to FIGS. 16 through 19.

At 3415, the base station may identify that the RLF event is associated with a conditional handover failure based on receiving the RLF report. The operations of 3415 may be performed according to the methods described herein. In some examples, aspects of the operations of 3415 may be performed by a conditional handover manager as described with reference to FIGS. 16 through 19.

At 3420, the base station may transmit a message to another node of a network based on receiving the RLF report, the message including information about the conditional handover failure and at least a portion of the information about the one or more directional beams associated with the RLF event. The operations of 3420 may be performed according to the methods described herein. In some examples, aspects of the operations of 3420 may be performed by an RLF message manager as described with reference to FIGS. 16 through 19.

Figure 35:
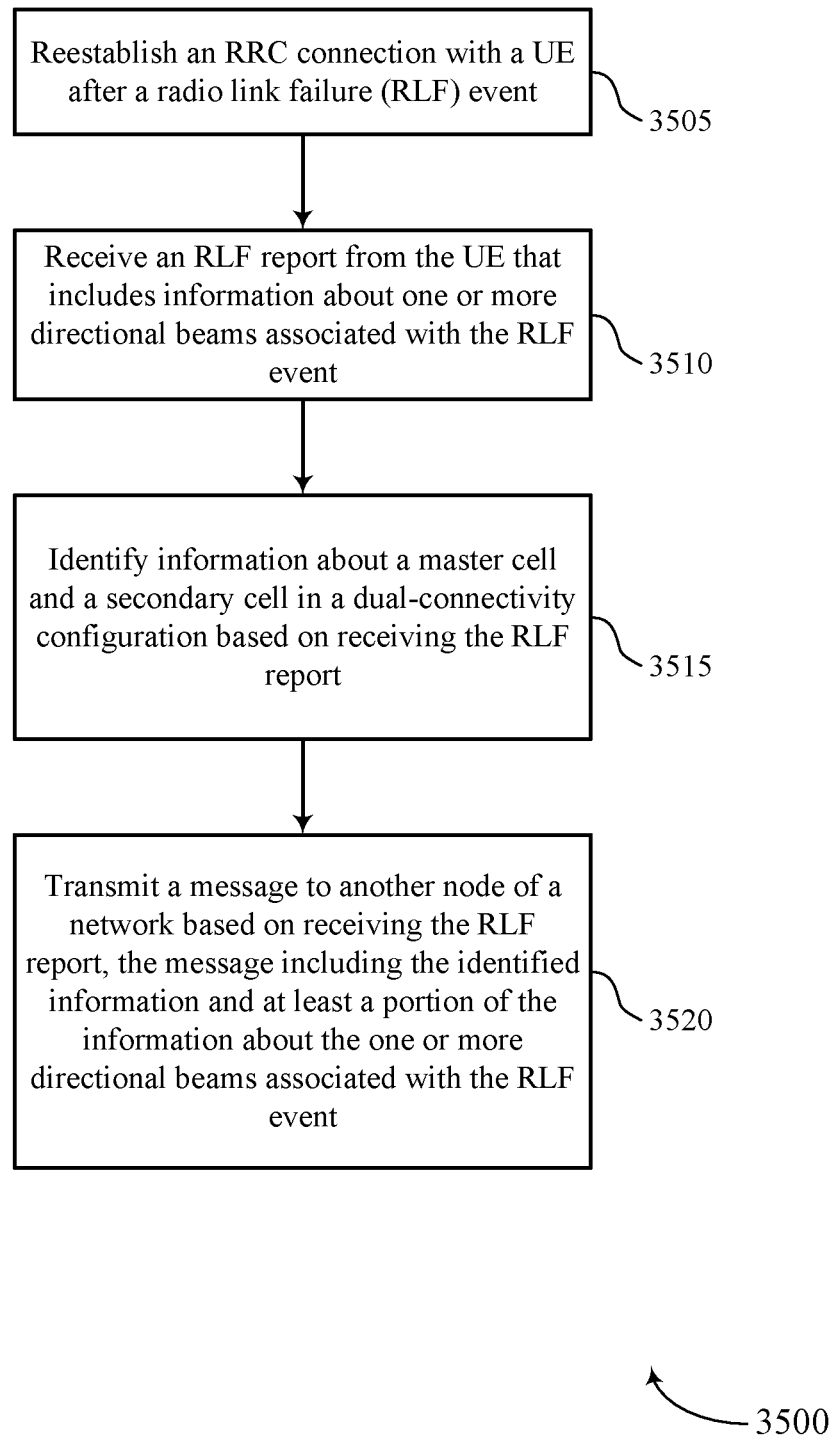

FIG. 35 shows a flowchart illustrating a method 3500 that supports techniques for communicating mobility information in accordance with one or more aspects of the present disclosure. The operations of method 3500 may be implemented by a base station 105 or its components as described herein. In some examples, the operations of method 2900 may be implemented by a cell, a node, a cell group, or any combination thereof. For example, the operations of method 3500 may be performed by a communications manager as described with reference to FIGS. 16 through 19. In some examples, the base station 105 may be an example of a cell, a node, a cell group, or any combination thereof. In some examples, a base station may execute a set of instructions to control the functional elements of the base station to perform the functions described below. Additionally or alternatively, a base station may perform aspects of the functions described below using special-purpose hardware.

At 3505, the base station may reestablish an RRC connection with a UE after an RLF event. The operations of 3505 may be performed according to the methods described herein. In some examples, aspects of the operations of 3505 may be performed by an RRC manager as described with reference to FIGS. 16 through 19.

At 3510, the base station may receive an RLF report from the UE that includes information about one or more directional beams associated with the RLF event. The operations of 3510 may be performed according to the methods described herein. In some examples, aspects of the operations of 3510 may be performed by an RLF report manager as described with reference to FIGS. 16 through 19.

At 3515, the base station may identify information about a master cell and a secondary cell in a dual-connectivity configuration based on receiving the RLF report. The operations of 3515 may be performed according to the methods described herein. In some examples, aspects of the operations of 3515 may be performed by a dual-connectivity manager as described with reference to FIGS. 16 through 19.

At 3520, the base station may transmit a message to another node of a network based on receiving the RLF report, the message including the identified information and at least a portion of the information about the one or more directional beams associated with the RLF event. The operations of 3520 may be performed according to the methods described herein. In some examples, aspects of the operations of 3520 may be performed by an RLF message manager as described with reference to FIGS. 16 through 19.

It should be noted that the methods described herein describe possible implementations, and that the operations and the functions may be rearranged or otherwise modified and that other implementations are possible. Further, aspects from two or more of the methods may be combined.

Example 1: A method for wireless communication, comprising: identifying an RLF event associated with a first RAT; reestablishing an RRC connection with a cell of a second RAT based on identifying the RLF event associated with the first RAT; and transmitting an RLF report to the cell based at least in part on reestablishing the RRC connection, the RLF report including information about one or more directional beams associated with the RLF event.

Example 2: The method of example 1, further comprising: identifying a beam recovery failure for at least one directional beam associated with the first RAT, wherein identifying the RLF event is based at least in part on identifying the beam recovery failure.

Example 3: The methods of any of examples 1 or 2, wherein the RLF report is configured to indicate whether the RLF event is a radio link failure, a handover failure, a beam recovery failure, or a combination thereof.

Example 4: The methods of any of examples 1-3, wherein a connection failure type indication in the RLF report is configured to indicate whether the RLF event is a radio link failure, a handover failure, a beam recovery failure, or a combination thereof.

Example 5: The methods of any of examples 1-4, further comprising: identifying a duration of a service interruption based at least in part on identifying the RLF event, wherein the RLF report indicates the duration of the service interruption.

Example 6: The method of example 5, wherein identifying the duration further comprises: identifying the duration between a first time when a UE loses data transmission capability at a source cell of the first RAT and a second time when the UE can resume data transmission at the cell, wherein the cell is of the second RAT.

Example 7: The method of example 5, wherein identifying the duration further comprises: identifying the duration between a time when a user equipment (UE) receives a handover command from a source cell and a time the UE transmits an RRC reconfiguration complete message to the cell.

Example 8: The method of example 5, wherein the duration is identified for each of a master cell and a secondary cell when dual connectivity is configured.

Example 9: The method of any of examples 1-8, wherein the RLF report includes an identifier of the one or more directional beams associated with the RLF event, beam reference signal received power of the one or more directional beams associated with the RLF event, a beam measurement of the one or more directional beams associated with the RLF event, or a combination thereof.

Example 10: The method of any of examples 1-9, further comprising: identifying that the RLF event is associated with a conditional handover failure, wherein the RLF report includes information about the conditional handover failure.

Example 11: The method of example 10, wherein the RLF report includes a duration between a last handover initialization and a connection failure, a candidate target cell list comprising at least the cell, measurement information for at least one target cell in the candidate target cell list, an indication about one or more target cells attempted to connect with after the RLF event occurs, a number of connection attempts after the RLF event occurs, or a combination thereof.

Example 12: The method of example 10, further comprising: receiving an indication of one or more candidate target cells for a conditional handover; determining that a handover condition is satisfied for at least one candidate target cell of the one or more candidate target cells, the at least one candidate target cell comprising the cell; and initiating a RACH to the at least one candidate target cell that satisfied the handover condition, wherein identifying that the RLF event is associated with the conditional handover failure is based at least in part on initiating the RACH to the at least one candidate target cell.

Example 13: The method of any of examples 1-12, further comprising: identifying information about a master cell and a secondary cell in a dual-connectivity configuration, wherein the RLF report includes the identified information.

Example 14: The method of any of examples 1-13, wherein the RLF event is for an MCG in a dual-connectivity configuration.

Example 15: The method of any of examples 1-14, further comprising: identifying a measurement for an MCG and a measurement for at least one SCG in a dual-connectivity configuration, wherein the RLF report includes the measurements.

Example 16: The method of any of examples 1-15, further comprising: identifying an RSRP of a last serving cell that includes an MCG and at least one SCG in a dual-connectivity configuration, or an RSRQ of the last serving cell in the dual-connectivity configuration, or a combination thereof, wherein the RLF report includes the RSRP or the RSRQ or both for the last serving cell.

Example 17: The method of any of examples 1-16, further comprising: identifying an RSRP of a neighboring cell configured by a master base station or a secondary base station in a dual-connectivity configuration, an RSRQ of the neighboring cell, a frequency of the neighboring cell, or an identifier of the neighboring cell, or a combination thereof, wherein the RLF report includes the RSRP, the RSRQ, the frequency, or the identifier, or a combination thereof of the neighboring cell.

Example 18: The method of any of examples 1-17, further comprising: identifying a C-RNTI of a master base station and at least one secondary base station in a dual-connectivity configuration, wherein the RLF report includes the C-RNTIs of the master base station and the at least one secondary base station.

Example 19: The method of any of examples 1-18, further comprising: identifying an identifier for each cell of a master base station or a secondary base station in a dual-connectivity configuration that is associated with the RLF event, wherein the RLF report includes the identifiers for each cell associated with the RLF event.

Example 20: The method of any of examples 1-19, further comprising: identifying an identifier of a primary secondary cell in a dual-connectivity configuration when a last RRC reconfiguration message including mobility control information was received, wherein the RLF report includes the identifier.

Example 21: The method of any of examples 1-20, further comprising: identifying whether a type of a handover is an inter-RAT handover or an intra-RAT handover, wherein the RLF report includes an indication of the type of the handover.

Example 22: The method of any of examples 1-21, wherein reestablishing the RRC connection further comprises: transmitting an RRC connection reestablishment request; receiving an RRC connection reestablishment message based at least in part on transmitting the RRC connection reestablishment request; and transmitting an RRC connection reestablishment complete message based at least in part on receiving the RRC connection reestablishment message.

Example 23: The method of any of examples 1-22, further comprising: transmitting an RRC message that includes an indication that one or more RLF reports are available to report to a network, wherein transmitting the RLF report is based at least in part on transmitting the RRC message that includes the indication that the one or more RLF reports are available to report to the network.

Example 24: The method of example 23, further comprising: receiving an information request message based at least in part on transmitting the RRC message that includes the indication that the one or more RLF reports are available to report to the network, wherein transmitting the RLF report is based at least in part on receiving the information request message.

Example 25: The method of example 24, wherein the RLF report is part of an information response message transmitted based at least in part on receiving the information request message.

Example 26: The method of example 23, wherein the RRC message comprises an RRC connection reestablishment complete message.

Example 27: The method of any of examples 1-26, further comprising: performing a handover between a source cell and the cell, wherein identifying the RLF event is based at least in part on performing the handover.

Example 28: The method of any of examples 1-27, wherein the RLF report includes a transmission power of a preamble, a number of attempts to successfully send the preamble, a number of transmissions before receiving an acknowledgement that the preamble was received, an RSRP, or an L1 RSRP, or a combination thereof.

Example 29: The method of any of examples 1-28, wherein the preamble is a RACH preamble.

Example 30: The method of any of examples 1-29, wherein the first RAT is associated with a 5GC and the RAT is associated with an EPC.

Example 31: A method for wireless communication, comprising: reestablishing an RRC connection with a UE after an RLF event, wherein the RLF event is associated with a first radio access technology and the RRC connection is associated with a second radio access technology; receiving, over the RRC connection of the second radio access technology, an RLF report from the UE that includes information about one or more directional beams associated with the RLF event; and transmitting a message to another cell of a network based at least in part on receiving the RLF report, the message including at least a portion of the information about the one or more directional beams associated with the RLF event.

Example 32: The method of example 31, wherein transmitting the message to the other cell comprises: transmitting the message to a source cell associated with a handover of the UE.

Example 33: The methods of any of example 31 or 32, wherein transmitting the message to the other cell comprises: transmitting the message to a core network component, wherein the core network component communicates at least some of the information in the message to a source cell associated with a handover of the UE.

Example 34: The method of example 33, wherein the core network component comprises at least one component of an EPC.

Example 35: The method of example 33, wherein the core network component comprises at least one component of a 5GC.

Example 36: The method of any of examples 31-35, wherein the first radio access technology is associated with a 5GC and the second radio access technology is associated with an EPC.

Example 37: The method of any of examples 31-36, further comprising: identifying a type of the RLF event; and selecting a type of the message to transmit based at least in part on identifying the type of the RLF event, wherein transmitting the message is based at least in part on identifying the type of the RLF event.

Example 38: The method of any of examples 31-37, wherein the message is an RLF indication.

Example 39: The method of any of examples 31-37, wherein the message is a handover report.

Example 40: The method of any of examples 31-39, wherein transmitting the message to the other cell comprises: transmitting the message over an Xn interface.

Example 41: The method of any of examples 31-39, wherein transmitting the message to the other cell comprises: transmitting the message over an X2 interface.

Example 42: The method of any of examples 31-41, further comprising: identifying that a cause of the RLF event is a beam recovery failure associated with the first radio access technology, wherein the message indicates that a type of the RLF event comprises the beam recovery failure.

Example 43: The method of example 42, wherein the message comprises a connection failure type indication and is configured to indicate whether the RLF event is a radio link failure, a handover failure, the beam recovery failure, or a combination thereof.

Example 44: The method of example 42, wherein a connection failure type indication in the RLF report is configured to indicate whether the RLF event is a radio link failure, a handover failure, the beam recovery failure, or a combination thereof.

Example 45: The method of any of examples 31-44, further comprising: identifying a duration of a service interruption based at least in part on receiving the RLF report, wherein the message indicates the duration of the service interruption.

Example 46: The method of any of examples 31-45, wherein the message includes an identifier of the one or more directional beams associated with the RLF event, beam reference signal received power of the one or more directional beams associated with the RLF event, a beam measurement of the one or more directional beams associated with the RLF event, or a combination thereof.

Example 47: The method of any of examples 31-46, further comprising: identifying that the RLF event is associated with a conditional handover failure based at least in part on receiving the RLF report, wherein the message includes information about the conditional handover failure.

Example 48: The method of example 47, wherein transmitting the message to the other cell comprises: transmitting the message to a plurality of candidate target cells associated with a conditional handover, wherein transmitting the message to the other cell is based at least in part on transmitting the message to the plurality of candidate target cells.

Example 49: The method of example 47, wherein the message includes a duration between a last handover initialization and a connection failure, a candidate target cell list, measurement information for at least one target cell in the candidate target cell list, an indication about one or more target cells attempted to connect with after the RLF event occurs, a number of connection attempts after the RLF event occurs, or a combination thereof.

Example 50: The method of example 47, further comprising: transmitting an indication of one or more candidate target cells for a conditional handover, wherein receiving the RLF report is based at least in part on transmitting the indication of the one or more candidate target cells for the conditional handover.

Example 51: The method of any of examples 31-50, further comprising: identifying information about a master cell and a secondary cell in a dual-connectivity configuration based at least in part on receiving the RLF report, wherein the message includes the identified information.

Example 52: The method of any of examples 31-51, wherein transmitting the message to the other cell comprises: transmitting the message to an MCG and an SCG in a dual-connectivity configuration.

Example 53: The method of any of examples 31-52, wherein the RLF event is for an MCG in a dual-connectivity configuration.

Example 54: The method of any of examples 31-53, further comprising: identifying a measurement for an MCG and a measurement for at least one SCG in a dual-connectivity configuration based at least in part on receiving the RLF report, wherein the message includes the measurements.

Example 55: The method of any of examples 31-54, further comprising: identifying, based at least in part on receiving the RLF report, an RSRP of a last serving cell that includes an MCG and at least one SCG in a dual-connectivity configuration, or an RSRQ of the last serving cell in the dual-connectivity configuration, or a combination thereof, wherein the message includes the RSRP or the RSRQ or both for the last serving cell.

Example 56: The method of any of examples 31-55, further comprising: identifying, based at least in part on receiving the RLF report, an RSRP of a neighboring cell configured by a master base station or a secondary base station in a dual-connectivity configuration, an RSRQ of the neighboring cell, a frequency of the neighboring cell, or an identifier of the neighboring cell, or a combination thereof, wherein the message includes the RSRP, the RSRQ, the frequency, or the identifier, or a combination thereof of the neighboring cell.

Example 57: The method of any of examples 31-456, further comprising: identifying, based at least in part on receiving the RLF report, a C-RNTI of a master base station and at least one secondary base station in a dual-connectivity configuration, wherein the message includes the C-RNTIs of the master base station and the least one secondary base station.

Example 58: The method of any of examples 31-57, further comprising: identifying, based at least in part on receiving the RLF report, an identifier for each cell of a master base station or a secondary base station in a dual-connectivity configuration that is associated with the RLF event, wherein the message includes the identifiers for each cell associated with the RLF event.

Example 59: The method of any of examples 31-58, further comprising: identifying, based at least in part on receiving the RLF report, an identifier of a primary secondary cell in a dual-connectivity configuration when a last RRC reconfiguration message including mobility control information was received, wherein the message includes the identifier.

Example 60: The method of any of examples 31-59, wherein reestablishing the RRC connection further comprises: receiving an RRC connection reestablishment request from the UE; transmitting an RRC connection reestablishment message based at least in part on receiving the RRC connection reestablishment request; and receiving an RRC connection reestablishment complete message based at least in part on transmitting the RRC connection reestablishment message.

Example 61: The method of any of examples 31-60, further comprising: receiving an RRC message that includes an indication that one or more RLF reports are available at the UE, wherein receiving the RLF report is based at least in part on receiving the RRC message that includes the indication that the one or more RLF reports are available at the UE.

Example 62: The method of example 61, further comprising: transmitting an information request message based at least in part on receiving the RRC message that includes the indication that the one or more RLF reports are available at the UE, wherein receiving the RLF report is based at least in part on transmitting the information request message.

Example 63: The method of example 62, wherein the RLF report is part of an information response message received based at least in part on transmitting the information request message.

Example 64: The method of example 61, wherein the RRC message comprises an RRC connection reestablishment complete message.

Example 65: The method of any of examples 31-64, further comprising: transmitting a handover command to the UE, wherein receiving the RLF report is based at least in part on transmitting the handover command.

Example 66: A method for wireless communication, comprising: identifying an RLF event; reestablishing an RRC connection with a cell based at least in part on identifying the RLF event; and transmitting an RLF report to the cell based at least in part on reestablishing the RRC connection, the RLF report including a connection failure type indication indicating that the RLF event is a beam recovery failure and information about one or more directional beams associated with the RLF event.

Example 67: The method of example 66, further comprising: identifying the beam recovery failure for at least one directional beam, wherein identifying the RLF event is based at least in part on identifying the beam recovery failure.

Example 68: The method of any of examples 66 or 67, wherein the connection failure type indication in the RLF report is configured to indicate whether the RLF event is a radio link failure, a handover failure, the beam recovery failure, or a combination thereof.

Example 69: The method of any of examples 66-68, wherein the RLF report includes an identifier of the one or more directional beams associated with the RLF event, beam reference signal received power of the one or more directional beams associated with the RLF event, a beam measurement of the one or more directional beams associated with the RLF event, or a combination thereof.

Example 70: The method of any of examples 66-69, further comprising: identifying whether a type of a handover is an inter-RAT handover or an intra-RAT handover, wherein the RLF report includes an indication of the type of the handover.

Example 71: The method of any of examples 66-70, wherein reestablishing the RRC connection further comprises: transmitting an RRC connection reestablishment request; receiving an RRC connection reestablishment message based at least in part on transmitting the RRC connection reestablishment request; and transmitting an RRC connection reestablishment complete message based at least in part on receiving the RRC connection reestablishment message.

Example 72: The method of any of examples 66-71, further comprising: transmitting an RRC message that includes an indication that one or more RLF reports are available to report to a network, wherein transmitting the RLF report is based at least in part on transmitting the RRC message that includes the indication that the one or more RLF reports are available to report to the network.

Example 73: The method of example 72, further comprising: receiving an information request message based at least in part on transmitting the RRC message that includes the indication that the one or more RLF reports are available to report to the network, wherein transmitting the RLF report is based at least in part on receiving the information request message.

Example 74: The method of example 73, wherein the RLF report is part of an information response message transmitted based at least in part on receiving the information request message.

Example 75: A method for wireless communication, comprising: reestablishing an RRC connection with a UE after an RLF event; receiving an RLF report from the UE that includes a connection failure type indication indicating that the RLF event is a beam recovery failure and information about one or more directional beams associated with the RLF event; and transmitting a message to another cell of a network based at least in part on receiving the RLF report, the message including at least a portion of the information about the one or more directional beams associated with the RLF event.

Example 76: The method of example 75, wherein transmitting the message to the other cell comprises: transmitting the message to a source cell associated with a handover of the UE.

Example 77: The method of any of examples 75 or 76, wherein transmitting the message to the other cell comprises: transmitting the message to a core network component, wherein the core network component communicates at least some of the information in the message to a source cell associated with a handover of the UE.

Example 78: The method of example 77, wherein the core network component comprises at least one component of an EPC.

Example 79: The method of example 77, wherein the core network component comprises at least one component of a 5GC.

Example 80: The method of any of examples 75-79, further comprising: identifying a type of the RLF event; and selecting a type of the message to transmit based at least in part on identifying the type of the RLF event, wherein transmitting the message is based at least in part on identifying the type of the RLF event.

Example 81: The method of any of examples 75-80, wherein the message is an RLF indication.

Example 82: The method of any of examples 75-80, wherein the message is a handover report.

Example 83: The method of any of examples 75-82, wherein transmitting the message to the other cell comprises: transmitting the message over an Xn interface.

Example 84: The method of any of examples 75-82, wherein transmitting the message to the other cell comprises: transmitting the message over an X2 interface.

Example 85: A method for wireless communication, comprising: receiving an indication of one or more candidate target cells for a conditional handover; determining that a handover condition is satisfied for at least one candidate target cell of the one or more candidate target cells; identifying an RLF event associated with the conditional handover; reestablishing an RRC connection with a cell based at least in part on identifying the RLF event; and transmitting an RLF report to the cell based at least in part on reestablishing the RRC connection, the RLF report including information about one or more directional beams associated with the RLF event and information about a conditional handover failure.

Example 86: The method of example 85, further comprising: initiating a RACH to the at least one candidate target cell that satisfied the handover condition, wherein identifying that the RLF event is associated with the conditional handover failure is based at least in part on initiating the RACH to the at least one candidate target cell.

Example 87: The method of example 86, further comprising: measuring one or more characteristics associated with the one or more candidate target cells; and determining that the one or more characteristics associated with at least one of the one or more candidate target cells satisfies one or more thresholds, wherein determining that the handover condition is satisfied is based at least in part on determining that the one or more characteristics associated with at least one of the one or more candidate target cells satisfies the one or more thresholds.

Example 88: The method of any of examples 85-87, wherein transmitting the RLF report further comprises: transmitting the RLF report to a plurality of candidate target cells.

Example 89: The method of any of examples 85-88, further comprising: identifying whether the RLF event associated with the conditional handover is based at least in part on a too-late handover scenario from a source cell to one of the one or more candidate target cells or a wrong-cell handover scenario to a wrong cell, wherein the RLF report includes information indicating whether the RLF event associated with the conditional handover is based at least in part on the too-late handover scenario or the wrong-cell handover scenario.

Example 90: The method of any of examples 85-89, wherein the RLF report includes a duration between a last handover initialization and a connection failure, a candidate target cell list, measurement information for at least one target cell in the candidate target cell list, an indication about one or more target cells attempted to connect with after the RLF event occurs, a number of connection attempts after the RLF event occurs, or a combination thereof.

Example 91: The method of any of examples 85-90, further comprising: identifying a beam recovery failure for at least one directional beam associated with the conditional handover, wherein identifying the RLF event is based at least in part on identifying the beam recovery failure.

Example 92: The method of any of examples 85-91, wherein the RLF report is configured to indicate whether the RLF event is a radio link failure, a handover failure, a beam recovery failure, or a combination thereof.

Example 93: The method of any of examples 85-92, wherein the RLF report includes an identifier of the one or more directional beams associated with the RLF event, beam reference signal received power of the one or more directional beams associated with the RLF event, a beam measurement of the one or more directional beams associated with the RLF event, or a combination thereof.

Example 94: A method for wireless communication, comprising: reestablishing an RRC connection with a UE after an RLF event; receiving an RLF report from the UE that includes information about one or more directional beams associated with the RLF event; identifying that the RLF event is associated with a conditional handover failure based at least in part on receiving the RLF report; and transmitting a message to another cell of a network based at least in part on receiving the RLF report, the message including at least a portion of the information about the one or more directional beams associated with the RLF event and information about the conditional handover failure.

Example 95: The method of example 94, wherein transmitting the message to the other cell comprises: transmitting the message to a plurality of candidate target cells associated with a conditional handover, wherein transmitting the message to the other cell is based at least in part on transmitting the message to the plurality of candidate target cells.

Example 96: The method of any of examples 94 or 95 wherein the message includes a duration between a last handover initialization and a connection failure, a candidate target cell list, measurement information for at least one target cell in the candidate target cell list, an indication about one or more target cells attempted to connect with after the RLF event occurs, a number of connection attempts after the RLF event occurs, or a combination thereof.

Example 97: The method of any of examples 94-96, further comprising: identifying whether the RLF event associated with a conditional handover is based at least in part on a too-late handover scenario from a source cell to one of one or more candidate target cells or a wrong-cell handover scenario to a wrong cell, wherein the RLF report includes information indicating whether the RLF event associated with the conditional handover is based at least in part on the too-late handover scenario or the wrong-cell handover scenario.

Example 98: The method of any of examples 94-97, further comprising: transmitting, to the UE, an indication of one or more candidate target cells for a conditional handover, wherein receiving the RLF report is based at least in part on transmitting the indication of the one or more candidate target cells for the conditional handover.

Example 99: The method of example 98, further comprises: identifying a plurality of candidate target cells for the conditional handover with the UE; transmitting a conditional handover request to the plurality of candidate target cells, wherein transmitting the indication of the one or more candidate target cells for the conditional handover to the UE is based at least in part on transmitting the conditional handover request.

Example 100: The method of any of examples 94-99, further comprising: identifying a type of the RLF event; and selecting a type of the message to transmit based at least in part on identifying the type of the RLF event, wherein transmitting the message is based at least in part on identifying the type of the RLF event.

Example 101: The method of any of examples 94-100, wherein the message is an RLF indication.

Example 102: The method of any of examples 94-100, wherein the message is a handover report.

Example 103: The method of any of examples 94-102, wherein transmitting the message to the other cell comprises: transmitting the message over an Xn interface.

Example 104: The method of any of examples 94-102, wherein transmitting the message to the other cell comprises: transmitting the message over an X2 interface.

Example 105: The method of any of examples 94-105, wherein the message includes an identifier of the one or more directional beams associated with the RLF event, beam reference signal received power of the one or more directional beams associated with the RLF event, a beam measurement of the one or more directional beams associated with the RLF event, or a combination thereof.

Techniques described herein may be used for various wireless communications systems such as CDMA, 7TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication performed by a user equipment (UE), the method comprising:
   identifying a radio link failure (RLF) event between the UE and a network device, wherein the RLF event is associated with a first radio access technology;
   transmitting an RRC message that includes an indication that one or more RLF reports are available to report to the network;
   transmitting a RLF report to a network cell after transmitting the RRC message that includes the indication that the one or more RLF reports are available to report to the network, the RLF report including a field comprising an indication of one of a plurality of causes of the RLF event and including information about one or more directional beams associated with the RLF event, the plurality of causes of the RLF event comprising a beam recovery failure between the UE and the network device,
   wherein the RLF report further includes:
   one or more first measurements for a master cell group (MCG) and one or more second measurements for at least one secondary cell group (SCG) in a dual-connectivity configuration, and
   an indication of a first duration of a first service interruption for a master node associated with the MCG and a second duration of a second service interruption for a secondary node associated with an SCG of the at least one SCG based at least in part on the RLF event.

2. The method of claim 1, further comprising:
   identifying a beam recovery failure for at least one directional beam associated with the first radio access technology, wherein identifying the RLF event is based at least in part on identifying the beam recovery failure.

3. The method of claim 1, wherein the RLF report is configured to indicate, via the field, whether the RLF event is a radio link failure, a handover failure, the beam recovery failure, or a combination thereof, and wherein the field comprises two or more bits.

4. The method of claim 1, wherein a connection failure type indication in the RLF report is configured to indicate whether the RLF event is a radio link failure, a handover failure, the beam recovery failure, or a combination thereof.

5. The method of claim 1, further comprising:
   identifying that the RLF event is associated with a conditional handover failure, wherein the RLF report includes information about the conditional handover failure.

6. The method of claim 1, further comprising:
   identifying information about the MCG and the SCG in the dual-connectivity configuration, wherein the RLF report includes the identified information.

7. The method of claim 1, further comprising:
   identifying whether a type of a handover is an inter-radio access technology (RAT) handover or an intra-RAT handover, wherein the RLF report includes an indication of the type of the handover.

8. A method for wireless communication performed by a network device, the method comprising:
reestablishing a radio resource control (RRC) connection with a user equipment (UE) after a radio link failure (RLF) event between the UE and the network device, wherein the RLF event is associated with a first radio access technology and the RRC connection is associated with a second radio access technology;
receiving, over the RRC connection of the second radio access technology, an RRC message that includes an indication that one or more RLF reports are available to report to a network;
receiving, over the RRC connection of the second radio access technology and based at least in part on receiving the RRC message that includes an indication that one or more RLF reports are available to report to the network, an RLF report from the UE that includes a field comprising an indication of one of a plurality of causes of the RLF event and includes information about one or more directional beams associated with the RLF event, the plurality of causes of the RLF event comprising a beam recovery failure between the UE and the network device, wherein the RLF report further includes;
one or more first measurements for a master cell group (MCG) and one or more second measurements for at least one secondary cell group (SCG) in a dual-connectivity configuration, and
an indication of a first duration of a first service interruption for a master node associated with the MCG and a second duration of a second service interruption for a secondary node associated with an SCG of the at least one SCG based at least in part on the RLF event; and
transmitting a message to another cell of the network based at least in part on receiving the RLF report, the message including at least a portion of the information about the one or more directional beams associated with the RLF event.

9. The method of claim 8, wherein the first radio access technology is associated with a 5G core network (5GC) and the second radio access technology is associated with an evolved packet core (EPC).

10. The method of claim 8, further comprising:
identifying that a cause of the RLF event is the beam recovery failure associated with the first radio access technology, wherein the message indicates that a type of the RLF event comprises the beam recovery failure.

11. The method of claim 10, wherein the message comprises a connection failure type indication and is configured to indicate whether the RLF event is a radio link failure, a handover failure, the beam recovery failure, or a combination thereof.

12. The method of claim 1, wherein the RLF report further includes an identifier of the one or more directional beams associated with the RLF event, beam reference signal received power of the one or more directional beams associated with the RLF event, a beam measurement of the one or more directional beams associated with the RLF event, or a combination thereof.

13. The method of claim 1, wherein reestablishing the RRC connection further comprises:
transmitting an RRC connection reestablishment request;
receiving an RRC connection reestablishment message based at least in part on transmitting the RRC connection reestablishment request; and
transmitting an RRC connection reestablishment complete message based at least in part on receiving the RRC connection reestablishment message.

14. The method of claim 1, further comprising:
receiving an information request message based at least in part on transmitting the RRC message that includes the indication that the one or more RLF reports are available to report to the network, wherein transmitting the RLF report is based at least in part on receiving the information request message.

15. A method for wireless communication performed by a user equipment, the method comprising:
receiving an indication of one or more candidate target cells for a conditional handover;
determining that a handover condition is satisfied for at least one candidate target cell of the one or more candidate target cells;
identifying a radio link failure (RLF) event associated with the conditional handover;
reestablishing a radio resource connection with a network cell based at least in part on identifying the RLF event;
transmitting an RRC message that includes an indication that one or more RLF reports are available to report to a network; and
transmitting an RLF report to the network cell after reestablishing the RRC connection and based at least in part on transmitting the RRC message that includes the indication that the one or more RLF reports are available to report to the network, the RLF report including information about one or more directional beams associated with the RLF event and including information about a conditional handover failure,
wherein the RLF report further includes:
an indication of a cell identity comprising a cell global identity and a physical cell identifier, a candidate target cell list, and an indication about one or more target cells attempted to connect with after the RLF event occurs,
one or more first measurements for a master cell group (MCG) and one or more second measurements for at least one secondary cell group (SCG) in a dual-connectivity configuration, and
an indication of a first duration of a first service interruption for a master node associated with the MCG and a second duration of a second service interruption for a secondary node associated with an SCG of the at least one SCG based at least in part on the RLF event.

16. The method of claim 15, further comprising:
initiating a random access channel (RACH) to the at least one candidate target cell that satisfied the handover condition, wherein identifying that the RLF event is associated with the conditional handover failure is based at least in part on initiating the RACH to the at least one candidate target cell.

17. The method of claim 16, further comprising:
measuring one or more characteristics associated with the one or more candidate target cells; and
determining that the one or more characteristics associated with at least one of the one or more candidate target cells satisfies one or more thresholds, wherein determining that the handover condition is satisfied is based at least in part on determining that the one or more characteristics associated with at least one of the one or more candidate target cells satisfies the one or more thresholds.

18. The method of claim 15, further comprising:
identifying whether the RLF event associated with the conditional handover is based at least in part on a too-late handover scenario from a source cell to one of the one or more candidate target cells or a wrong-cell handover scenario to a wrong cell, wherein the RLF report includes information indicating whether the RLF event associated with the conditional handover is based at least in part on the too-late handover scenario or the wrong-cell handover scenario.

19. The method of claim 15, wherein the RLF report includes a duration between a last handover initialization and a connection failure, measurement information for at least one target cell in the candidate target cell list, a number of connection attempts after the RLF event occurs, or a combination thereof.

20. The method of claim 15, further comprising:
identifying a beam recovery failure for at least one directional beam associated with the conditional handover, wherein identifying the RLF event is based at least in part on identifying the beam recovery failure.

21. The method of claim 15, wherein the RLF report is configured to indicate whether the RLF event is a radio link failure, a handover failure, a beam recovery failure, or a combination thereof.

22. The method of claim 15, wherein the RLF report includes an identifier of the one or more directional beams associated with the RLF event, beam reference signal received power of the one or more directional beams associated with the RLF event, a beam measurement of the one or more directional beams associated with the RLF event, or a combination thereof.

23. The method of claim 1, wherein the indication that the one or more RLF reports are available to report to the network comprises a flag in an RRC connection reestablishment complete message, and wherein the RRC message comprises the RRC connection reestablishment complete message.

24. The method of claim 8, wherein the indication that the one or more RLF reports are available to report to the network comprises a flag in an RRC connection setup complete message, and wherein the RRC message comprises the RRC connection setup complete message.

25. The method of claim 1, wherein the indication that the one or more RLF reports are available to report to the network comprises a flag in an RRC connection reconfiguration complete message, and wherein the RRC message comprises the RRC connection reconfiguration complete message.

26. The method of claim 8, wherein the indication that the one or more RLF reports are available to report to the network comprises a flag in an RRC connection reconfiguration complete message, and wherein the RRC message comprises the RRC connection reconfiguration complete message.

* * * * *